United States Patent
Hashimoto et al.

(10) Patent No.: US 9,141,941 B2
(45) Date of Patent: Sep. 22, 2015

(54) INFORMATION PROCESSING APPARATUS AND METHOD

(75) Inventors: Koji Hashimoto, Kawasaki (JP);
Takayoshi Kurita, Mishima (JP); Koji Kikuchi, Hachiouji (JP); Tsuguto Chiba, Yokohama (JP); Takeshi Gomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/565,182

(22) Filed: Aug. 2, 2012

(65) Prior Publication Data
US 2013/0086640 A1   Apr. 4, 2013

(30) Foreign Application Priority Data

Sep. 30, 2011   (JP) ................. 2011-217795

(51) Int. Cl.
G06F 7/04        (2006.01)
G06F 17/30       (2006.01)
H04L 29/06       (2006.01)
G06Q 10/10       (2012.01)
G06F 21/60       (2013.01)

(52) U.S. Cl.
CPC ............ *G06Q 10/107* (2013.01); *G06F 21/606* (2013.01); *G06Q 10/10* (2013.01); *G06F 2221/2115* (2013.01); *G06F 2221/2141* (2013.01)

(58) Field of Classification Search
CPC .............. G06F 2221/2115; G06F 2221/2141; G06F 21/606
USPC ............................................... 380/28; 726/4
See application file for complete search history.

(56) References Cited

U.S. PATENT DOCUMENTS

| | | | |
|---|---|---|---|
| 7,418,500 B1 * | 8/2008 | Bolinger et al. | 709/225 |
| 7,797,297 B2 * | 9/2010 | Sakaki | 707/705 |
| 8,464,066 B1 * | 6/2013 | Price et al. | 713/180 |
| 2004/0237045 A1 * | 11/2004 | Meltzer | 715/530 |

(Continued)

FOREIGN PATENT DOCUMENTS

| | | |
|---|---|---|
| JP | 2005-198336 | 7/2005 |
| JP | 2005-258503 | 9/2005 |

(Continued)

OTHER PUBLICATIONS

Nicolas Christin; Content Availability, Pollution and Poisoning in File Sharing Peer-to-Peer Networks; Year: 2005; pp. 68-77.*

(Continued)

*Primary Examiner* — Monjour Rahim
(74) *Attorney, Agent, or Firm* — Staas & Halsey LLP

(57) ABSTRACT

A computer determines whether destination information is included in permission target information. The destination information indicates a destination to which a file stored in a storage device is transferred. The permission target information includes information indicating a target permitted to access the file. The computer prompts before the file is transferred, upon determining that the destination information is not included in the permission target information, a user to input whether to permit the transfer. The computer adds the destination information to the permission target information upon receiving, via an input device, a permission input for permitting the transfer. The computer transfers the file upon receiving the permission input.

16 Claims, 19 Drawing Sheets

(56) References Cited

U.S. PATENT DOCUMENTS

| | | | |
|---|---|---|---|
| 2006/0107044 A1* | 5/2006 | Krishna et al. | 713/166 |
| 2007/0239838 A1* | 10/2007 | Laurel et al. | 709/206 |
| 2007/0294626 A1* | 12/2007 | Fletcher et al. | 715/751 |
| 2010/0082713 A1* | 4/2010 | Frid-Nielsen et al. | 707/821 |
| 2010/0095198 A1* | 4/2010 | Bultrowicz et al. | 715/234 |
| 2011/0154456 A1* | 6/2011 | Machani | 726/6 |
| 2012/0185520 A1* | 7/2012 | Iarocci et al. | 707/827 |
| 2013/0088733 A1* | 4/2013 | Yach et al. | 358/1.13 |

FOREIGN PATENT DOCUMENTS

| | | |
|---|---|---|
| JP | 2008-262293 | 10/2008 |
| JP | 2010-49358 | 3/2010 |

OTHER PUBLICATIONS

Japanese Office Action issued Jan. 6, 2015 in corresponding Japanese Patent Application No. 2011-217795.

* cited by examiner

| FILE ID | NON-THIRD PARTY MEMBER |
|---|---|
| F000103 | name_A |
| F000103 | a@foo.com |
| F000103 | b@foo.com |
| F000103 | name_B |
| F000103 | c@bar.org |

402e

| FILE ID | LOCATION | |
|---|---|---|
| F000103 | PC_A | C:\path_A\Z.txt |
| F000103 | PC_B | C:\path_B\Z.txt |

403e

| MESSAGE ID | ATTACHED FILE ID | ATTACHED FILE NAME |
|---|---|---|
| M000015 | F000103 | Z.txt |
| M000021 | F000103 | Z.txt |

| FILE ID | NON-THIRD PARTY MEMBER |
|---|---|
| F000103 | name_A |
| F000103 | a@foo.com |
| F000103 | b@foo.com |
| F000103 | name_B |
| F000103 | c@bar.org |
| F000103 | name_D |

402f

| FILE ID | LOCATION | |
|---|---|---|
| F000103 | PC_A | C:\path_A\Z.txt |
| F000103 | PC_B | C:\path_B\Z.txt |
| F000103 | \\srv\shared\Z.txt | |

403f

| MESSAGE ID | ATTACHMENT FILE ID | ATTACHMENT FILE NAME |
|---|---|---|
| M000015 | F000103 | Z.txt |
| M000021 | F000103 | Z.txt |

400f

401g

| FILE ID | NON-THIRD PARTY MEMBER |
|---|---|
| F000103 | name_A |
| F000103 | a@foo.com |
| F000103 | b@foo.com |
| F000103 | name_B |
| F000103 | c@bar.org |
| F000103 | name_D |

402g

| FILE ID | LOCATION | |
|---|---|---|
| F000103 | PC_A | C:\path_A\Z.txt |
| F000103 | PC_B | C:\path_B\Z.txt |
| F000103 | \\srv\shared\Z.txt | |
| F000103 | PC_D | C:\path_D\Z_copy.txt |

403g

| MESSAGE ID | ATTACHED FILE ID | ATTACHED FILE NAME |
|---|---|---|
| M000015 | F000103 | Z.txt |
| M000021 | F000103 | Z.txt |

| FILE | ATTRIBUTE TYPE | ATTRIBUTE VALUE |
|---|---|---|
| C:\path_A1\Z1.txt | ELECTRONIC MAIL | b@foo.com |
| C:\path_A2\Z2.txt | COPY/MOVE/RENAME | \\srv\shared_X\ |
| C:\path_A3\Z3.txt | COPY/MOVE/RENAME | 123-456-7890 |
| C:\path_A4\Z4.txt | FTP | ftp.abcd.org |
| C:\path_A5\Z5.txt | HTTP | www.efgh.com |
| C:\path_A1\Z1.txt | COPY/MOVE/RENAME | \\srv\shared_Y\ |

INFORMATION PROCESSING APPARATUS AND METHOD

CROSS-REFERENCE TO RELATED APPLICATION

This application is based upon and claims the benefit of priority of the prior Japanese Patent Application No. 2011-217795, filed on Sep. 30, 2011, the entire contents of which are incorporated herein by reference.

FIELD

The embodiments discussed herein are related to an information processing apparatus.

BACKGROUND

With the increased computerization of society, protection technologies for suppressing leakage of information have become increasingly important. Various protection technologies for information leakage suppression have been hitherto proposed.

For example, in some cases, a recipient of an electronic mail with a Uniform Resource Locator (URL) included may transfer the electronic mail to a third party. In order to increase convenient access to the destination referred to by the URL without reducing information leakage security, the following technology has been proposed.

Specifically, this technology is one of shared file access management methods in shared file access management systems that manage access to shared files. According to this shared file access management method, a processing apparatus stores in a storage device a shared file access privileges granting condition indicating a condition for granting access privileges to a shared file to be accessed via a URL in an electronic mail. According to this shared file access management method, furthermore, when transferring an electronic mail, the processing apparatus reads from the storage device a shared file access privileges granting condition for granting access privileges to a shared file to be accessed via a URL in the electronic mail. When the destination to which the electronic mail is to be transferred is a user who satisfies the read shared file access privileges granting condition, the user is granted access privileges to the shared file.

Japanese Laid-open Patent Publication No. 2008-262293 discloses a related technique.

SUMMARY

According to an aspect of the present invention, a computer determines whether destination information is included in permission target information. The destination information indicates a destination to which a file stored in a storage device is transferred. The permission target information includes information indicating a target permitted to access the file. The computer prompts before the file is transferred, upon determining that the destination information is not included in the permission target information, a user to input whether to permit the transfer. The computer adds the destination information to the permission target information upon receiving, via an input device, a permission input for permitting the transfer. The computer transfers the file upon receiving the permission input.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of a management DB;

FIG. 15 is a diagram illustrating examples of a management DB;

FIG. 16 is a diagram illustrating an example of a foreign file management table;

DESCRIPTION OF EMBODIMENTS

Information may be leaked intentionally by a malicious user or carelessly by an unmalicious user.

Excessive constraints of operations performed by users to address information leakage due to carelessness may impair the convenience of users, resulting in a risk of users' operation efficiency being reduced. In addition, when a mechanism for setting an information leakage suppression policy in advance is employed, a considerable burden may be placed on an administrator or any other user for setting the policy. That is, depending on the situation, users may suffer some detriment, such as reduced convenience or having the burden of setting the policy, in exchange for suppression of information leakage due to carelessness.

Embodiments will be described in detail hereinafter with reference to the drawings. The description will be given in the following order.

First, features common to first to third embodiments will be described with reference to FIGS. 1 to 4. Then, the first embodiment regarding suppression of information leakage through attached files in electronic mails will be described with reference to FIGS. 5 to 13. Further, the second embodiment for also suppressing information leakage through shared folders will be described with reference to FIGS. 14 to 15. In addition, the third embodiment for reducing processing loads by narrowing down the targets to be monitored to files for which information leakage is likely to occur due to careless mistake will be described with reference to FIGS. 16 to 19. Finally, several other modifications will further be discussed.

Figure 1:
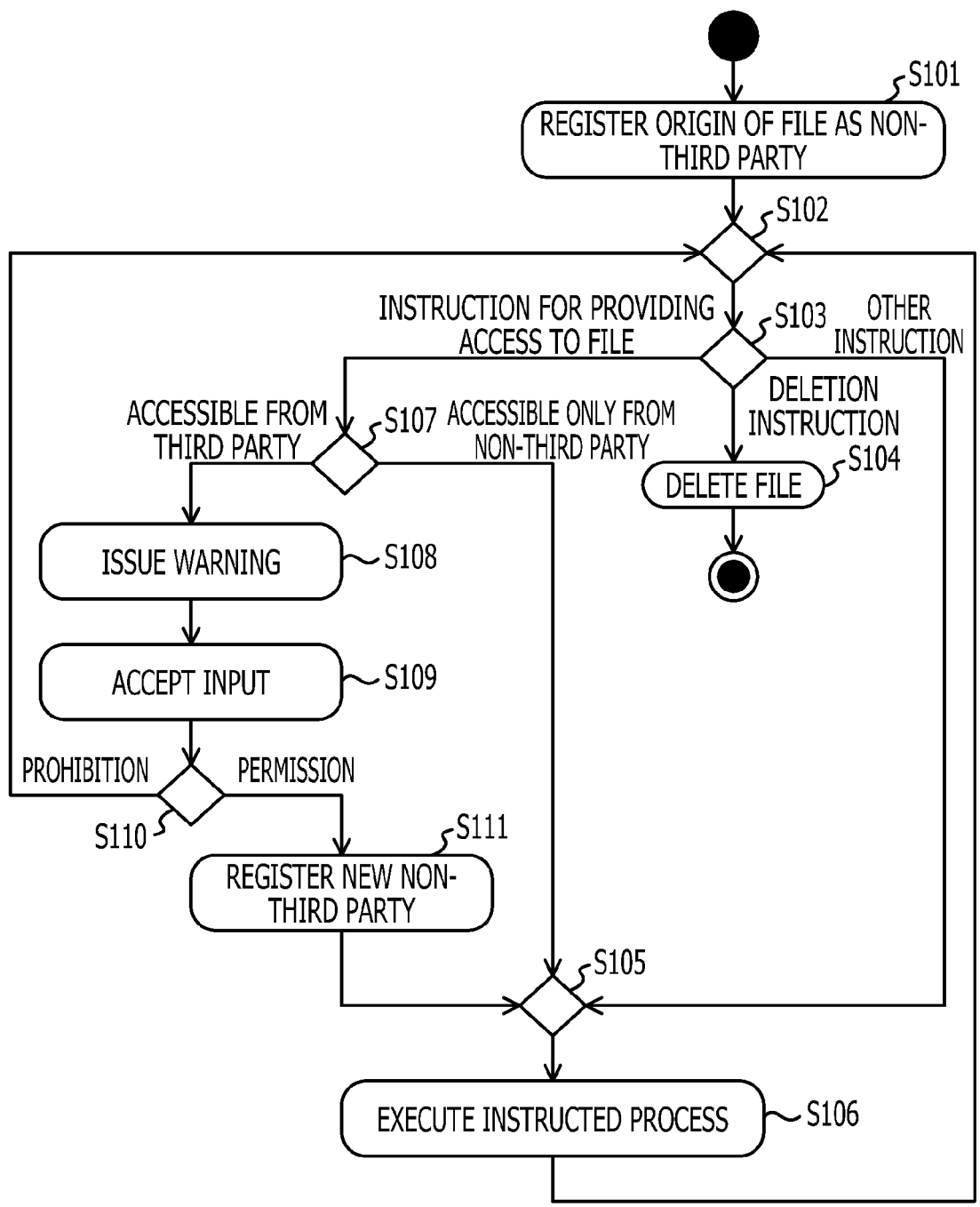
FIG. 1 is a diagram illustrating a process performed in a life cycle of a file.

FIG. 1 is a diagram illustrating a process performed in the life cycle of a file, and is represented in form of a Unified Modeling Language (UML) activity diagram.

First, in S101, a computer registers the origin of the file as a non-third party regarding the file.

A non-third party regarding a file is, in other words, a user or computer that is authorized to access the file. The origin of a file is, of course, a non-third party regarding the file. Thus, in S101, the origin is automatically registered as a non-third party.

For example, for a new file created in a personal computer (PC) that a user uses, the user may be regarded as the origin of the file. The origin may be represented by information (for example, account name) identifying the user.

When a PC is used only by one specific user, the PC may be regarded as the origin. The origin may be represented by information identifying the PC. Examples of information identifying a PC within an intranet include a host name, a Media Access Control (MAC) address, and a fixedly (i.e., statically) assigned Internet Protocol (IP) address.

Further, for an attached file in a received electronic mail, the sender of the electronic mail may be regarded as the origin of the file. The origin may be represented by the sender's electronic mail address.

For a file downloaded from a server such as a File Transfer Protocol (FTP) server or a Hypertext Transfer Protocol (HTTP) server, the server may be regarded as the origin of the file. The origin may be represented by information (for example, a Fully Qualified Domain Name (FQDN) or an IP address) identifying the server.

After the registration in S101, the computer waits for an input to be received from the user, for instructing to execute a certain process on the file. Upon receiving an input from the user, the computer proceeds to a decision node S103 through a merge node S102 that follows S101, and, in the decision node S103, the computer determines the type of the received input.

When the input received by the computer is an input for instructing execution of a process of deleting the file, in S104, the computer deletes the file. Then, the life cycle of the file ends, and the process illustrated in FIG. 1 also ends.

When the input received by the computer is an input for instructing execution of a process of providing access to the file, the control of the process flow in FIG. 1 proceeds to a decision node S107. Alternatively, when the input received by the computer is an input for instructing execution of any other process (for example, a process of editing the content of the file), the control of the process flow in FIG. 1 proceeds to S106 through a merge node S105.

In S106, the computer executes the process instructed by the input received from the user. Then, the control of the process flow in FIG. 1 returns to the merge node S102.

In the decision node S107, the computer determines "whether or not the process instructed by the input received from the user is to provide access to the file from a third party".

A third party regarding a file is a user or computer that is not authorized to access the file. In other words, a user or computer that has not been registered as a non-third party regarding the file is a third party regarding the file.

Here, the determination of the decision node S107 is executed when an input from the user is an input for instructing execution of a process of providing access to the file. Examples of the process of providing access to the file include the following processes (1-1) to (1-4):

(1-1) A process of attaching the file to an electronic mail and sending the electronic mail.

(1-2) A process of moving or copying the file to a shared folder.

(1-3) A process of uploading the file from a PC to an FTP server or an HTTP server.

(1-4) A process of moving or copying the file to a recording medium such as a Universal Serial Bus (USB) memory.

Thus, in the decision node S107, the computer determines "which of the following processes (2-1) and (2-2) the process instructed by the input from the user is":

(2-1) A process of providing access to the file only to one or a plurality of registered non-third parties regarding the file.

(2-2) A process of providing access to the file to one or a plurality of third parties that have not been registered as non-third parties regarding the file.

When the process instructed by the input from the user is the process (2-1), the control of the process flow in FIG. 1 proceeds to S106 through the merge node S105. That is, when execution of a process of giving access permission only to a non-third party has been instructed from the user, the execution of the instructed process is permitted, and consequently the instructed process is executed. Then, the control of the process flow in FIG. 1 returns to the merge node S102.

Conversely, when the process instructed by the input from the user is the process (2-2), then in S108, the computer issues a warning. By issuing a warning, the computer notifies the user that the "process instructed by the input from the user involves a risk of information leakage to a third party". By issuing a warning, furthermore, the computer prompts the user to check "whether or not to actually execute the process instructed by the input from the user".

For example, the input from the user may be an input for instructing the computer to execute a process of attaching the file to an electronic mail including a third party as a destination and sending the electronic mail. In this case, in S108, the computer may display a dialog such as "A third party has been specified as a destination. Do you really want to send this electronic mail?"

Then, the computer waits for an input to be given from the user in response to the warning, and, in S109, the computer accepts the input from the user. The input accepted in S109 is specifically a permission input for permitting the instructed process or a prohibition input for prohibiting the instructed process.

Then, in a decision node S110, the computer determines which of the permission input and the prohibition input has been given.

When the prohibition input has been given, the control of the process flow in FIG. 1 returns to the merge node S102. That is, even when an input for instructing execution of a process of providing access to the file from a third party has been carelessly given from the user, the user is able to be aware of their carelessness by receiving the warning in S108.

Thus, the user is able to cause the computer to stop execution of the process by giving a prohibition input to the computer. Consequently, information leakage due to carelessness may be avoided.

Conversely, when the permission input has been given, then, in S111, the computer registers the one or a plurality of third parties in the process (2-2) as new non-third parties. Then, the control of the process flow in FIG. 1 proceeds to S106 through the merge node S105. Consequently, the process whose execution is permitted by the permission input is executed in S106, and the control of the process flow in FIG. 1 returns to the merge node S102.

According to the process in FIG. 1 described above, various advantages such as the following advantages (3-1) to (3-5) may be achieved. That is, according to the process in FIG. 1, the advantage (3-1) of information leakage suppression and the advantages (3-2) to (3-5) of reduction in the burden placed on users (and therefore suppression of reduced operation efficiency) may be achieved.

(3-1) Information leakage due to carelessness (so-called "careless mistake") is suppressed.

(3-2) The preliminary settings of an information leakage suppression policy are not involved. Therefore, a large burden is not placed on users, system administrators, or the like for setting the policy.

(3-3) A warning is issued only when execution of a process of providing access to a third party is actually instructed by a user. Therefore, users are not bothered about excessive generation of warnings.

(3-4) The origin of the file is automatically registered as a non-third party. In addition, the registration of a new non-third party, which is triggered by a permission input, is also performed automatically. Therefore, users do not have to go through any particular procedures to register a non-third party.

(3-5) There are no constraints on or no warnings regarding the exchange of a file between non-third parties. Therefore, users do not feel bothered or inconvenienced during the exchange of a file between non-third parties.

Figure 2:
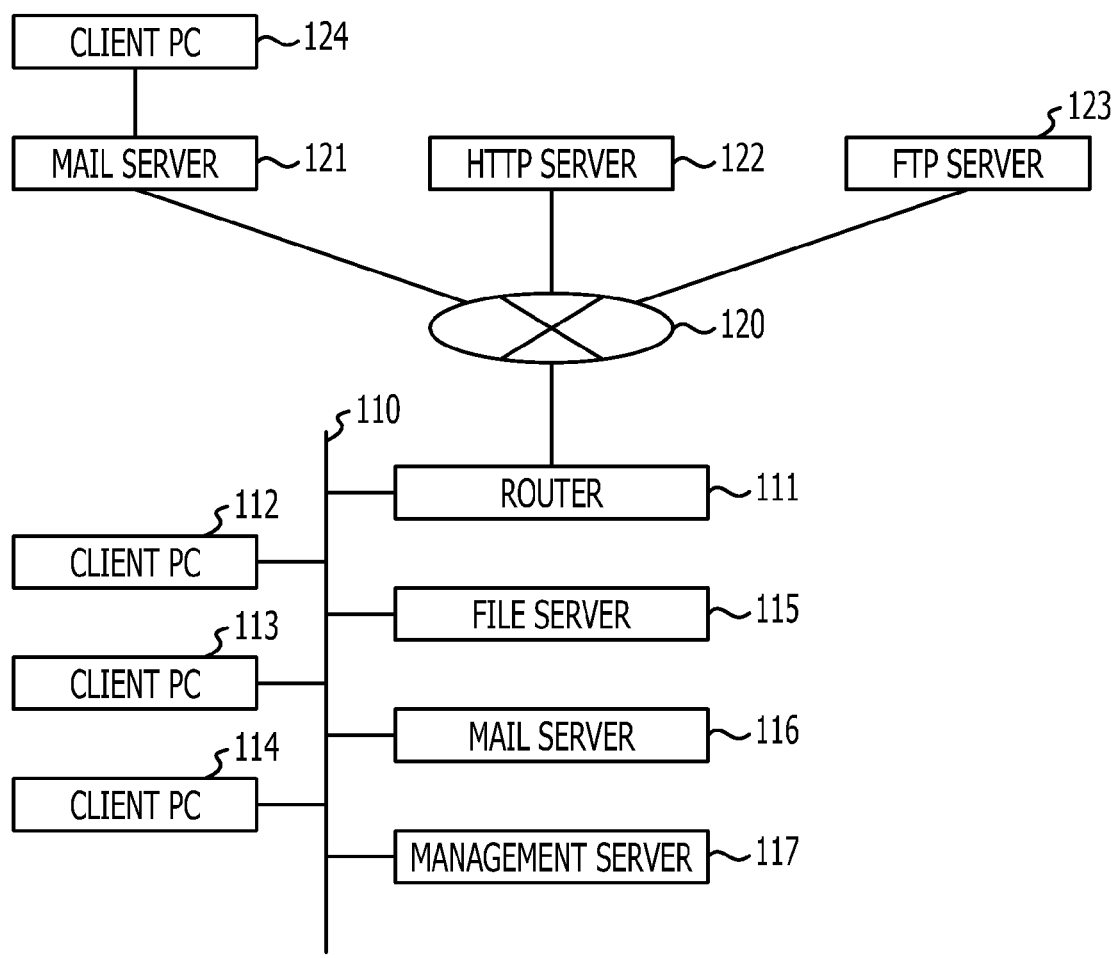
FIG. 2 is a diagram illustrating an exemplary network configuration.

Subsequently, an exemplary network configuration will be described with reference to FIG. 2. FIG. 2 illustrates, by way of example, a local area network (LAN) 110 and an external network 120 (for example, the Internet) to which the LAN 110 is connected.

FIG. 2 also illustrates a router 111 that connects the LAN 110 to the network 120, by way of example. The LAN 110 includes three client PCs 112 to 114, a file server 115, a mail server 116, and a management server 117.

Depending on the embodiment, the management server 117 may be omitted. A database (DB) for registering a non-third party in association with a file may be managed by the management server 117.

The client PCs 112 to 114 in the LAN 110 may access the DB via the management server 117. When the management server 117 is omitted, each of the client PCs 112 to 114 may locally hold a DB.

Alternatively, copies of some of entries included in the DB held in the management server 117 may be held in the client PCs 112 to 114. For example, the client PC 112 may hold a copy of an entry regarding a file saved in the client PC 112, and a copy of an entry regarding an electronic mail sent or received by the client PC 112.

Further, a mail server 121 different from the mail server 116, an HTTP server 122, and an FTP server 123 are connected to the network 120. A client PC 124 is also connected to the mail server 121 via a network such as another LAN (not illustrated).

Here, for convenience of description, for example, the following situations (4-1) to (4-6) are assumed:

(4-1) A file newly created in the client PC 112 includes confidential information. It is assumed that the user of the client PC 112 is in a position to know the confidential information with authorization.

(4-2) The user of the client PC 113 in the LAN 110 is not allowed to access the confidential information. A specific example of the situation (4-2) is a situation where "the LAN 110 is an intranet of a company and the user of the client PC 113 is not allowed to view the confidential information under the rules of the company".

(4-3) Also, the user of the client PC 124 outside the LAN 110 is not allowed to access the confidential information.

(4-4) A shared folder that the user of the client PC 113 also has the privilege to access exists on the file server 115.

(4-5) An arbitrary file on the HTTP server 122 may be downloaded by an arbitrary user.

(4-6) An arbitrary file on the FTP server 123 may be downloaded by an arbitrary user.

In the above situations (4-1) to (4-6), for example, when a process such as the following processes (5-1) to (5-5) is executed carelessly by the user of the client PC 112, the confidential information may be leaked.

(5-1) A process of attaching the file including confidential information in the situation (4-1) to an electronic mail addressed to the user of the client PC 113 and sending the electronic mail.

(5-2) A process of attaching the file including confidential information in the situation (4-1) to an electronic mail addressed to the user of the client PC 124 and sending the electronic mail.

(5-3) A process of moving or copying the file including confidential information in the situation (4-1) to the shared folder in the situation (4-4).

(5-4) A process of uploading the file including confidential information in the situation (4-1) to the HTTP server 122.

(5-5) A process of uploading the file including confidential information in the situation (4-1) to the FTP server 123.

That is, the processes (5-1) to (5-5) are processes that provide access to a third party and that may cause information leakage to occur. However, according to the process in FIG. 1, a warning is issued for the processes (5-1) to (5-5). Therefore, information leakage due to carelessness may be avoided.

Subsequently, a functional configuration of a system will be described with reference to a block diagram in FIG. 3. A system 200 in FIG. 3 may be a client-server system whose components are distributed to the client PCs 112 to 114 and the management server 117 in FIG. 2, the details of which will be described below. Alternatively, each of the client PCs 112 to 114 may implement the system 200 as a stand-alone system.

The system 200 includes a registration management unit 210, an execution control unit 220, a storage device 230, and an input device 240. The registration management unit 210 includes an origin recognition unit 211, a registration unit 212, a detection unit 213, and a determination unit 214, and the execution control unit 220 includes a warning unit 221, an input accepting unit 222, a permission unit 223, and a prohibition unit 224. The storage device 230 stores, in association with file identification information 231 identifying a file, non-third party identification information 232 identifying each of one or more non-third parties regarding the file.

The registration management unit 210 registers, as non-third party identification information 232, information identifying the origin of a file into the storage device 230 in association with file identification information 231 concerning the file.

Incidentally, a certain type of process provides access to a file from one or more third parties, which are not the non-third parties identified by the non-third party identification information 232 stored in the storage device 230 in association with file identification information 231 concerning the file. For convenience of description, a process that provides access to a file from a third party is referred to as a "specific process". The processes (5-1) to (5-5) are specific examples of the specific process.

When a specific input for instructing execution of a specific process and a permission input for permitting access to the file from the one or more third parties described above are given, the registration management unit 210 registers each of the one or more third parties described above into the storage device 230 as a non-third party regarding the file. The specific input and the permission input are inputs given from the user via the input device 240.

When both the specific input and the permission input are given, the execution control unit 220 permits execution of the specific process. However, when the specific input is given and the permission input is not given, the execution control unit 220 prohibits execution of the specific process.

The operations of the registration management unit 210 and the execution control unit 220 will be described in more detail hereinafter.

The origin recognition unit 211 recognizes the origin of the file. For example, the origin recognition unit 211 may recognize the origin based on an input from the input device 240.

In accordance with recognition of the origin by the origin recognition unit 211, in S101 in FIG. 1, the registration unit 212 registers, as the non-third party identification information 232, information identifying the origin into the storage device 230 in association with file identification information 231 concerning the file. The storage device 230 may also hold a DB including other pieces of information in addition to the file identification information 231 and the non-third party identification information 232. The registration unit 212 may also perform various processes for updating the DB, such as adding an entry to the DB, updating each individual entry in the DB, and deleting an entry from the DB.

The detection unit 213 detects an input from the user via the input device 240. Inputs from the user include a specific input for instructing execution of the specific process described above, and inputs for instructing execution of other processes. That is, the detection unit 213 detects an input to be determined in the decision node S103 in FIG. 1. In accordance with the input detected by the detection unit 213, the determination unit 214 determines whether or not the input detected by the detection unit 213 is the specific input described above.

Specifically, the determination unit 214 refers to the storage device 230 to determine "whether or not the input detected by the detection unit 213 is the specific input described above". The determination of the determination unit 214 corresponds to the decision node S107 in FIG. 1.

When the process whose execution is instructed by the input detected by the detection unit 213 is not a process of providing access to a file, it is apparent that the process instructed by the user is not the specific process described above. Thus, as illustrated in FIG. 1, the process instructed by the user is executed.

On the other hand, when the process whose execution is instructed by the input detected by the detection unit 213 is a process of providing access to a file, it is probable that the process whose execution has been instructed by the user is the specific process described above. Therefore, the determination unit 214 performs the following operation.

The determination unit 214 searches the storage device 230 using, as a search key, the file identification information 231 identifying a file on which the process whose execution is instructed by the input detected by the detection unit 213 is to be performed. Then, the determination unit 214 extracts the non-third party identification information 232 stored in association with the search key. As a consequence, no non-third party identification information 232 may be extracted, or non-third party identification information 232 concerning only one non-third party may be extracted. Alternatively, non-third party identification information 232 concerning a plurality of non-third parties may be extracted.

Here, for convenience of description, a target provided with access through the process whose execution is instructed by the input detected by the detection unit 213 is referred to as an "access-provided target". The number of access-provided targets is one or multiple. For example, the access-provided target may be a destination of an electronic mail, a user who is granted access privileges to a shared folder on the file server 115 in FIG. 2, or the HTTP server 122 or FTP server 123 in FIG. 2.

The determination unit 214 determines, for each of one or a plurality of access-provided targets, "whether or not the access-provided target is a non-third party identified by the extracted non-third party identification information 232". When the access-provided targets include one or more third parties, the determination unit 214 determines that "the input detected by the detection unit 213 is the specific input described above". On the other hand, when the access-provided targets include only non-third parties, the determination unit 214 determines that "the input detected by the detection unit 213 is not the specific input described above".

When the determination unit 214 determines that "the input detected by the detection unit 213 is the specific input described above", the determination unit 214 notifies the warning unit 221 that the specific input has been given. Then, as in S108 in FIG. 1, the warning unit 221 issues a warning.

Then, as in S109 in FIG. 1, the input accepting unit 222 accepts a permission input or a prohibition input as an input in response to the warning. The permission input and the prohibition input are inputs given from the user via the input device 240.

Further, the permission input is an input for permitting execution of the specific process, and is, in other words, an input for permitting all the third parties included in the access-provided targets (where the number of the third parties is one or multiple) to access the file on which the specific process is to be performed. On the other hand, the prohibition input is an input for prohibiting execution of the specific process, and is, in other words, an input for prohibiting all the third parties included in the access-provided targets from accessing the file on which the specific process is to be performed.

When the input accepting unit 222 accepts a permission input, the input accepting unit 222 notifies the registration unit 212 that the permission input has been given.

The permission input, as used here, not only means that "execution of the specific process has been permitted" but also means that "each of the third parties included in the access-provided targets may be regarded from now on as a non-third party regarding the file on which the specific process is to be performed". Therefore, as in S111 in FIG. 1, the registration unit 212 registers one or a plurality of new non-third parties into the storage device 230.

That is, the registration unit 212 registers non-third party identification information 232 identifying a new non-third party into the storage device 230 in association with file identification information 231 identifying the file on which the specific process is to be performed. Each new non-third party has been a third party so far, and specifically, a third party found from the access-provided targets by the determination unit 214 in the manner described above. Therefore, the registration unit 212 may acquire the non-third party identification information 232 identifying a non-third party to be newly registered from the determination unit 214.

When the input accepting unit 222 accepts a permission input, the input accepting unit 222 sends a notification to the permission unit 223. In addition, when the determination unit 214 determines that "the input detected by the detection unit 213 is not the specific input described above", the determination unit 214 also sends a notification to the permission unit 223.

Upon receiving a notification from the determination unit 214 or the input accepting unit 222, the permission unit 223 permits execution of the process whose execution is instructed by the input detected by the detection unit 213. Consequently, as in S104 or S106 in FIG. 1, the process instructed by the user is executed.

On the other hand, when the input accepting unit 222 accepts a prohibition input, the input accepting unit 222 sends a notification to the prohibition unit 224. Thus, the prohibition unit 224 prohibits execution of the specific process. Therefore, as illustrated in the process flow from the decision node S110 to the merge node S102 in FIG. 1, the specific process is not executed. Consequently, information leakage due to carelessness of the user may be avoided.

As described above, the system 200 in FIG. 3 that performs the above operation may be a stand-alone system or a client-server system.

When the system 200 is a stand-alone system, for example, the client PC 112 in FIG. 2 includes all the registration management unit 210, the execution control unit 220, the storage device 230, and the input device 240. The client PCs 113 and 114 also have configurations similar to the client PC 112. An example of the stand-alone system will be described in detail below in conjunction with the third embodiment.

When the system 200 is a client-server system, for example, the storage device 230 may be included in the management server 117. Each of the client PCs 112 to 114 may include the execution control unit 220 and the input device 240.

The components of the registration management unit 210 may be distributed to the management server 117 and the client PCs 112 to 114. For example, the management server 117 may include the registration unit 212 and the determination unit 214, and each of the client PCs 112 to 114 may include the origin recognition unit 211 and the detection unit 213.

Alternatively, the management server 117 may only provide the storage device 230 and a DB interface regarding a DB in the storage device 230. Each of the client PCs 112 to 114 may include the registration management unit 210. The registration unit 212 and the determination unit 214 in the registration management unit 210 access the DB in the storage device 230 via the DB interface provided by the management server 117, and perform operations such as adding an entry, deleting an entry, updating an entry, and referring to an entry.

Accordingly, the embodiment in which the management server 117 provides a DB interface while the registration unit 212 and the determination unit 214 are off-loaded into the client PCs 112 to 114 has an advantage that "because of the reduction in the processing load on the management server 117, the management server 117 may easily manage a large number of clients". This advantage will be described in detail hereinafter.

Client PCs in the LAN 110 are, in other words, client PCs to be managed by the management server 117 for information leakage suppression. Therefore, in a situation where a large number of client PCs exist in the LAN 110 in FIG. 2, when one management server 117 serves as the registration unit 212 and the determination unit 214 and performs processes for each client PC, such as registration and determination, a large load is placed on the management server 117.

Thus, when the LAN 110 includes a large number of client PCs, the functions of the registration unit 212 and the determination unit 214 are preferably off-loaded into each client PC. In this case, the management server 117 may merely provide a DB interface, and no problems occur when a large number of client PCs exist. In the first and second embodiments described in detail below, a description will be made mainly of a case where the system 200 is configured as a client-server system in which the management server 117 provides only a DB interface.

Subsequently, a hardware configuration of a computer will be described with reference to FIG. 4. Each of the client PCs 112 to 114, the file server 115, the mail server 116, the management server 117, the mail server 121, the HTTP server 122, the FTP server 123, and the client PC 124 in FIG. 2 may be a computer such as that illustrated in FIG. 4.

Figure 4:
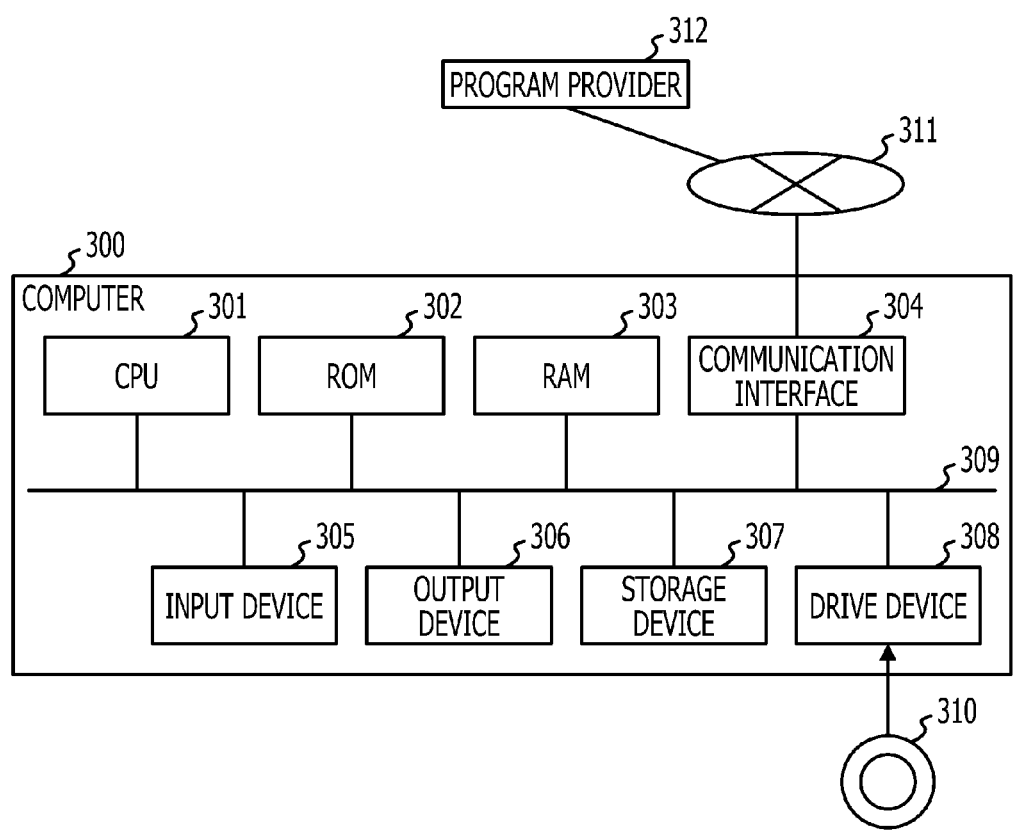
FIG. 4 is a diagram illustrating a hardware configuration of a computer.

A computer 300 in FIG. 4 includes a central processing unit (CPU) 301, a read only memory (ROM) 302, a random access memory (RAM) 303, and a communication interface 304. The computer 300 further includes an input device 305, an output device 306, a storage device 307, and a drive device 308 for a recording medium 310. The components in the computer 300 are connected to one another via a bus 309. Further, the computer 300 is connected to a network 311 via the communication interface 304.

In FIG. 4, the input device 305, the output device 306, the storage device 307, and the drive device 308 are illustrated to be included in the block of the computer 300. However, it is to be understood that the input device 305, the output device 306, the storage device 307, and the drive device 308 may be external devices which are connected to the computer 300.

The CPU 301 loads a program into the RAM 303, and executes the program while also using the RAM 303 as a working area. The program may be stored in the ROM 302 or the storage device 307 in advance. The storage device 307 may be, for example, a hard disk device.

Alternatively, the program may also be provided by a program provider 312, downloaded into the computer 300 via the network 311 and the communication interface 304, and stored in the storage device 307. The program provider 312 is, for example, a computer other than the computer 300.

The program may also be stored in a computer-readable portable recording medium 310 and provided. The program is read by the drive device 308 from the recording medium 310 set in the drive device 308. The read program may be loaded into the RAM 303 after being copied first into the storage device 307, or may be loaded directly into the RAM 303. An optical disc such as a compact disc (CD) or a digital versatile disc (DVD), a magneto-optical disc, a magnetic disc, or a non-volatile semiconductor memory card may be available as the recording medium 310, by way of example.

The communication interface 304 may be a wired LAN interface device, a wireless LAN interface device, or a combination thereof. The input device 305 may be, for example, a keyboard, a pointing device such as a mouse or a touch screen, a microphone, or a combination thereof. The output device 306 may be, for example, a display, a speaker, or a combination thereof. The display may be a touch screen.

The ROM 302, the RAM 303, the storage device 307, and the recording medium 310 are examples of computer-readable recording media. Such computer-readable recording media are tangible recording media and are not a transitory media such as signal carriers.

A description of the relationship between FIGS. 3 and 4 will be given below.

Figure 3:
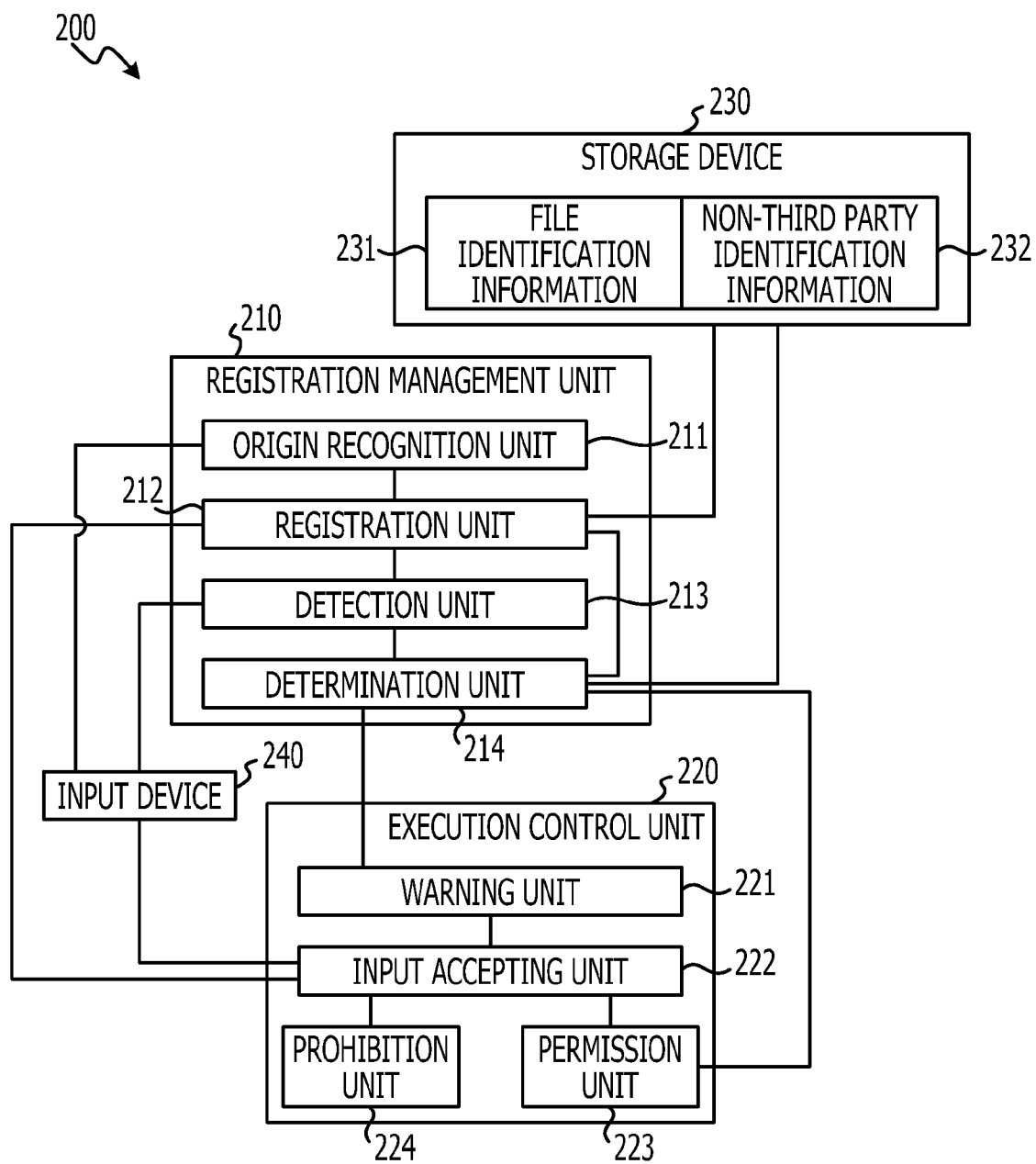
FIG. 3 is a block diagram illustrating a functional configuration of a system.

The registration management unit 210 illustrated in FIG. 3 may be implemented by the CPU 301 that executes a program. When the system 200 is a client-server system, the communication interface 304 may further be used to implement the registration management unit 210.

For example, the origin recognition unit 211 and the detection unit 213 may be implemented by the CPU 301 of each of the client PCs 112 to 114.

In addition, the registration unit 212 and the determination unit 214 access the storage device 230 via the DB interface provided by the management server 117. Thus, the registration unit 212 and the determination unit 214 may be implemented by the CPU 301 and the communication interface 304 of each of the client PCs 112 to 114. The CPU 301 executes a program for implementing the registration unit 212 and the determination unit 214, and the communication interface 304 communicates with the management server 117 under control of the CPU 301.

The warning unit 221 may be implemented by the CPU 301 that executes a program and the output device 306 that outputs either of or both a visual warning and an audio warning in each of the client PCs 112 to 114.

In addition, the input accepting unit 222 may be implemented by the CPU 301 that accepts an input from the input device 305 and that operates in accordance with a program. When the system 200 in FIG. 3 is not a stand-alone system, the input accepting unit 222 may be implemented by further using the communication interface 304 of each of the client PCs 112 to 114.

The permission unit 223 and the prohibition unit 224 may be implemented by the CPU 301 that executes a program in each of the client PCs 112 to 114.

When the storage device 230 is included in the management server 117, the storage device 230 may be the storage device 307 in the management server 117. On the contrary, for example, when the storage device 230 is included in the client PC 112, the storage device 230 may be the storage device 307 in the client PC 112. The input device 240 in FIG. 3, which is included in each of the client PCs 112 to 114, may be the input device 305 in FIG. 4, which is included in the corresponding one of the client PCs 112 to 114.

Subsequently, the first embodiment regarding suppression of information leakage through attached files in electronic mails will be described with reference to FIGS. 5 to 13. The first embodiment is an example when the system 200 in FIG. 3 is a client-server system. Specifically, in the first embodiment, the management server 117 in FIG. 2 includes the following components (6-1) to (6-2):

(6-1) The storage device 230 in FIG. 3 (more specifically, the storage device 307 in FIG. 4 that holds a management DB 400 in FIGS. 6 to 8 described below).

(6-2) A DB interface that accepts a DB access request to the DB on the storage device 230 from the registration unit 212 and the determination unit 214 in FIG. 3 and that responds to the DB access request.

For example, the DB interface (6-2) may be implemented by the CPU 301 that executes a program and by the communication interface 304. The CPU 301 that operates in accordance with a program accepts a DB access request via the communication interface 304, accesses the DB on the storage device 307 in accordance with the DB access request, and returns a DB access result via the communication interface 304.

In the first embodiment, each of the client PCs 112 to 114 in FIG. 2 includes the following components (7-1) to (7-6) among the blocks illustrated in FIG. 3.

(7-1) The origin recognition unit 211.
(7-2) The registration unit 212 that updates the DB on the storage device 230 via the DB interface (6-2).
(7-3) The detection unit 213.
(7-4) The determination unit 214 that refers to the DB on the storage device 230 via the DB interface (6-2) to perform determination.
(7-5) The execution control unit 220.
(7-6) The input device 240.

In the following, for convenience of description, each flowchart will be described in the context of one of the client PCs 112 to 114 selected in accordance with the situation. However, it is to be understood that the other two client PCs perform similar processing as desired.

Figure 5:
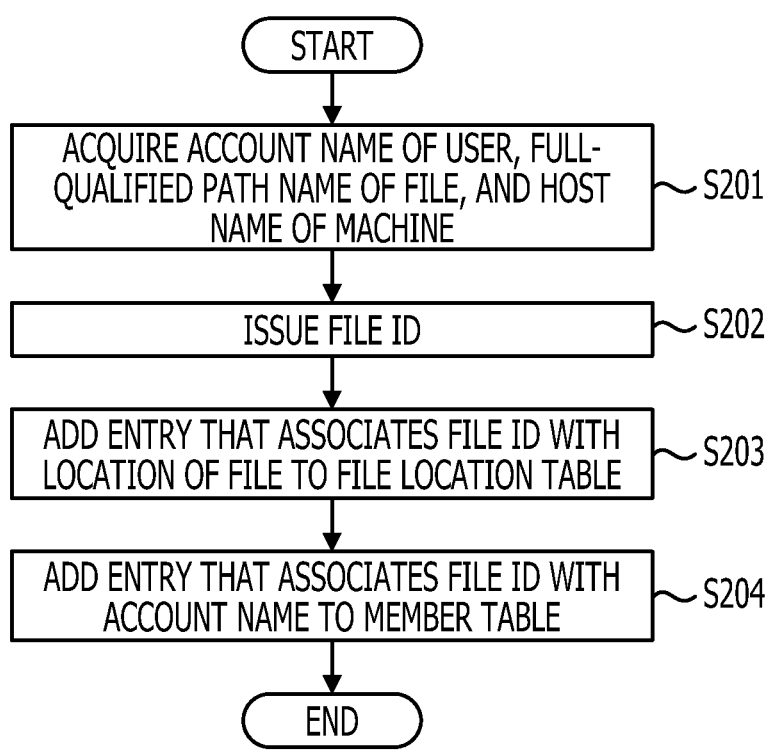
FIG. 5 is a flowchart of an origin registration process performed when a file is generated.

FIG. 5 is a flowchart of an origin registration process performed when a file is generated. In FIG. 5, for convenience of description, a file is generated in the client PC 112, by way of example.

The origin registration process in FIG. 5 is a process in which the origin recognition unit 211 recognizes, as the origin of a generated file, a user who is currently logged in to the client PC 112 and in which the registration unit 212 registers the origin into the storage device 230 in accordance with the recognition of the origin recognition unit 211. That is, the origin registration process in FIG. 5 is an example of the processing of S101 in FIG. 1.

Specifically, the origin registration process in FIG. 5 is executed when a new file is generated on the client PC 112. For example, when the following operations (8-1) to (8-2) are performed, the origin recognition unit 211 detects the saving operation (8-2) as a trigger to start the origin registration process. Upon detecting the trigger, the origin recognition unit 211 starts the origin registration process.

(8-1) It is assumed that the user of the client PC 112 creates a new file using a process according to certain application software and edits the new file as appropriate.

(8-2) It is assumed that, after that, the user selects a "save" menu and saves the new file in the storage device 307 of the client PC 112.

Depending on the application software, the generation of a file on the storage device 307 using the saving operation (8-2) is performed via, for example, an Application Programming Interface (API) function provided by an operating system (OS). In this case, the origin recognition unit 211 may detect a trigger to start the process in FIG. 5 by hooking a call to a predetermined API function that is used to generate a file.

When the process in FIG. 5 starts, first, in S201, the origin recognition unit 211 acquires the following pieces of information (9-1) to (9-3):

(9-1) The account name of a user who has instructed generation of a file. That is, the account name of a user who is currently logged in to the client PC 112.

(9-2) The fully-qualified path name (i.e., absolute path name) of the generated file. For convenience of description, it is assumed that a notation that starts with the drive letter, such as "C:\dir1\dir2\file.txt", is used although notation of a fully-qualified path name differs depending on the OS.

(9-3) The host name of a machine in which the file has been generated. That is, the host name uniquely identifying the client PC 112 in the LAN 110. Other identification information may be used instead of the host name (for example, when the client PC 112 is to be assigned a fixed IP address, the IP address of the client PC 112 may be used instead of the host name).

Then, in S202, the origin recognition unit 211 issues a file identifier (ID) corresponding to the generated file. The file ID is unique in the LAN 110 to be managed by the management server 117. For example, the origin recognition unit 211 of the client PC 112 may generate a file ID unique in the LAN 110 by using the host name of the client PC 112 in combination with a sequence number unique in the client PC 112. It is to be understood that, depending on the embodiment, the origin recognition unit 211 may request the management server 117 to issue a file ID unique in the LAN 110, and acquire the file ID from the management server 117.

Subsequently, in S203, an entry that associates the file ID generated in S202 with the location of the file represented by the pair of pieces of information (9-3) and (9-2) is added to a file location table 402 in FIG. 6. In S204, an entry that associates the file ID generated in S202 with the account name (9-1) is added to a member table 401 in FIG. 6. Thus, the origin registration process in FIG. 5 ends.

Here, a specific example of the tables used in S203 and S204 will be described with reference to FIGS. 6 to 8. Subsequently, the details of S203 and S204 will be described with reference again to FIG. 5.

Figure 6:
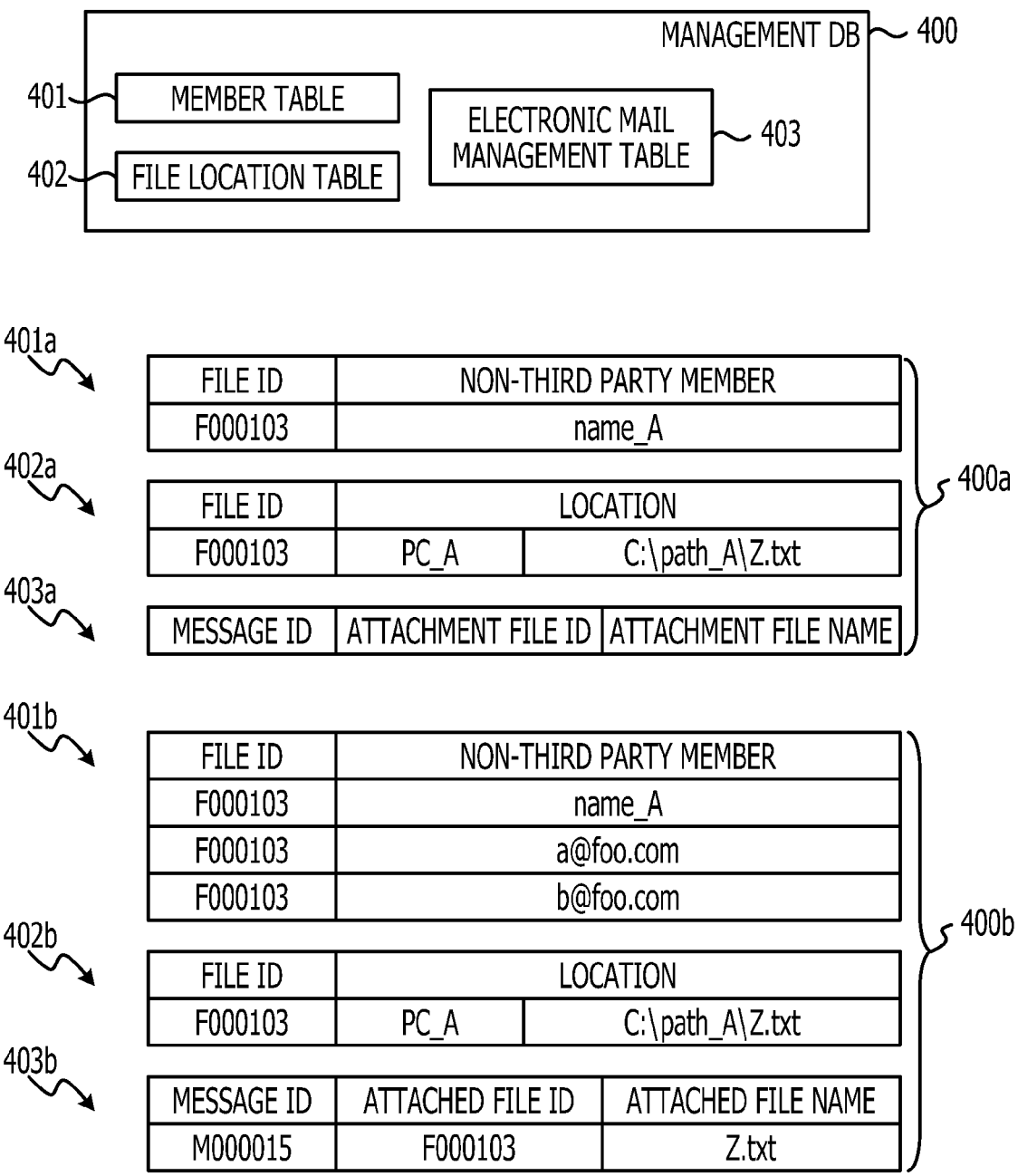
FIG. 6 is a diagram illustrating examples of a management DB.
Figure 7:
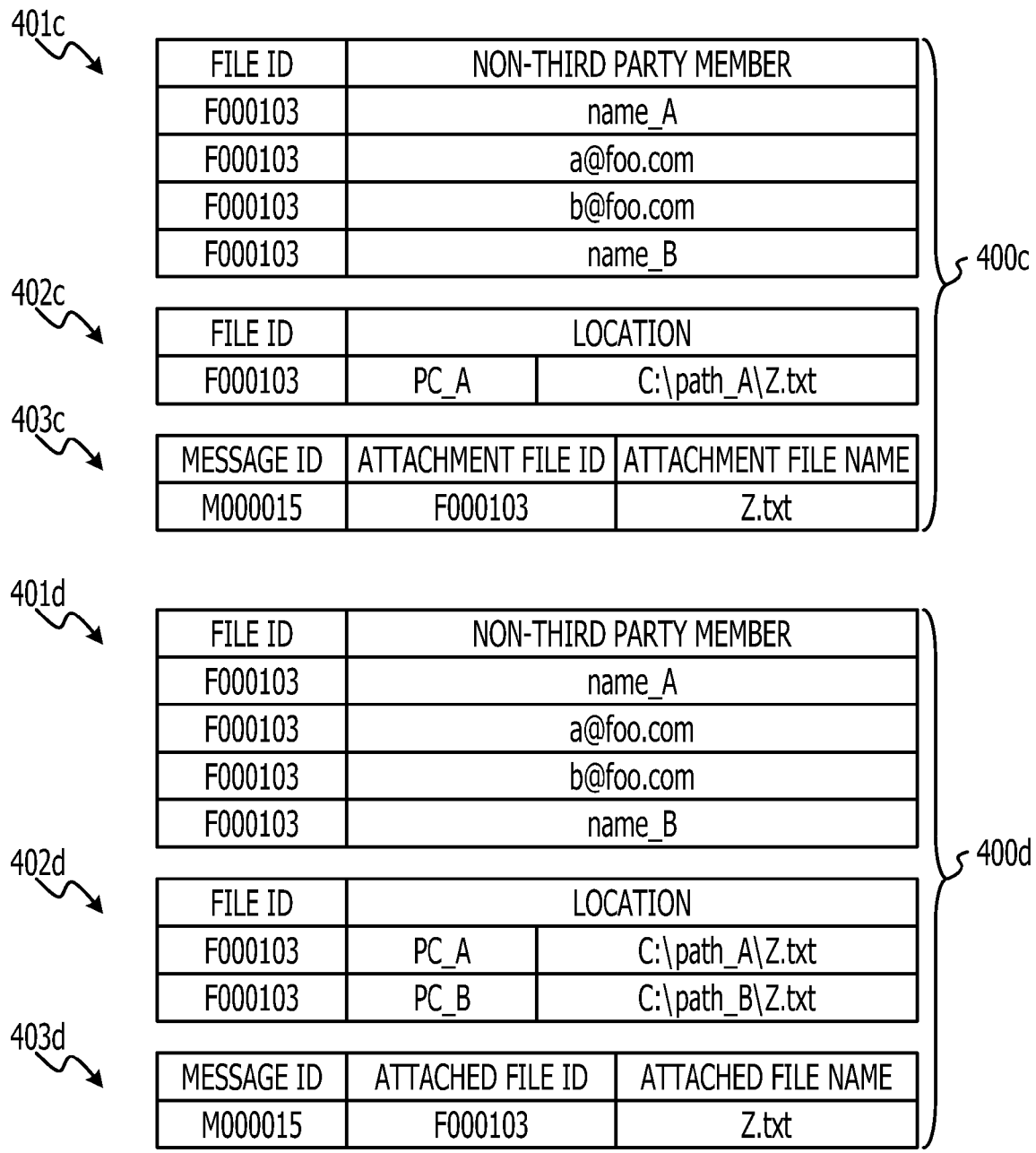
FIG. 7 is a diagram illustrating examples of a management DB.

FIGS. 6 to 8 illustrate examples of a management DB 400. The management DB 400 in FIG. 6 is a DB held in the storage device 230 in FIG. 3, and specifically includes the member table 401, the file location table 402, and an electronic mail management table 403. In the first embodiment, as described above, the storage device 230 in FIG. 3 is specifically the storage device 307 of the management server 117. Thus, the management DB 400 is also stored in the storage device 307 of the management server 117.

The content of each table in the management DB 400 changes as an event occurs. In FIGS. 6 to 8 and FIG. 15, reference numerals with suffixes such as "400a" and "400b" distinctly represent the same DB (or the same table) at different times. Specifically, management DBs 400a to 400g are distinct examples of the management DB 400. Member tables 401a to 401g are distinct examples of the member table 401. File location tables 402a to 402g are distinct examples of the file location table 402. Electronic mail management tables 403a to 403g are distinct examples of the electronic mail management table 403. In FIGS. 6 to 8, the management DB 400 at five different times is illustrated by way of example, and the details of the five examples will be described below in conjunction with flowcharts. Here, a description will be first given of the configuration of each table in the management DB 400.

Each entry in the member table 401 associates a file ID with information (i.e., the non-third party identification information 232 in FIG. 3) identifying a non-third party regarding the file identified by the file ID. In FIGS. 6 to 8, the header name "non-third party member" is given to a column indicating the non-third party identification information 232. The file ID is an example of the file identification information 231 in FIG. 3.

Each entry in the file location table 402 associates a file ID with location information indicating the location of the file identified by the file ID. The location information is a combination of, for example, a host name and a fully-qualified path name of the file within the machine identified by the host name. In FIGS. 6 to 8, the header name "location" is given to a column indicating the location information.

Each entry in the electronic mail management table 403 associates a message ID uniquely identifying an electronic mail, a file ID of a file attached to the electronic mail, and a file name of the attached file with one another. The message ID may be, for example, the value of the "Message-ID" header field of the electronic mail.

Referring again to FIG. 5, the details of S203 and S204 in FIG. 5 will be described in conjunction with the specific example in FIG. 6.

For example, it is assumed that before the origin registration process in FIG. 5 is started, each of the member table 401, the file location table 402, and the electronic mail management table 403 is in an initial state where no entries are included. It is also assumed that the account name "name_A", the fully-qualified path name "C:\path_A\Z.txt", and the host name "PC_A" have been obtained in S201.

The file ID issued in S202 may be represented using a combination of, for example, as described above, a host name and a sequence number. In the following, however, for convenience of description, it is assumed that a file ID "F000103" has been issued.

Then, in S203, specifically, the origin recognition unit 211 in the client PC 112 requests the registration unit 212 in the client PC 112 to add an entry to the file location table 402. Along with the request, the origin recognition unit 211 sends the file ID "F000103", the host name "PC_A", and the fully-qualified path name "C:\path_A\Z.txt" to the registration unit 212.

Thus, the registration unit 212 in the client PC 112 adds an entry to the file location table 402 via the DB interface in the management server 117. Specifically, the registration unit 212 adds a new entry that associates location information indicated by a pair of the host name "PC_A" and the fully-qualified path name "C:\path_A\Z.txt" with the file ID "F000103" to the file location table 402.

In this way, the location of the generated new file is registered in the file location table 402. The file location table 402a in FIG. 6 includes one entry added in S203 in the above way.

In S204, specifically, the origin recognition unit 211 in the client PC 112 requests the registration unit 212 in the client PC 112 to add an entry to the member table 401. Along with the request, the origin recognition unit 211 sends the file ID "F000103" and the account name "name_A" to the registration unit 212.

The registration unit 212 in the client PC 112 adds an entry to the member table 401 via the DB interface in the management server 117. Specifically, the registration unit 212 adds a new entry that associates the account name "name_A" with the file ID "F000103" to the member table 401.

That is, in S204, in the above manner, the registration unit 212 of the client PC 112 registers the user who has instructed generation of a file as a non-third party regarding the generated file. The member table 401a in FIG. 6 includes one entry added in S204 in the above way.

A management DB 400a in FIG. 6 is an example of the management DB 400 at the time when the origin registration process in FIG. 5 is completed in the above way. As is apparent from the foregoing description, in FIG. 5, S201 and S202 may be executed in reverse order, or S201 and S202 may be executed in parallel. Further, S203 and S204 may be executed in reverse order, and S203 and S204 may be executed in parallel.

Figure 9:
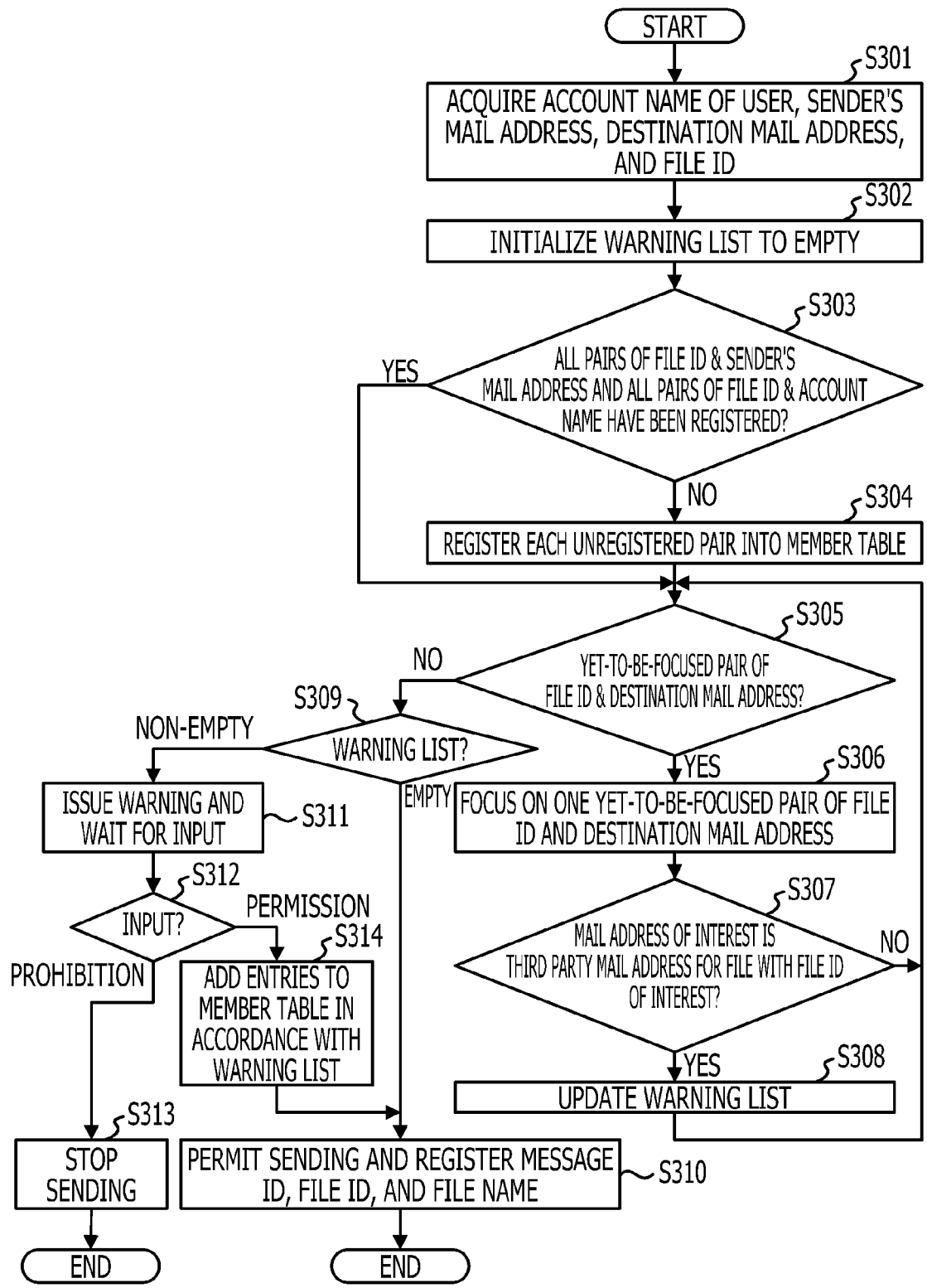
FIG. 9 is a flowchart of a sending confirmation process executed when a new electronic mail with an attached file is sent or when a received electronic mail with an attached file is forwarded.

Subsequently, a process corresponding to a specific example of the processing of S103 to S111 in FIG. 1 will be described with reference to FIG. 9. FIG. 9 is a flowchart of a sending confirmation process executed when a new electronic mail with an attached file is sent or when a received electronic mail with an attached file is forwarded.

Also in FIG. 9, for convenience of description, a process performed in the client PC 112 will be described, by way of example. Specifically, the sending confirmation process in FIG. 9 is started in the following case (10-1) or (10-2):

(10-1) The user of the client PC 112 performs an operation for creating a new electronic mail with one or more attached files on a mail user agent (which is implemented by executing an electronic mail client software) and sending the created new electronic mail. For example, the user clicks a "send" button.

(10-2) The user of the client PC 112 performs an operation for forwarding a received electronic mail with an attached file on a mail user agent. For example, the user clicks a "forward" button.

For example, when the detection unit 213 detects an input for clicking the "send" button, the determination unit 214 determines whether or not an electronic mail to be newly sent has one or more files attached. When one or more files are attached, the determination unit 214 starts the sending confirmation process in FIG. 9. When no files are attached, the determination unit 214 sends a notification to the permission unit 223, and the permission unit 223 permits the new electronic mail to be sent.

When the detection unit 213 detects an input for clicking the "forward" button, the determination unit 214 determines whether or not an electronic mail to be forwarded has one or more files attached. When one or more files are attached, the determination unit 214 starts the sending confirmation process in FIG. 9. When no files are attached, the determination unit 214 sends a notification to the permission unit 223, and the permission unit 223 permits the electronic mail to be forwarded.

The detection unit 213 may perform detection by using, for example, a hook prepared in advance in the mail user agent. The detection of a trigger to start the process in FIG. 9 by the detection unit 213 corresponds to the transition from S103 to S107 in FIG. 1.

When the process in FIG. 9 starts, first, in S301, the determination unit 214 acquires the following pieces of information (11-1) to (11-4):

(11-1) The account name of the user who has instructed the new sending or forwarding of an electronic mail.
(11-2) The sender's electronic mail address.
(11-3) The destination electronic mail address.
(11-4) The file ID of each attached file.

The determination unit 214 may acquire the account name (11-1) (i.e., the account name of a user who is currently logged in to the client PC 112) via, for example, the system function prepared in advance by the OS.

Further, the determination unit 214 acquires the addresses (11-2) and (11-3) via the mail user agent.

In the process in FIG. 9, in addition to the address specified in the "To" header field of the electronic mail, the electronic mail address specified in the "CC (Carbon Copy)" header field is also a destination electronic mail address. Additionally, the electronic mail address specified in the "BCC (Blind Carbon Copy)" header field is also a destination electronic mail address. Therefore, the determination unit 214 acquires one or more destination electronic mail addresses.

The determination unit 214 further acquires the file ID (11-4) of each attached file specifically in the following way:

As in the case (10-1) described above, when a new electronic mail is to be sent, the determination unit 214 searches the file location table 402 using, as search keys, the host name of the client PC 112 and the fully-qualified path name indicating the location of the attached file in the client PC 112. The determination unit 214 may acquire the host name via, for example, the system function or the like provided by the OS. The determination unit 214 may acquire the fully-qualified path name via the mail user agent.

As a result of search, one entry is found. This is because when a file generated on the client PC 112 is attached, the entry of the file has already been added to the file location table 402 through the process in FIG. 5.

In addition, an entry is also found when a file attached to another electronic mail previously received by the client PC 112 is first saved locally in the client PC 112 and is attached to the new electronic mail later. This is because the entry of the file has already been added to the file location table 402 through a process in FIG. 11 described below.

Accordingly, the determination unit 214 may acquire the file ID by reading the file ID from the found entry. Further, the determination unit 214 stores a correspondence relationship between the file name and the file ID for the processing of S308 described below.

In contrast, as in the case (10-2), when an electronic mail is to be forwarded, the determination unit 214 searches the electronic mail management table 403 using, as search keys, the message ID of the electronic mail to be forwarded by the user and the file name of the attached file. The determination unit 214 may acquire the message ID and the file name via the mail user agent.

As a result of search, one entry is found. This is because when the electronic mail to be forwarded by the user is an electronic mail sent from within the LAN 110, the entry of the file has been added to the electronic mail management table 403 through the process in FIG. 9 executed by the sender client PC. When the sender of the electronic mail to be forwarded by the user is outside the LAN 110, the client PC 112 has executed a process in FIG. 10 described below in response to the electronic mail previously received at the client PC 112. The entry of the file has already been added to the electronic mail management table 403 through the process in FIG. 10.

In this way, regardless of whether the sender of the electronic mail to be forwarded by the user is inside or outside the LAN 110, the determination unit 214 finds one entry from the electronic mail management table 403 as a result of search. Therefore, in the case (10-2), as in the case (10-1), the determination unit 214 may acquire the file ID by reading the file ID from the found entry. Further, the determination unit 214 stores a correspondence relationship between the file name and the file ID for the processing of S308 described below.

When the determination unit 214 acquires the pieces of information (11-1) to (11-4) in S301 in the above way, then in S302, the determination unit 214 initializes a "warning list" to empty. The warning list is an example of information to be used by the determination unit 214 to perform determination in S107 in FIG. 1.

Then, in S303, the determination unit 214 determines whether or not each of the following pairs (12-1) and each of the following pairs (12-2) have been registered in the member table 401.

(12-1) A pair of each file ID acquired in S301 and the sender's electronic mail address acquired in S301.
(12-2) A pair of each file ID acquired in S301 and the account name acquired in S301.

For convenience of description, it is assumed that N files (N≥1) are attached to the electronic mail. In this case, there are N pairs of a file ID and a sender's electronic mail address, and N pairs of a file ID and an account name. Thus, the determination unit 214 determines whether or not all of 2N pairs in total have been registered in the member table 401.

When there is a pair that has not been registered in the member table 401, the process proceeds to S304. Conversely, when all the 2N pairs have been registered in the member table 401, the process proceeds to S305.

In S304, the determination unit 214 registers each unregistered pair into the member table 401. The processing of S304 is a process of registering an apparent non-third party to suppress the wasteful generation of warnings to consequently reduce the burden placed on the user.

For example, it is assumed that there is one attached file and that the file ID of the attached file is "F000103" given in the file location table 402a in FIG. 6. It is also assumed that the account name and the sender's electronic mail address obtained in S301 are "name_A" and "a@foo.com", respectively.

In this case, according to the member table 401a in FIG. 6, the pair of the file ID "F000103" and the account name "name_A" has been registered. However, the pair of the file ID "F000103" and the sender's electronic mail address "a@foo.com" has not been registered. Thus, in S304, the determination unit 214 adds an entry corresponding to the pair of the file ID "F000103" and the sender's electronic mail address "a@foo.com" to the member table 401.

When there are two or more unregistered pairs, the determination unit 214 adds an entry corresponding to each pair to the member table 401 in a similar manner. Then, the process proceeds to S305.

In S305, the determination unit 214 determines whether or not a yet-to-be-focused pair of a file ID and a destination electronic mail address remains.

Here, for convenience of description, it is assumed that the number of destination electronic mail addresses (11-3) acquired in S301 is M (M≥1). Since N≥1 and M≥1, MN≥1. That is, there are MN pairs of a file ID and a destination electronic mail address.

Therefore, in S305, the determination unit 214 determines whether or not a pair that has not been focused on as a target to be processed in S306 to S308 remains among the MN pairs.

When a yet-to-be-focused pair remains, the process proceeds to S306. Conversely, when all the MN pairs have been focused on, the process proceeds to S309.

In S306, the determination unit 214 focuses on one yet-to-be-focused pair of a file ID and a destination electronic mail address. Hereinafter, for convenience of description, a file ID and a destination electronic mail address in the pair focused on in S306 are referred to as the "file ID of interest" and the "electronic mail address of interest", respectively.

Then, in S307, the determination unit 214 determines whether or not the electronic mail address of interest is a third party electronic mail address for the file identified by the file ID of interest. Specifically, the determination unit 214 searches the member table 401 for an entry that associates the file ID of interest with the electronic mail address of interest.

When an entry is found as a result of search, the electronic mail address of interest is a non-third party electronic mail address for the file identified by the file ID of interest. That is, no information leakage occurs through the file sent to the electronic mail address of interest. Thus, the process returns to S305.

Conversely, when no entries are found as a result of search in S307, the electronic mail address of interest is a third parry electronic mail address for the file identified by the file ID of interest. That is, it is probable that information leakage will occur through the file sent to the electronic mail address of interest. Thus, the process proceeds to S308 to provide a warning.

In S308, the determination unit 214 updates the warning list. Specifically, the determination unit 214 adds to the warning list a set of three items including the file ID of interest, the file name corresponding to the file ID of interest, and the electronic mail address of interest. As described above, in S301, the determination unit 214 stores a correspondence relationship between the file name of an attached file and the file ID of the attached file during the acquisition of the file ID. Thus, the determination unit 214 has recognized the file name corresponding to the file ID of interest, and, in S308, the determination unit 214 may therefore add an item to the warning list in the manner described above. After the warning list has been updated, the process returns to S305.

On the other hand, after all the MN pairs of a file ID and a destination electronic mail address have been focused on, in S309, the determination unit 214 determines whether or not the warning list is empty.

When the warning list is empty, that is, when each of the M destination electronic mail addresses is a non-third party electronic mail address for all the N attached files, there is no risk of information leakage. In other words, even when a new electronic mail is sent (or when a received electronic mail is forwarded), access to any attached file is not provided to a third party.

Thus, the determination unit 214 notifies the permission unit 223 and the registration unit 212 that there is no information leakage to third parties, and then the process proceeds to S310. The transition from S309 to S310 corresponds to the link from S107 to S105 in FIG. 1.

Conversely, when the warning list is non-empty, that is, when sending a new electronic mail or forwarding a received electronic mail makes at least one attached file in the electronic mail accessible from a third party, there is a risk of information leakage.

Thus, the determination unit 214 outputs the warning list to the warning unit 221, and the process proceeds to S311. The transition from S309 to S311 corresponds to the link from S107 to S108 in FIG. 1.

In S310, the permission unit 223 permits an electronic mail to be sent (i.e., a new electronic mail to be sent or a received electronic mail to be forwarded). Thus, the electronic mail is sent via the mail user agent.

Further, when sending the electronic mail, the mail user agent assigns a new message ID to the electronic mail. Thus, in S310, the registration unit 212 reads the assigned new message ID.

Then, the registration unit 212 registers, for each attached file, a set of three items including the message ID, the file ID, and the file name, into the electronic mail management table 403. The registration unit 212 may acquire information indicating a correspondence relationship between the file name and the file ID of an attached file from the determination unit 214. Then, the process in FIG. 9 ends.

Meanwhile, in S311, the warning unit 221 issues a warning in accordance with the warning list received from the determination unit 214. For example, when the warning list includes four sets of three items including a file ID, a file name, and a destination electronic mail address, the warning unit 221 may display dialogs including the following dialogs (13-1) to (13-3) on a screen of the client PC 112:

(13-1) A warning message such as "Information leakage to a third party may occur with the following four sets. Do you really want to send this electronic mail?"

(13-2) A pair of a file name and a destination electronic mail address that are associated with each other in each set of three items included in the warning list.

(13-3) A "Yes" button and a "No" button for accepting an input in response to the warning message.

The dialogs (13-1) to (13-3) given above are merely examples of a graphical user interface (GUI) for a warning. Any other GUI may be used. It is to be understood that the warning unit 221 may issue an audio warning.

In addition to the issuance of a warning, the warning unit 221 instructs the input accepting unit 222 to accept an input from the input device 240 in response to the warning. Then, in S311, the input accepting unit 222 waits for an input (for example, a click of the "Yes" button or the "No" button in the example of the dialog (13-3)) to be received from the input device 240.

When the input accepting unit 222 accepts an input from the input device 240 in response to the warning, the process proceeds to S312. Then, in S312, the input accepting unit 222 determines whether the accepted input is a permission input or a prohibition input.

When the input accepting unit 222 accepts a prohibition input, the input accepting unit 222 sends a notification to the prohibition unit 224. Then, the process proceeds to S313.

Conversely, when the input accepting unit 222 accepts a permission input, the input accepting unit 222 notifies the permission unit 223 and the registration unit 212 that there is no information leakage to third parties. Then, the process proceeds to S314.

In S313, the prohibition unit 224 stops sending an electronic mail (specifically, sending a new electronic mail or forwarding a received electronic mail). That is, the prohibition unit 224 prohibits an electronic mail from being sent via the mail user agent. Specifically, the prohibition unit 224 may prohibit an electronic mail from being sent by, for example, canceling the input given from the user to the mail user agent. Then, the process in FIG. 9 ends.

On the other hand, in S314, the registration unit 212 acquires a warning list from the determination unit 214, and adds entries to the member table 401 in accordance with the warning list. Specifically, the registration unit 212 registers, for each set of three items included in the warning list (i.e., each set of three items including a file ID, a file name, and a destination electronic mail address), a pair of a file ID and a destination electronic mail address that are associated with each other in the set of three items into the member table 401. The registration of a new non-third party into the member table 401 in S314 is a specific example of registration in S111 in FIG. 1.

For example, when the warning list includes four sets of three items, in S314, the registration unit 212 adds the four entries to the member table 401. After the member table 401 has been updated, the process proceeds to S310.

According to the process in FIG. 9, a situation where "a file is attached to an electronic mail addressed to a third party due to the carelessness of a user, and the electronic mail is sent, resulting in information leakage occurring" may be avoided. According to the process in FIG. 9, furthermore, no warnings are issued for an electronic mail to be sent to only one or a plurality of non-third parties. Therefore, a situation where "excessive generation of warnings reduces users' operation efficiency" may also be avoided.

A management DB 400b in FIG. 6 is an example of the management DB 400 after the process in FIG. 9 has been completed in a case under the following assumptions (14-1) to (14-9):

(14-1) It is assumed that the process in FIG. 9 starts in response to a trigger event that the user having the account name "name_A" is to send a new electronic mail.

(14-2) It is assumed that the management DB 400 is in the state of the management DB 400a in FIG. 6 when the process in FIG. 9 is started.

(14-3) It is assumed that a new electronic mail has only a file attached whose location is given in the file location table 402a in FIG. 6 but no other files attached.

(14-4) It is assumed that the new electronic mail has the sender's electronic mail address "a@foo.com".

(14-5) It is assumed that the new electronic mail has only one destination electronic mail address "b@foo.com".

(14-6) From (14-1) to (14-4) described above, in S304 in FIG. 9, an entry that associates a file ID "F000103" with the sender's electronic mail address "a@foo.com" is added to the member table 401.

(14-7) From (14-2), (14-3), and (14-5) described above, in S311 in FIG. 9, a warning is issued for a combination of the attached file having a file name "Z.txt" and the destination electronic mail address "b@foo.com".

(14-8) It is assumed that a permission input is given in response to the warning. As a result, in S314, an entry that associates the file ID "F000103" with the destination electronic mail address "b@foo.com" is added to the member table 401.

(14-9) It is assumed that, in S310, an electronic mail permitted to be sent is assigned the message ID "M000015". As a result, in S310, an entry that associates the message ID "M000015" with the file ID "F000103" is added to the electronic mail management table 403. Then, the process in FIG. 9 ends.

In the case under the assumptions (14-1) to (14-9) described above, the management DB 400 changes from the state of the management DB 400a in FIG. 6 to the state of the management DB 400b in FIG. 6.

Figure 10:
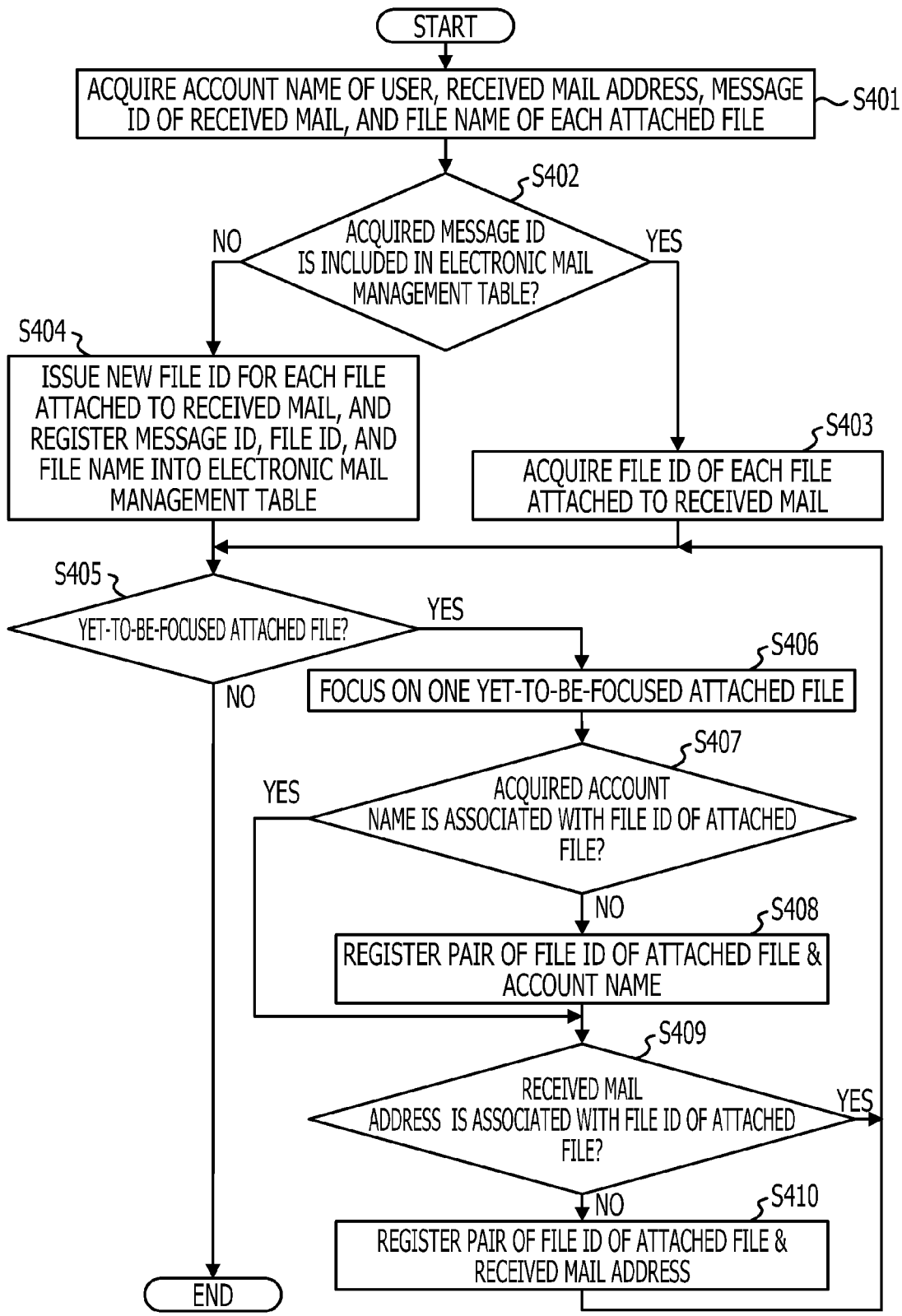
FIG. 10 is a flowchart of an attached file registration process performed when an electronic mail with an attached file is received.

Next, an attached file registration process performed when an electronic mail with an attached file is received will be described with reference to FIG. 10. The process in FIG. 10 is a process for automatically registering a user who has received an electronic mail as a non-third party regarding the attached file in the electronic mail.

For example, it is assumed that an electronic mail with an attached file has been received at the client PC 113 from the client PC 124 via the mail server 121, the network 120, and the mail server 116 in FIG. 2. Alternatively, it is assumed that an electronic mail with an attached file is received at the client PC 113 from the client PC 114 via the mail server 116.

In either case, the user of the client PC 113 is a non-third party regarding the attached file in the received electronic mail. Thus, the process in FIG. 10 is performed when the electronic mail is received at the client PC 113, and a non-third party is registered.

For example, when the user of the client PC 113 performs an operation for receiving an electronic mail, such as clicking a "receive" button on the mail user agent, the detection unit 213 detects the operation performed by the user. Then, the detection unit 213 notifies the registration unit 212 that the operation for receiving an electronic mail has been performed.

When a received electronic mail box of the mail server 116 is empty, no electronic mail is to be received. In this case, therefore, the process in FIG. 10 is useless and is not executed.

Conversely, when one or more electronic mails have been received, the registration unit 212 that has received a notification from the detection unit 213 checks whether or not each received electronic mail has a file attached. When one or more attached files are found, the process in FIG. 10 is started. In the following, it is assumed that, for convenience of description, a received electronic mail has N files attached (N≥1).

Specifically, first, in S401, the registration unit 212 acquires the following pieces of information (15-1) to (15-4):

(15-1) The account name of a user who is to receive the electronic mail.
(15-2) The received electronic mail address.
(15-3) The message ID of the received electronic mail.
(15-4) The file name of each of the N attached files.

The registration unit 212 may acquire the account name (15-1) via, for example, the system function or the like prepared in advance by the OS.

Further, the registration unit 212 acquires the received electronic mail address (15-2) via the mail user agent. For example, the registration unit 212 may read the received electronic mail address from the property of the electronic mail box on which a receiving operation is to be performed.

The received electronic mail address may be specified in the "To" header field or the "CC" header field of the received electronic mail. Alternatively, when the received electronic mail address is the address specified in the "BCC" header field when the electronic mail is sent, the received electronic mail address is not included in the received electronic mail itself.

Further, the registration unit 212 reads the message ID (15-3) from the "Message-ID" header field of the received electronic mail.

Further, the received electronic mail includes N "Content-Disposition" header fields corresponding to the N attached files. Thus, the registration unit 212 reads the file names of the respective attached files from the corresponding "Content-Disposition" header fields.

When the registration unit 212 acquires the pieces of information (15-1) to (15-4) in S401 in the above way, then, in S402, the registration unit 212 determines whether or not the acquired message ID has been registered in the electronic mail management table 403. When the message ID has been registered in the electronic mail management table 403, the process proceeds to S403. Conversely, when the message ID has not been registered in the electronic mail management table 403, the process proceeds to S404.

The processing of S403 is executed when an electronic mail is received from another client (for example, the client PC 112) managed by the management server 117 that manages the client (for example, the client PC 113 in FIG. 2) that executes the process in FIG. 10. In other words, the processing of S403 is executed when the registration of the origin in S101 in FIG. 1 has been performed.

For example, it is assumed that an electronic mail has been sent from the client PC 112 to the client PC 113. In this case, as a result of the process in FIG. 9 by the client PC 112, an entry regarding the electronic mail is added to the electronic mail management table 403 included in the management DB 400 of the management server 117. Therefore, when the client PC 113 that receives an electronic mail performs the process in FIG. 10, an entry is found in the electronic mail management table 403 in S402.

Thus, in S403, the registration unit 212 acquires from the electronic mail management table 403 the file ID of each file attached to the received electronic mail. The registration unit 212 searches the electronic mail management table 403 for the file ID of each attached file, using, as search keys, the file name of the file acquired in S401 and the message ID acquired in S401. When the registration unit 212 has acquired the file IDs of all the N attached files, the process proceeds to S405.

On the other hand, the processing of S404 is executed when an electronic mail is received from a host outside an intranet, which is not managed by the management server 117 that manages the client (for example, the client PC 113 in FIG. 2) that executes the process in FIG. 10.

For example, it is assumed that an electronic mail has been sent from the client PC 124 to the client PC 113 via the mail server 121, the network 120, and the mail server 116.

In this case, the client PC 124 is a host outside the LAN 110 managed by the management server 117. Therefore, the management DB 400 in the management server 117 is not changed merely by sending an electronic mail from the client PC 124.

That is, the management DB 400 includes no data concerning the electronic mail sent from the client PC 124. Therefore, when the client PC 113 that receives the electronic mail performs the process in FIG. 10, no entries are found in S402.

Thus, in S404, the registration unit 212 performs the following processes (16-1) and (16-2) on each file attached to the received electronic mail:

(16-1) A process of issuing a new file ID.
(16-2) A process of adding to the electronic mail management table 403 a new entry that associates the message ID acquired in S401, the new file ID issued in the process (16-1), and the file name of the file acquired in S401 with one another.

The issuance of a file ID by the registration unit 212 in the process (16-1) is similar to the issuance of a file ID by the origin recognition unit 211 in S202 in FIG. 5. That is, the registration unit 212 generates a file ID unique in the LAN 110. Alternatively, depending on the embodiment, the registration unit 212 may request the management server 117 to issue a file ID unique in the LAN 110, and may acquire the file ID from the management server 117.

The issuance of a file ID in S404 is also a pre-processing operation for registering the origin in S101 in FIG. 1. In addition, when the received electronic mail has N files attached, N new entries are added to the electronic mail management table 403 through the process (16-2). After the processes (16-1) and (16-2) are completed in S404, the processing of S405 is executed.

In S405, the registration unit 212 determines whether or not, of the N attached files in the received electronic mail, an attached file remains that has not been focused on as a target to be subjected to the processing of S406 and the subsequent processing. When a yet-to-be-focused attached file remains, the process proceeds to S406. Conversely, when the registration unit 212 has focused on all the N attached files, the process in FIG. 10 ends.

In S406, the registration unit 212 focuses on one yet-to-be-focused attached file. In the following, for convenience of description, the attached file focused on in S406 is referred to as the "attached file of interest".

Then, in S407, the registration unit 212 determines "whether or not the account name acquired in S401 has been associated with the file ID of the attached file of interest". That is, the registration unit 212 determines "whether or not the acquired account name has been registered in the member table 401 as a non-third party regarding the attached file of interest". Specifically, the registration unit 212 searches the member table 401 using, as search keys, the file ID of the attached file of interest and the account name acquired in S401.

When an entry is found as a result of search, the acquired account name has been registered in the member table 401 as a non-third party regarding the attached file of interest. Thus, the process proceeds to S409.

Conversely, when no entries are found as a result of search, the acquired account name has not yet been registered as a non-third party regarding the attached file of interest. Thus, the process proceeds to S408 for registration.

Then, in S408, the registration unit 212 registers a pair of the file ID of the attached file of interest and the acquired account name into the member table 401. That is, the registration unit 212 adds a new entry corresponding to the pair to the member table 401. Then, the process proceeds to S409.

In S409, the registration unit 212 determines "whether or not the received electronic mail address acquired in S401 has been associated with the file ID of the attached file of interest". That is, the registration unit 212 determines "whether or not the received electronic mail address has been registered in the member table 401 as a non-third party regarding the attached file of interest". Specifically, the registration unit 212 searches the member table 401 using, as search keys, the file ID of the attached file of interest and the received electronic mail address.

When an entry is found as a result of search, the received electronic mail address has been registered in the member table 401 as a non-third party regarding the attached file of interest. Thus, the process returns to S405.

Conversely, when no entries are found as a result of search, the received electronic mail address has not yet been registered as a non-third party regarding the attached file of interest. Thus, the process proceeds to S410 for registration.

Then, in S410, the registration unit 212 registers a pair of the file ID of the attached file of interest and the received electronic mail address into the member table 401. That is, the registration unit 212 adds a new entry corresponding to the pair to the member table 401. Then, the process returns to S405.

According to the process in FIG. 10 described above, therefore, a recipient of an electronic mail is automatically registered as a non-third party regarding each file attached to the electronic mail. The account name of the recipient is registered and the electronic mail address of the recipient is also registered.

It is to be noted that electronic mails may not necessarily be read, and attached files may not necessarily be saved. For example, a user, or a recipient, may locally save an attached file in an electronic mail immediately upon receiving the electronic mail, may locally save the attached file later, as appropriate, or may not save the attached file. The process in FIG. 10 is executed when an electronic mail is received, regardless of whether an attached file will be saved in the future.

Further, a management DB 400c in FIG. 7 is an example of the management DB 400 in a case under the following assumptions (17-1) to (17-8) after the process in FIG. 10 has been completed:

(17-1) It is assumed that a user who uses the client PC 113 under the account name "name_B" performs an operation for receiving an electronic mail.

(17-2) It is assumed that only one electronic mail is received as a result of the operation in (17-1). Thus, the process in FIG. 10 is started for the received electronic mail.

(17-3) It is assumed that the received electronic mail is specifically the electronic mail described with reference to (14-1) to (14-9) regarding the management DB 400b in FIG. 6.

(17-4) It is assumed that the management DB 400 is in the state of the management DB 400b in FIG. 6 when the process in FIG. 10 is started.

(17-5) From (17-1) and (17-3) described above, in S401 in FIG. 10, the following pieces of information are acquired:
The account name "name_B"
The received electronic mail address "b@foo.com"
The message ID "M000015"
The file name "Z.txt"

(17-6) From (17-4) and (17-5) described above and from an electronic mail management table 403b in FIG. 6, an entry is found in S402. As a consequence, in S403, the file ID "F000103" is acquired from the electronic mail management table 403b.

(17-7) From (17-4) and (17-5) described above and from the member table 401b in FIG. 6, it is determined that, in S407, the account name "name_B" has not yet been associated with the file ID "F000103" as a non-third party. As a consequence, in S408, an entry that associates the account name "name_B" with the file ID "F000103" is added to the member table 401.

(17-8) From (17-4) and (17-5) described above and from the member table 401b in FIG. 6, it is determined in S409 that the received electronic mail address "b@foo.com" has already been associated with the file ID "F000103" as a non-third party. As a consequence, the processing of S410 is not executed, and the process returns from S409 to S405. Then, the process in FIG. 10 ends.

In a case under the assumptions (17-1) to (17-8) described above, the management DB 400 changes from the state of the management DB 400b in FIG. 6 to the state of the management DB 400c in FIG. 7.

Next, a location registration process performed when an attached file in an electronic mail is locally saved will be described with reference to FIG. 11. As described with reference to FIG. 10, an attached file in an electronic mail may not necessarily be saved immediately when the electronic mail is received, and may be saved at an arbitrary timing. Thus, the process in FIG. 11 may be executed for any received electronic mail at an arbitrary timing.

Similarly to the process in FIG. 10, the process in FIG. 11 will be described in the context of the client PC 113, for convenience of description. When the user of the client PC 113 performs an attached file saving operation for saving one or more attached files in an electronic mail via the mail user agent, the detection unit 213 detects the operation performed by the user. Specifically, the attached file saving operation may include a plurality of operations such as the following operations (18-1) to (18-4):

(18-1) An operation of selecting a "save attached file" menu.

(18-2) An operation of selecting L attached files ($1 \leq L \leq N$) to be saved from among N attached files ($1 \leq N$) in an electronic mail.

(18-3) An operation of specifying paths of folders as the save destination of the L attached files.

(18-4) An operation of clicking a "save" button.

Upon detecting the attached file saving operation, the detection unit 213 notifies the registration unit 212 that the attached file saving operation has been detected. Then, the registration unit 212 starts the process in FIG. 11. In the following, for convenience of description, it is assumed that, as in the example of the operation (18-2) described above, the electronic mail has N files ($1 \leq N$) attached and that an instruction to save L attached files among the N attached files ($1 \leq L \leq N$) is given from the user.

In S501, the registration unit 212 determines whether or not an attached file that has not been focused on as a target to be subjected to the processing of S502 to S504 remains among the L attached files instructed to be saved. When a yet-to-be-focused attached file remains, the process proceeds to S502. Conversely, when the registration unit 212 has already focused on all the L attached files, the process in FIG. 11 ends.

In S502, the registration unit 212 focuses on one yet-to-be-focused attached file. In the following, for convenience of description, the attached file focused on in S502 is referred to as the "attached file of interest".

Then, in S503, the registration unit 212 acquires the following pieces of information (19-1) to (19-3):

(19-1) The file ID of the attached file of interest.

Figure 11:
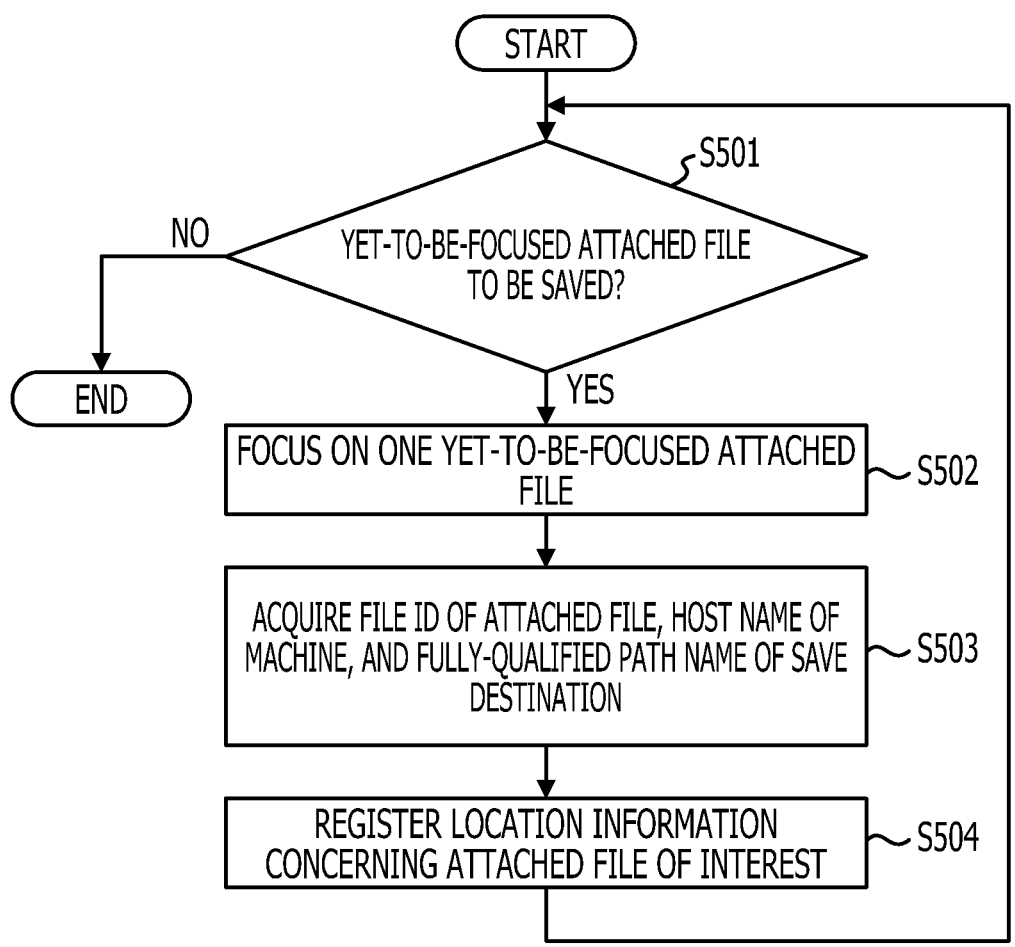
FIG. 11 is a flowchart of a location registration process performed when an attached file in an electronic mail is locally saved.

(19-2) The host name of a machine in which the L attached files are to be saved (i.e., a machine that executes the process in FIG. 11).

(19-3) The fully-qualified path name of the save destination of the attached file of interest.

The registration unit 212 acquires the file ID (19-1) by searching the electronic mail management table 403 using, as search keys, the message ID of the electronic mail to be subjected to the process in FIG. 11 and the file name of the attached file of interest. The details will be described below.

The registration unit 212 may read the message ID from the "Message-ID" header field of the electronic mail, and may read the file name of an attached file from the "Content-Disposition" header field of the electronic mail. That is, the registration unit 212 may acquire search keys for searching the electronic mail management table 403 from the electronic mail.

As a result of search, an entry is found. This is because an entry has already been added in S310 in FIG. 9 when the electronic mail is sent or an entry has already been added in S404 in FIG. 10 when the electronic mail is received. Thus, the registration unit 212 may acquire the file ID (19-1) from the electronic mail management table 403.

The registration unit 212 further acquires the host name (19-2) via, for example, the system function or the like prepared in advance by the OS. Further, the registration unit 212 acquires the fully-qualified path name (19-3) by concatenating the file name of the attached file of interest with the fully-qualified path name of the save destination folder specified on the mail user agent.

Then, in S504, the registration unit 212 registers location information concerning the attached file of interest into the file location table 402 in accordance with the information acquired in S503. That is, the registration unit 212 adds a new entry that associates the pieces of information (19-1) to (19-3) with one another to the file location table 402. Then, the process returns to S501.

A management DB 400d in FIG. 7 is an example of the management DB 400 in a case under the following assumptions (20-1) to (20-6) after the process in FIG. 11 has been completed.

(20-1) It is assumed that the user of the client PC 113 performs the attached file saving operation for the electronic mail received at the client PC 113 described with reference to the case under the assumptions (17-1) to (17-8) regarding the management DB 400c in FIG. 7. In response to the attached file saving operation as a trigger, the process in FIG. 11 is started. From the assumptions (17-3) and (14-3), the electronic mail has one file attached.

(20-2) It is assumed that the management DB 400 is in the state of the management DB 400c in FIG. 7 when the process in FIG. 11 is started.

(20-3) From the assumptions (20-1) and (20-2) described above, the file ID "F000103" is acquired in S503 in FIG. 11.

(20-4) It is assumed that the client PC 113 has the host name "PC_B". Thus, in S503, the host name "PC_B" is acquired.

(20-5) It is assumed that in the attached file saving operation in the assumption (20-1) described above, the user specifies a folder identified by the fully-qualified path name "C:\path_B" as a save destination folder. In addition, from the assumptions (20-1) and (20-2), the attached file has the file name "Z.txt". Thus, in S503, "C:\path_B\Z.txt" is acquired as the fully-qualified path name of the save destination of the attached file.

(20-6) Thus, in S504, a new entry that associates the file ID in the assumption (20-3), the host name in the assumption (20-4), and the fully-qualified path name in the assumption (20-5) with one another is added to the file location table 402.

In the case under the assumptions (20-1) to (20-6) described above, the management DB 400 changes from the state of the management DB 400c in FIG. 7 to the state of the management DB 400d in FIG. 7. For example, as in the assumption (20-6), the addition of an entry through the process in FIG. 11 has the advantage of avoiding excessive generation of warnings when a file is edited and is exchanged between non-third parties many times. The reason will be described hereinafter with reference to a specific example.

After the addition of an entry in the assumption (20-6) described above, the user of the client PC 113 may edit the attached file saved in "C:\path_B\Z.txt" and overwrite to save the edited file. The user of the client PC 113 may further attach the edited file to a new electronic mail and may wish to send the electronic mail to the user of the client PC 112 (i.e., to the electronic mail address "a@foo.com").

Thus, the client PC 113 performs the process in FIG. 9. In this case, in S301 in FIG. 9, the file ID "F000103" is obtained from the entry previously added to the file location table 402 in the assumption (20-6) through the process in FIG. 11 performed by the client PC 113.

Therefore, according to the process in FIG. 9, it is determined that, also for the edited file overwritten and saved in"C:\path_B\Z.txt", the destination electronic mail address "a@foo.com" is a non-third party electronic mail address. Thus, even when only the destination electronic mail address "a@foo.com" is included, no warnings are generated.

That is, in a case where the file described above is exchanged via electronic mail between two non-third parties identified by the electronic mail addresses "a@foo.com" and "b@foo.com", no warnings are generated when the file is sent second and more times. According to the first embodiment, therefore, in addition to information leakage due to carelessness being avoided, a situation where "excessive generation of warnings impedes information from being exchanged between non-third parties" may also be avoided.

Furthermore, non-third parties regarding a file may include, for example, a non-third party that exists outside the LAN 110 (i.e., outside the range of management of the management server 117), such as the client PC 124. As is apparent from the description with reference to FIGS. 5 to 11, also in a case where a file is exchanged via electronic mail between such an out-of-network non-third party and an in-network non-third party, excessive generation of warnings is suppressed as in a case where a file is exchanged between non-third parties within the LAN 110.

In addition to the file described above being exchanged via electronic mail between the two non-third parties identified by the electronic mail addresses "a@foo.com" and "b@foo.com" as in the example described above, the electronic mail may also be forwarded or transferred. For example, a management DB 400e in FIG. 8 is an example of the management DB 400 when such forwarding is performed. More specifically, in the following case under assumptions (21-1) to (21-8), the management DB 400 changes to the management DB 400e in FIG. 8.

(21-1) It is assumed that the user of the client PC 113 performs an operation for forwarding the electronic mail described with reference to the assumptions (17-1) to (17-8) (i.e., an electronic mail received at the client PC 113).

(21-2) It is assumed that the operation in the assumption (21-1) described above is performed when the management DB 400 is in the state of the management DB 400*d* in FIG. 7.

(21-3) It is assumed that the electronic mail address of the transfer destination is "c@bar.org". Here, it is assumed that the "bar.org" domain is outside the LAN 110 managed by the management server 117 in FIG. 2. It is also assumed that an electronic mail addressed to the address "c@bar.org" is specifically received at the client PC 124 in FIG. 2.

(21-4) The process in FIG. 9 is performed in the client PC 113 in accordance with the detection of the operation performed by the user in the assumption (21-1). Thus, from the assumptions (21-1) to (21-2) and FIG. 7, a warning regarding the combination of the electronic mail address "c@bar.org" and the attached file having the file name "Z.txt" is issued in S311 in FIG. 9.

(21-5) It is assumed that the user of the client PC 113 gives a permission input in response to the warning in the assumption (21-4) described above.

(21-6) As a result of the permission input in the assumption (21-5) described above, in S314, an entry that associates the file ID "F000103" corresponding to the file name "Z.txt" with the electronic mail address "c@bar.org" is added to the member table 401.

(21-7) Further, in S310, this electronic mail is forwarded to the electronic mail address "c@bar.org". It is assumed that the message ID assigned to the electronic mail when forwarded is "M000021".

(21-8) In S310, furthermore, an entry that associates the message ID "M000021", the file ID "F000103", and the file name "Z.txt" with one another is added to the electronic mail management table 403.

In the case under the assumptions (21-1) to (21-8) described above, the management DB 400 changes from the state of the management DB 400*d* in FIG. 7 to the state of the management DB 400*e* in FIG. 8. Thus, the user outside the LAN 110 (specifically, the user identified by the electronic mail address "c@bar.org") is also newly registered as a non-third party of the file described above.

As described above, in the first embodiment, the file ID is used as a specific example of the file identification information 231 in FIG. 3.

In terms of appropriateness of the file identification information 231, for example, the mere use of file name is not appropriate. This is because it is not possible to distinguish different files having the same name from each other only by file name.

In contrast, a fully-qualified path name representing the location of a file would enable different files having the same name that are in different folders in a single host to be distinguished from each other. Therefore, when the system 200 in FIG. 2 is implemented as a stand-alone system (for example, a third embodiment described below), the fully-qualified path name of a file may be used as the file identification information 231.

In the first embodiment in which the system 200 is implemented as a client-server system, however, a file ID rather than a fully-qualified path name is used as the file identification information 231. As described above, a file ID is unique in the LAN 110 managed by the management server 117. That is, using file IDs enables different files on the same fully-qualified path name in different hosts to be distinguished from each other.

Another advantage of using a file ID as described above is the capability of managing continuity of a file attached to an electronic mail that is exchanged. The capability of managing continuity of a file may avoid excessive generation of warnings and would not disturb the operation of users.

For example, a file newly generated in the client PC 114 may be attached to an electronic mail and sent to the client PCs 112 and 124, and may be individually edited in the client PCs 112 and 124. After that, electronic mails having edited files attached may be sent to the client PC 114 from the client PCs 112 and 124.

For example, in the above situation, the same file may have different forms such as the following states (22-1) to (22-10). The management server 117 is not able to detect the file states (22-7) and (22-8) but identifies the file states (22-1) to (22-6) and (22-9) to (22-10) with a single file ID.

(22-1) A file that is generated in the client PC 114 and that is locally saved in the client PC 114.

(22-2) A file that is attached to an electronic mail to be sent from the client PC 114 to the client PCs 112 and 124.

(22-3) A file that is extracted from the electronic mail in (22-2) received at the client PC 112 and that is locally saved in the client PC 112.

(22-4) A file that is edited, overwritten, and saved in the client PC 112 after the file is saved in (22-3).

(22-5) A file that is attached to an electronic mail to be sent from the client PC 112 to the client PC 114 after the file is overwritten and saved in (22-4).

(22-6) A file that is extracted from the electronic mail in (22-5) received at the client PC 114 and that is locally saved in the client PC 114. When the file (22-6) is saved, the file (22-1) may be overwritten, or the file (22-6) may be saved in a location different from the file (22-1).

(22-7) A file that is extracted from the electronic mail in (22-2) received at the client PC 124 and that is locally saved in the client PC 124.

(22-8) A file that is edited, overwritten, and saved in the client PC 124 after the file is saved in (22-7).

(22-9) A file that is attached to an electronic mail to be sent from the client PC 124 to the client PC 114 after the file is overwritten and saved in (22-8).

(22-10) A file that is extracted from the electronic mail in (22-9) received at the client PC 114 and locally saved in the client PC 114. When the file (22-10) is saved, the file (22-1) may be overwritten, or the file (22-10) may be saved in a location different from the file (22-1).

As in the above examples, in the first embodiment, even when a single file is subjected to several operations (such as locally saving the file, editing the file, and attaching the file to an electronic mail and sending the electronic mail) one after another, the file is continuously managed with the same file ID. In general, furthermore, a non-third party regarding a file is still a non-third party regarding the file even when the file undergoes some operation. When the file is continuously managed with the same file ID, as a result, the non-third party is also continuously recognized as a non-third party. Therefore, even when the file is subjected to operations one after another, excessive generation of warnings, such as "generation of a warning each time an operation is performed" is avoidable. In this manner, using a file ID as the file identification information 231 is advantageous for avoiding excessive generation of warnings.

As described above, using a file ID as the file identification information 231 is advantageous. In addition, a process in FIG. 12 described below allows a file to be kept track of by using a file ID. That is, the function of "keeping track of a file and managing continuity of the file even when the file is copied, moved, or renamed" may be implemented by performing the process in FIG. 12 and using a file ID.

Figure 12:
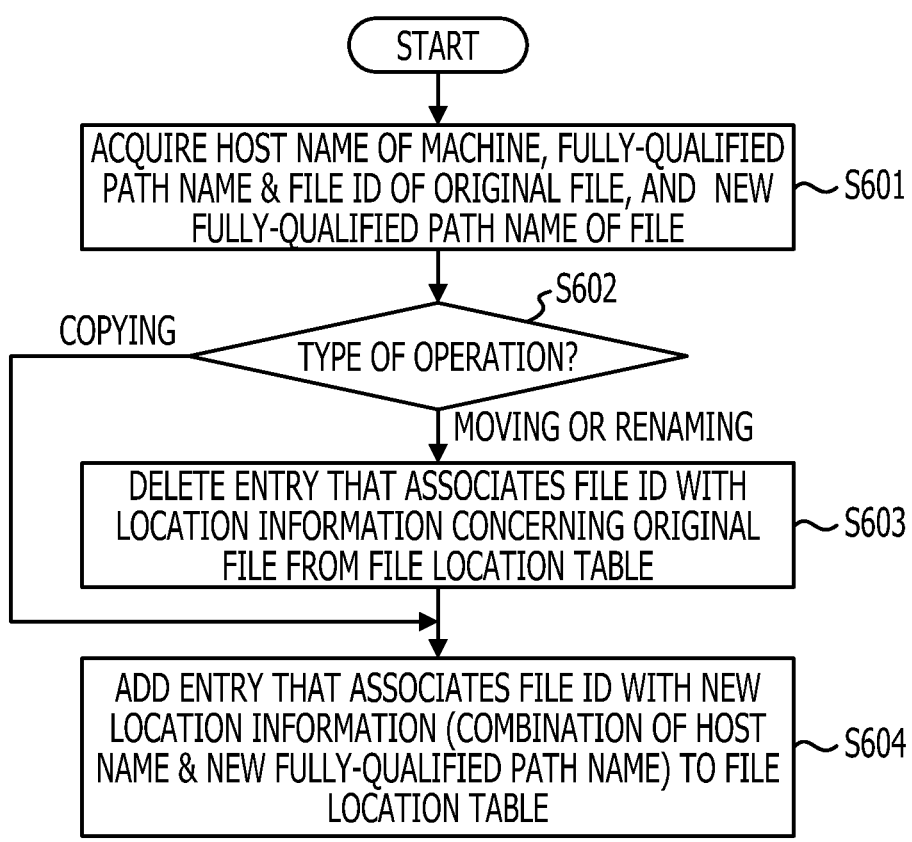
FIG. 12 is a flowchart of a location update process performed when a file is copied, moved, or renamed.

FIG. 12 is a flowchart of a location update process performed when a file is copied, moved, or renamed. In the description with reference to FIG. 12, it is assumed that copying, moving, or renaming is an operation locally performed within a single host.

The process in FIG. 12 is started when the detection unit 213 detects an operation for copying, moving, or renaming a file. Specific examples of an operation detected by the detection unit 213 as a trigger of the process in FIG. 12 include, for example, the following operations (23-1) to (23-7):

(23-1) Copying a file in response to a command provided by an OS (for example, copying a file in response to a "copy" command).

(23-2) Copying a file via a GUI provided by an OS (for example, copying a file by performing an operation for copying and pasting the icon of the file).

(23-3) Moving a file in response to a command provided by an OS (for example, moving a file in response to a "move" command).

(23-4) Moving a file via a GUI provided by an OS (for example, moving a file by performing an operation for dragging and dropping the icon of the file or an operation for cutting and pasting the icon of the file).

(23-5) Renaming a file in response to a command provided by an OS (for example, renaming a file in response to a "rename" command).

(23-6) Renaming a file via a GUI provided by an OS (for example, renaming a file by performing an operation of selecting the icon of the file and changing the file name in the property).

(23-7) Copying, moving, or renaming a file using a process according to application software (for example, copying a file by performing an operation of opening an existing file using a process according to application software and by saving the file as a different name).

The detection unit 213 may detect an operation such as any of the operations (23-1) to (23-7) for copying, moving, or renaming a file by, for example, hooking a call to a command or a call to an API function. Regardless of the specific method of detection, upon detecting an operation for copying, moving, or renaming a file, the detection unit 213 notifies the registration unit 212 of the content of the detected operation. Thus, the registration unit 212 starts the process in FIG. 12.

In S601, the registration unit 212 acquires the following pieces of information (24-1) to (24-4):

(24-1) The host name of a machine on which a copying, moving, or renaming operation is performed (i.e., the host name of a machine to which an input for copying, moving, or renaming is given).

(24-2) The fully-qualified path name of the original file subjected to an operation.

(24-3) The file ID of the original file subjected to an operation.

(24-4) The new fully-qualified path name of the file (i.e., the fully-qualified path name in the copy destination, the fully-qualified path name in the move destination, or the fully-qualified path name of a renamed file).

The registration unit 212 acquires the host name (24-1) via, for example, the system function or the like prepared in advance by the OS. For example, when the process in FIG. 12 is performed on the client PC 112 having the host name "PC_A", the registration unit 212 acquires the host name "PC_A".

In addition, as described above, the detection unit 213 notifies the registration unit 212 of the content of the operation detected by the detection unit 213 as a trigger to start the process in FIG. 12. Therefore, the registration unit 212 may recognize the pieces of information (24-2) and (24-4) in accordance with the notification from the detection unit 213.

The detection unit 213 itself may acquire the pieces of information (24-2) and (24-4) in, for example, the following way. Therefore, the detection unit 213 may notify the registration unit 212 of the pieces of information (24-2) and (24-4).

For example, when a file is copied, moved, or renamed in response to a command provided by an OS, the detection unit 213 may acquire the pieces of information (24-2) and (24-4) from an argument of the command and the fully-qualified path name of the current folder. Alternatively, the detection unit 213 may acquire the pieces of information (24-2) and (24-4) from an argument of an API function that is called to copy, move, or rename the file.

Further, the registration unit 212 acquires the file ID (24-3) by searching the file location table 402 using the host name (24-1) and the fully-qualified path name (24-2) as search keys.

For example, it is assumed that a file whose location is identified by the fully-qualified path name "C:\path_B\Z.txt" is copied to "C:\path_B\tmp\Z2.txt" in the client PC 113 having the host name "PC_B". It is also assumed that the file location table 402 is specifically in the state of the file location table 402d in FIG. 7.

In this case, the host name (24-1) is "PC_B", and the fully-qualified path name (24-2) is "C:\path_B\Z.txt". Further, the file ID (24-3) is "F000103", and the fully-qualified path name (24-4) is "C:\path_B\tmp\Z2.txt".

In S601, for example, the registration unit 212 acquires the pieces of information (24-1) to (24-4) in the above way.

Then, in S602, the registration unit 212 determines the type of the operation. When the type of the operation is "moving" or "renaming", the process proceeds to S603. When the type of the operation is "copying", the process proceeds to S604.

In S603, the registration unit 212 deletes the entry that associates the file ID with the location information concerning the original file from the file location table 402.

Here, the location information concerning the original file is specifically represented by a combination of the host name (24-1) and the fully-qualified path name (24-2) obtained in S601. Thus, the registration unit 212 searches the file location table 402 using the file ID (24-3), the host name (24-1), and the fully-qualified path name (24-2) as search keys. The registration unit 212 deletes one entry found as a result of search. After that, the process proceeds to S604.

In S604, the registration unit 212 adds an entry that associates the file ID with the new location information to the file location table 402. Here, the new location information is specifically represented by a combination of the host name (24-1) and the fully-qualified path name (24-4) obtained in S601. Thus, the registration unit 212 adds a new entry that associates the file ID (24-3), the host name (24-1), and the fully-qualified path name (24-4) with one another to the file location table 402. Then, the process in FIG. 12 ends.

For efficient use of the storage device 230 in FIG. 3, an unnecessary entry in the management DB 400 may be deleted. Specifically, a process in FIG. 13 may be performed.

Figure 13:
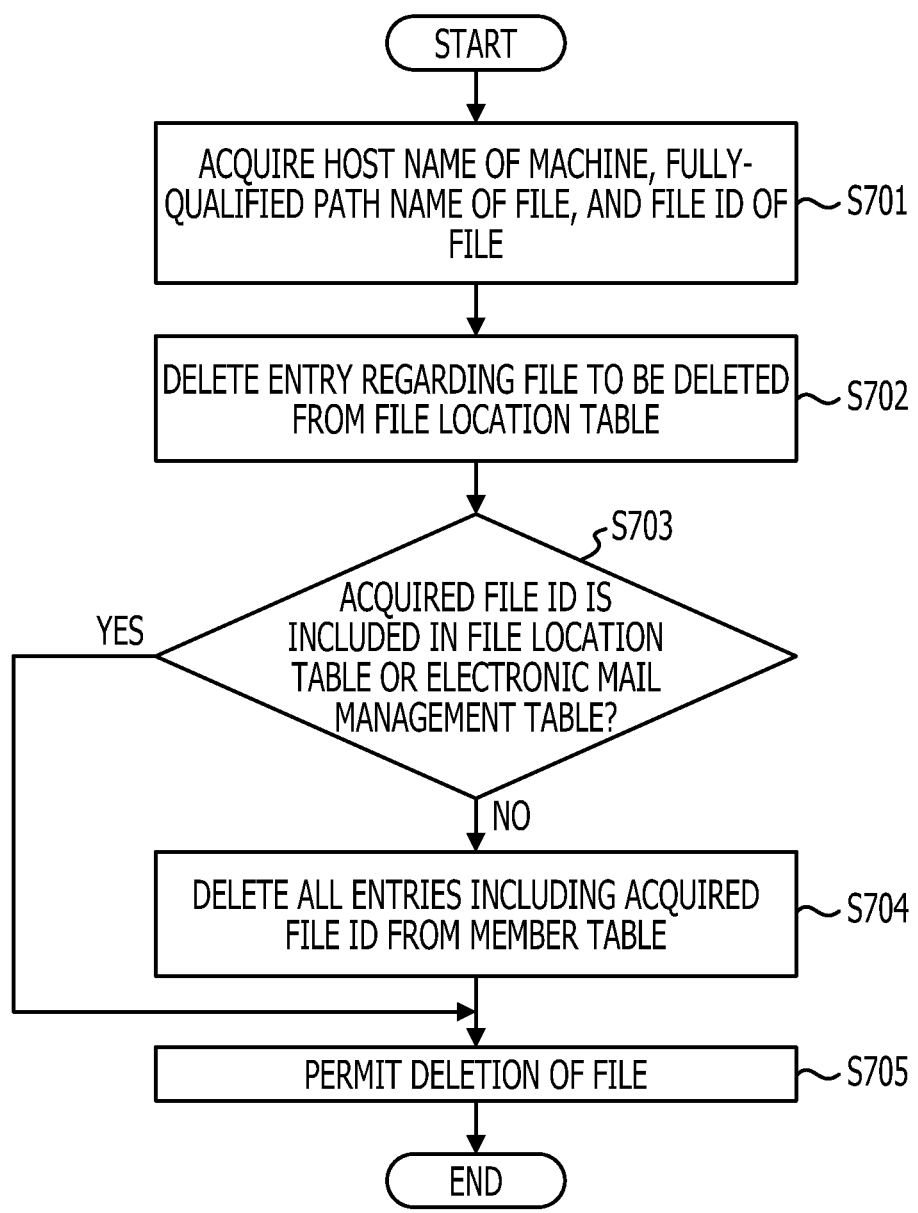
FIG. 13 is a flowchart of an entry deletion process performed when a file is deleted.

FIG. 13 is a flowchart of an entry deletion process performed when a file is deleted. For example, the client PC 112 executes the process in FIG. 13 when a file locally saved in the client PC 112 is deleted.

An OS provides a command such as a "del" command, a menu for emptying the "trash box", or the like to delete a file. Thus, upon detecting a call to the above command or menu provided to delete a file, the detection unit 213 notifies the registration unit 212 of the content of the detected call. Then, the registration unit 212 starts the process in FIG. 13. The detection unit 213 may detect a call to the above command or menu using, for example, a hook.

In S701, the registration unit 212 acquires the following pieces of information (25-1) to (25-3):

(25-1) The host name of a machine in which the file to be deleted is saved (25-2) The fully-qualified path name of the file to be deleted (25-3) The file ID of the file to be deleted For example, the registration unit 212 of the client PC 112 may acquire the host name (25-1) (i.e., the host name of the client PC 112, namely, "name_A") via the system function or the like prepared in advance by the OS.

Further, the registration unit 212 acquires the fully-qualified path name (25-2) from the content notified by the detection unit 213.

The detection unit 213 may recognize the fully-qualified path name (25-2) from, for example, an argument of a command for deleting the file and the fully-qualified path name of the current folder. According to a certain type of OS, furthermore, a file in the "trash box" is associated with information indicating the fully-qualified path name of a folder in which the file is originally placed. Thus, the detection unit 213 may acquire the fully-qualified path name (25-2) via, for example, the OS. Accordingly, the detection unit 213 may recognize the fully-qualified path name (25-2), and may notify the registration unit 212 of the fully-qualified path name (25-2).

Further, the registration unit 212 may acquire the file ID (25-3) by searching the file location table 402 using the host name (25-1) and the fully-qualified path name (25-2) as search keys.

In the above manner, the registration unit 212 acquires the pieces of information (25-1) to (25-3) in S701. Then, in S702, the registration unit 212 deletes an entry regarding the file to be deleted from the file location table 402. That is, the registration unit 212 deletes an entry that associates the file ID (25-3), the host name (25-1), and the fully-qualified path name (25-2) with one another from the file location table 402.

Then, in S703, the registration unit 212 determines whether or not the file ID (25-3) is included in the file location table 402 or the electronic mail management table 403.

Specifically, the registration unit 212 searches the file location table 402 using the file ID (25-3) as a search key. When a client machine different from the client machine that executes the process in FIG. 13 locally saves a file having the same file ID, an entry is found in the file location table 402.

Further, the registration unit 212 searches the electronic mail management table 403 using the file ID (25-3) as a search key. When an electronic mail previously sent or received between the client machine that executes the process in FIG. 13 and another client machine is attached a file having the file ID (25-3), an entry is found in the electronic mail management table 403.

When no entries are found in the file location table 402 and the electronic mail management table 403 as a result of search, the process proceeds to S704. When an entry is found in at least one of the file location table 402 and the electronic mail management table 403, the process proceeds to S705.

In S704, the registration unit 212 deletes all the entries including the file ID (25-3) from the member table 401. As a consequence, no entry including the file ID (25-3) exists in the member table 401, the file location table 402, and the electronic mail management table 403. After the deletion of the entries, the process proceeds to S705.

In S705, the detection unit 213 performs control for permitting deletion of the file. For example, the detection unit 213 causes the execution of a hook function to be completed to return the control to the command or menu for deleting a file, and may thereby permit deletion of the file. As a result of the processing of S705, the file whose deletion has been instructed by the user is deleted.

According to the process in FIG. 13 described above, an entry that is apparently unnecessary is deleted from the member table 401. That is, according to the process in FIG. 13, the member table 401 is managed so as not to have an entry regarding a file meeting both the following conditions (26-1) and (26-2):

(26-1) Not currently saved in any of the client PCs 112 to 114.

(26-2) Having no possibility to be extracted in the future from an electronic mail currently saved in any of the client PCs 112 to 114 and to be locally saved on any of the client PCs 112 to 114.

Further, according to the process in FIG. 13, an unnecessary entry is deleted from the file location table 402 in accordance with the deletion of a file. Therefore, wasteful consumption of a storage area may be avoided by the process in FIG. 13.

Subsequently, a second embodiment for suppressing information leakage through shared folders will be described with reference to FIGS. 14 to 15. In the second embodiment, in addition to processes similar to those in the first embodiment, a process for suppressing information leakage through a shared folder is further performed.

For example, as in FIG. 2, the LAN 110 may include the file server 115, a shared folder may be created on the file server 115, and a file may be shared between users via the shared folder. Depending on the access privilege set in the shared folder, however, unintended information leakage via the shared folder may occur.

For example, consideration will be given of the following situations (27-1) to (27-4).

(27-1) The LAN 110 is an intranet of a company.

(27-2) The users of the client PCs 112 and 113 are staff members of a first department in the company. The user of the client PC 114 is a staff member of a second department in the company.

(27-3) According to the rules of the company, staff members of the second department are not allowed to view internal documents of the first department.

(27-4) Meanwhile, a shared folder is created on the file server 115 to share information between departments. All the users of the client PCs 112 to 114 are permitted to read and write the shared folder.

In the situations (27-1) to (27-4) described above, when the user of the client PC 113 saves a file of an internal document of the first department in the shared folder created in the situation (27-4), the internal document of the first department may be accessed from staff members of the second department. In the second embodiment, for example, a process in FIG. 14 is performed in order to suppress such information leakage due to carelessness of users.

Figure 14:
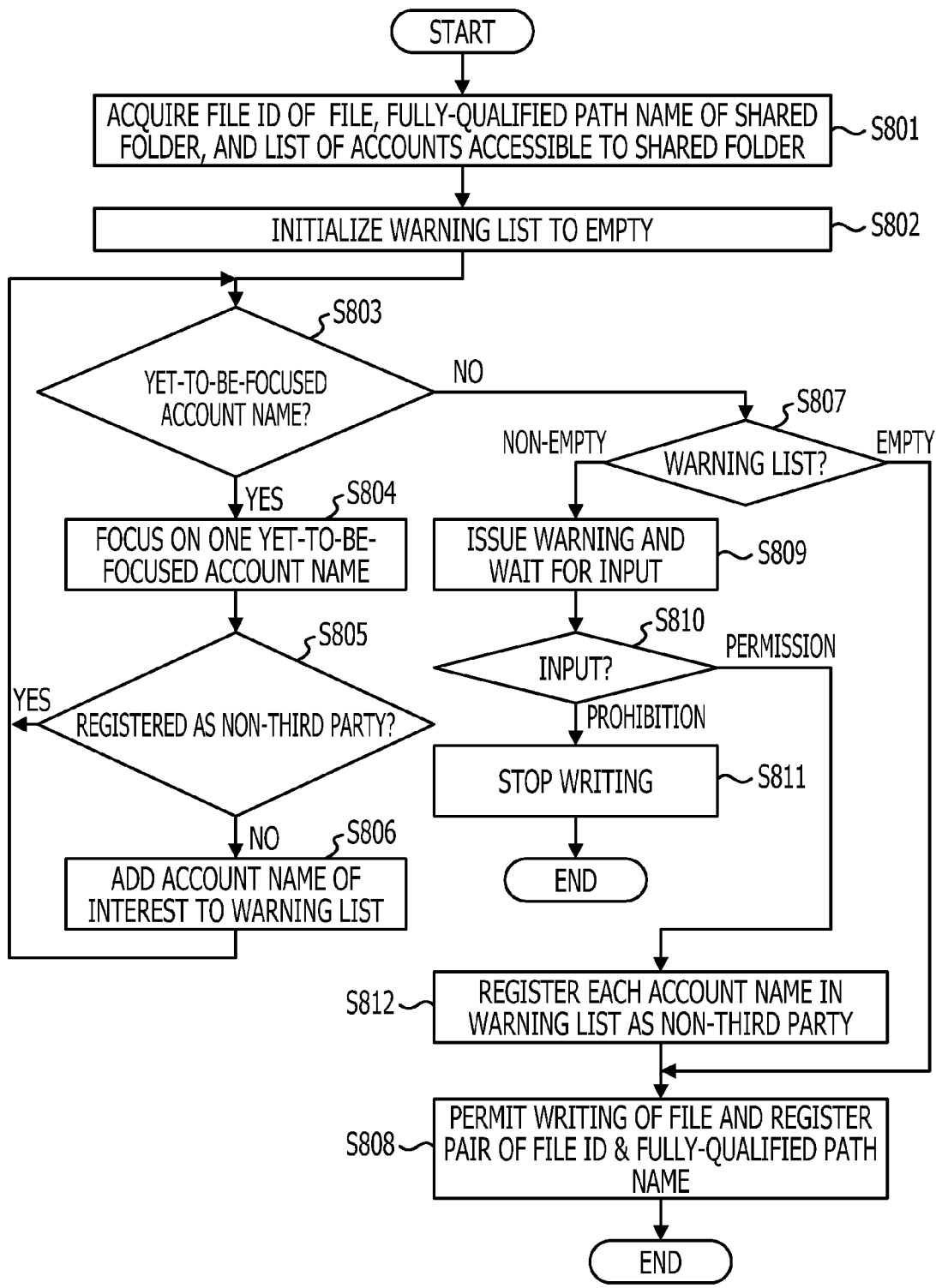
FIG. 14 is a flowchart of a write confirmation process performed when a file is written to a shared folder.

FIG. 14 is a flowchart of a write confirmation process performed when a file is written to a shared folder. The process in FIG. 14 corresponds to a specific example of the processing of S103 to S111 in FIG. 1.

In the following, for convenience of description, the process in FIG. 14 is performed in the client PC 113, by way of example.

In the following, furthermore, for simplicity of description, a description will be made mainly of a case where a certain file is to be written to a shared folder. In a case where a plurality of files are to be collectively written to a shared folder, the process in FIG. 14 is performed for each file.

The process in FIG. 14 starts specifically in any of the following cases (28-1) to (28-3).

(28-1) A user of the client PC 113 performs an operation of copying or moving a file locally saved in the client PC 113 to a shared folder.

(28-2) A user of the client PC 113 performs an operation of copying or moving a file saved in a first shared folder to a second shared folder.

(28-3) A user of the client PC 113 performs an operation of saving an attached file in an electronic mail received at the client PC 113 into a shared folder.

An example of the case (28-1) is that an input for copying or moving a file to a shared folder in response to a command or GUI provided by the OS is given from the input device 240 of the client PC 113. Another example is that an input for saving a file locally saved in the client PC 113 into a shared folder via a "save as . . . " menu of application software is given from the input device 240 of the client PC 113.

In the case (28-2), the process in FIG. 14 is started for the second shared folder. The copying or moving in the case (28-2) may be an operation performed in response to a command or GUI provided by the OS, or may be an operation performed by a process according to application software.

The operation performed in the case (28-3) is an operation performed on the mail user agent. Specifically, a series of operations of, for example, selecting the "save attached file" menu, selecting one attached file, selecting a shared folder as a save destination, and clicking the "save" button may be included.

The detection unit 213 may detect an input operation in any of the cases (28-1) to (28-3) by, for example, using a hook. Upon detecting an input operation in any of the cases (28-1) to (28-3), the detection unit 213 notifies the determination unit 214 of the content of the detected input operation. Thus, the determination unit 214 starts the process in FIG. 14.

The detection of a trigger to start the process in FIG. 14 by the detection unit 213 corresponds to the transition from S103 to S107 in FIG. 1.

In S801, the determination unit 214 acquires the following pieces of information (29-1) to (29-3):

(29-1) The file ID of a file that the user is to write to a shared folder.

(29-2) The fully-qualified path name of the shared folder to which the file is to be written.

(29-3) A list of accounts for which accessing the shared folder (29-2) is authorized.

The pieces of information (29-1) to (29-3) are specifically acquired in the following way.

Upon detecting the input operation in the case (28-1), the detection unit 213 notifies the determination unit 214 of the fully-qualified path name of the file in the client PC 113 in which the file is locally saved and the host name of the client PC 113 as part of information indicating the content of the input operation. Thus, the determination unit 214 searches the file location table 402 using the notified host name and the notified fully-qualified path name as search keys to acquire the file ID (29-1).

Alternatively, upon detecting the input operation in the case (28-2), the detection unit 213 notifies the determination unit 214 of the fully-qualified path name of the file in the first shared folder as part of information indicating the content of the input operation. Thus, the determination unit 214 searches the file location table 402 using the fully-qualified path name of the file in the first shared folder as a search key to acquire the file ID (29-1).

As will become apparent from the following description with reference to FIG. 14, an entry is added to the file location table 402 through the previous writing of the file to the first shared folder. Thus, when the determination unit 214 searches the file location table 402 using the fully-qualified path name of the file in the first shared folder as a search key in the above manner, an entry is found. Therefore, the determination unit 214 may acquire the file ID.

Upon detecting the input operation in the case (28-3), the detection unit 213 acquires the message ID of an electronic mail having attached thereto a file to be saved in the shared folder and the file name of the file via, for example, the mail user agent. Further, the detection unit 213 notifies the determination unit 214 of the message ID and the file name as part of information indicating the content of the input operation.

The determination unit 214 may acquire the file ID (29-1) by searching the electronic mail management table 403 using the notified message ID and the notified file name as search keys. This is because the process in FIG. 10 has been performed in a manner similar to that in the first embodiment in response to the previous reception of the electronic mail at the client PC 113. For this reason, an entry is found by the search through the electronic mail management table 403, and the determination unit 214 may acquire the file ID from the found entry.

The detection unit 213 also notifies the determination unit 214 of the fully-qualified path name (29-2) (i.e., the fully-qualified path name of the shared folder to which the file is to be written) as part of information indicating the content of the input operation. Therefore, the determination unit 214 may also acquire the fully-qualified path name (29-2). In the following, for convenience of description, the fully-qualified path name of the shared folder is represented by, for example, "\\srv\shared\Z.txt" in Universal Naming Convention (UNC) format.

In addition, the determination unit 214 reads the access privilege settings of the shared folder identified by the acquired fully-qualified path name (29-2), thereby acquiring the list (29-3). Although a specific method of access control depends upon the OS, the determination unit 214 may acquire the list (29-3) from the property of the shared folder, for example.

In the following, for convenience of description, the list (29-3) is specifically a list of account names of user accounts given read permission for the shared folder. For convenience of description, furthermore, the list (29-3) is referred to as an "account list".

Accordingly, in S801, the determination unit 214 acquires the pieces of information (29-1) to (29-3).

Then, in S802, the determination unit 214 initializes a "warning list" to empty. The warning list in the process in FIG. 14 is also an example of information to be used by the determination unit 214 to perform determination in S107 in FIG. 1.

Then, in S803, the determination unit 214 determines whether or not an account name that has not been focused on as a target to be subjected to the processing of S804 to S806 remains in the account list. When a yet-to-be-focused account name remains, the process proceeds to S804. Conversely, when all the account names have been focused on, the process proceeds to S807.

In S804, the determination unit 214 focuses on one yet-to-be-focused account name in the account list. Hereinafter, the account name focused on in S804 is referred to as the "account name of interest".

Then, in S805, the determination unit 214 determines whether or not the account name of interest has been registered as a non-third party regarding a file to be written to a shared folder. Specifically, the determination unit 214 searches the member table 401 using as search keys the file ID and the account name of interest acquired in S801.

When an entry is found as a result of search, the account name of interest has been registered as a non-third party. Thus, the process returns to S803.

Conversely, when no entries are found as a result of search, the account name of interest has not been registered as a non-third party. That is, the account name of interest represents a third party for which a warning is to be issued. Thus, the process proceeds to S806.

In S806, the determination unit 214 adds the account name of interest to the warning list. Then, the process returns to S803.

When all the account names in the account list have been focused on, in S807, the determination unit 214 determines whether or not the warning list is empty.

When the warning list is empty, that is, when all the users who may access a shared folder to which the file is to be written are non-third parties for the file, writing the file to the shared folder would not allow access to the file to be provided to a third party. That is, there is no risk of information leakage.

Thus, the determination unit 214 notifies the permission unit 223 and the registration unit 212 that there is no information leakage to third parties, and the process proceeds to S808. The transition from S807 to S808 corresponds to the link from S107 to S105 in FIG. 1.

Conversely, when the warning list is non-empty, that is, when a file is made accessible from a third party by writing the file to the shared folder, there is a risk of information leakage.

Thus, the determination unit 214 outputs the warning list to the warning unit 221, and the process proceeds to S809. The transition from S807 to S809 corresponds to the link from S107 to S108 in FIG. 1.

In S808, the permission unit 223 permits the file to be written to a shared folder. That is, the permission unit 223 permits writing in accordance with the operation detected by the detection unit 213 (specifically, any of the operations in the cases (28-1) to (28-3)).

In S808, furthermore, the registration unit 212 receives the file ID (29-1) and the fully-qualified path name of the file written to the shared folder from the determination unit 214. The registration unit 212 registers a pair of the received file ID and fully-qualified path name into the file location table 402.

As described above, the determination unit 214 receives, as part of the information used to acquire the file ID (29-1), the file name of the file to be written or the fully-qualified path name including the file name (that is, the fully-qualified path name of the original location) from the detection unit 213. Therefore, the determination unit 214 may recognize the file name of the file to be written.

Accordingly, the determination unit 214 may acquire the fully-qualified path name of the file written to the shared folder by concatenating the path delimiter "\" and the file name with the fully-qualified path name of the shared folder (29-2) acquired in S801. The registration unit 212 receives the fully-qualified path name acquired by the determination unit 214 in the above manner from the determination unit 214.

Then, the registration unit 212 adds a new entry that associates the file ID (29-1) with the fully-qualified path name of the file in the shared folder to the file location table 402. Thus, the registration unit 212 registers the new location information concerning the file into the file location table 402. Then, the process in FIG. 14 ends.

On the other hand, in S809, the warning unit 221 issues a warning in accordance with the warning list received from the determination unit 214. For example, when the warning list includes two account names, the warning unit 221 may display dialogs including the following dialogs (30-1) to (30-3) on a screen of the client PC 113.

(30-1) A warning message such as "The users with the following two account names may access this shared folder but have not been registered as non-third parties. There is a risk of information leakage to these two third party users. Do you really want to write the file to this shared folder?"

(30-2) The two account names included in the warning list.

(30-3) The "Yes" button and the "No" button for accepting an input in response to the warning message.

The dialogs (30-1) to (30-3) given above are merely examples of a GUI for providing a warning. Any other GUI may be used. It is to be understood that the warning unit 221 may issue an audio warning.

In addition to the issuance of a warning, the warning unit 221 instructs the input accepting unit 222 to accept an input from the input device 240 in response to the warning. Then, in S809, the input accepting unit 222 waits for an input (for example, a click of the "Yes" button or the "No" button in the example of the dialog (30-3)) to be received from the input device 240.

When the input accepting unit 222 accepts an input from the input device 240 in response to the warning, the process proceeds to S810. Then, in S810, the input accepting unit 222 determines whether the accepted input is a permission input or a prohibition input.

When the input accepting unit 222 accepts a prohibition input, the input accepting unit 222 sends a notification to the prohibition unit 224. Then, the process proceeds to S811.

Conversely, when the input accepting unit 222 accepts a permission input, the input accepting unit 222 notifies the permission unit 223 and the registration unit 212 that there is no information leakage to third parties. Then, the process proceeds to S812.

In S811, the prohibition unit 224 stops writing a file to a shared folder. That is, the prohibition unit 224 prohibits a file from being written to a shared folder via a process according to the OS or application software. Specifically, the prohibition unit 224 may prohibit a file from being written to a shared folder by, for example, canceling the input given from the user to a process according to the OS or application software. Then, the process in FIG. 14 ends. It is to be understood that the mail user agent is also an example of a process according to application software.

On the other hand, in S812, the registration unit 212 acquires the file ID (29-1) and the warning list from the determination unit 214. Then, the registration unit 212 registers each account name in the warning list as a non-third party. That is, the registration unit 212 adds an entry that associates, for each account name in the warning list, the file ID received from the determination unit 214 with the account name to the member table 401.

After the member table 401 has been updated, the process proceeds to S808. The registration of a new non-third party into the member table 401 in S812 is a specific example of the registration in S111 in FIG. 1.

According to the process in FIG. 14, a situation where "a file is written to a shared folder that may be accessed from a third party due to carelessness of a user, resulting in information leakage occurring" may be avoided. According to the process in FIG. 14, furthermore, no warnings are issued for the writing of a file to a shared folder that may be accessed only from a non-third party. Therefore, a situation where "excessive generation of warnings reduces users' operation efficiency" may also be avoided.

As described above, in the second embodiment, a process similar to the process in the first embodiment is also performed. In the following, a specific example of the management DB 400 when a process similar to the process in the first embodiment and the process in FIG. 14 are performed in certain order will be described with reference to FIG. 15.

FIG. 15 is a diagram illustrating examples of the management DB 400. In FIG. 15, management DBs 400f and 400g are illustrated as specific examples of the management DB 400. The management DB 400f is specifically an example of a case under the following assumptions (31-1) to (31-7):

(31-1) It is assumed that the host name of the file server 115 is "srv". Further, it is assumed that a shared folder indicated by the fully-qualified path name "\\srv\shared" exists on the file server 115.

(31-2) It is assumed that a read permission for the shared folder indicated by the fully-qualified path name "\\srv\shared" is assigned to three user accounts respectively identified by the account names "name_A", "name_B", and "name_D". It is assumed that the account names "name_A", "name_B", and "name_D" are the account names of the users of the client PCs 112, 113, and 114, respectively.

(31-3) It is assumed that a user of the client PC 112 performs an operation for writing a file identified by a file ID "F000103" to the shared folder indicated by the fully-qualified path name "\\srv\shared" when the management DB 400 is in the state of the management DB 400e in FIG. 8. As indicated by the file location table 402e in the management DB 400e, the client PC 112 having the host name "PC_A" locally saves the file identified by the file ID "F000103".

(31-4) The detection unit 213 of the client PC 112 detects the operation in the assumption (31-3), and the determination unit 214 of the client PC 112 starts the process in FIG. 14. Thus, from the management DB 400e in FIG. 8 and from the assumption (31-2), the account name "name_D" is added to the warning list, and, in S809, a warning is issued.

(31-5) It is assumed that the user of the client PC 112 gives a permission in response to the warning.

(31-6) As a result of the input in the assumption (31-5) described above, in S812, an entry that associates the file ID "F000103" with the account name "name_D" is added to the member table 401.

(31-7) In S808 that follows S812, an entry that associates the file ID "F000103" with location information indicated by the fully-qualified path name "\\srv\shared\Z.txt" is added to the file location table 402. Then, the process in FIG. 14 ends.

In the case under the assumptions (31-1) to (31-7) described above, the management DB 400 changes from the state of the management DB 400e in FIG. 8 to the state of the management DB 400f in FIG. 15.

As indicated in the file location table 402e illustrated in FIG. 8, the client PC 113 having the host name "PC_B" also locally saves the file identified by the file ID "F000103". Thus, even when the file is written to the shared folder from the client PC 113 rather than the client PC 112, the management DB 400 changes from the state of the management DB 400e to the state of the management DB 400f in a manner similar to the assumptions (31-4) to (31-7).

Further, the management DB 400g in FIG. 15 is specifically an example in a case under the following assumptions (32-1) to (32-6):

(32-1) It is assumed that the assumptions (31-1) to (31-2) described above hold true.

(32-2) It is assumed that a user of the client PC 114 performs an operation for copying a file indicated by the fully-qualified path name "\\srv\shared\Z.txt" to the client PC 114 when the management DB 400 is in the state of the management DB 400f in FIG. 15. Specifically, it is assumed that the fully-qualified path name in the client PC 114 at the copy destination is "C:\path_D\Z_copy.txt".

(32-3) In the first embodiment, the process in FIG. 12 is executed in response to, as a trigger, the copying, moving, or renaming performed locally in one host. In the second embodiment, not only an operation similar to that of the first embodiment but also writing of a file to a local storage device from the shared folder, which is performed by the copying, moving, or renaming operation, becomes a trigger to start the process in FIG. 12. Thus, the process in FIG. 12 is started by the copying operation in the assumption (32-2).

(32-4) In the assumption (32-2) described above, an input of an instruction for performing the copying operation is given to the client PC 114. In S601 in FIG. 12, thus, the host name of the client PC 114, i.e., "PC_D", is acquired. In addition, from the assumption (32-2), in S601, "C:\path_D\Z_copy.txt" is acquired as the fully-qualified path name in the copy destination.

(32-5) From the assumption (32-2) described above and the file location table 402f in FIG. 15, in S601, "F000103" is acquired as the file ID of the file to be copied.

(32-6) From the assumptions (32-4) and (32-5) described above, in S604, new location information indicated by a pair of the host name "PC_D" and the fully-qualified path name "C:\path_D\Z_copy.txt" is associated with the file ID "F000103". That is, a new entry that associates the file ID with the new location information is added to the file location table 402.

In the case under the assumptions (32-1) to (32-6) described above, the management DB 400 changes from the state of the management DB 400f in FIG. 15 to the state of the management DB 400g in FIG. 15.

In the second embodiment, in addition to in the assumption (32-3), when a file in a shared folder is renamed in the shared folder, the process in FIG. 12 is started. In the second embodiment, furthermore, the process in FIG. 12 is started also when a file in a shared folder is copied or moved to another shared folder.

According to the second embodiment described above, advantages similar to those in the first embodiment may be obtained. That is, with regard to exchange of information via electronic mail, a third party and a non-third party are distinguished from each other regardless of whether the third party and the non-third party are inside or outside the LAN 110 managed by the management server 117. When there is a risk of information leakage to a third party, a warning is issued.

In the second embodiment, furthermore, also with regard to exchange of information via shared folders within the LAN 110, it is determined whether a user in the LAN 110 who is able to access the shared folder is a third party or a non-third party. When there is a risk of information leakage to a third party within the LAN 110 via the shared folder, a warning is issued. In the second embodiment, therefore, more excellent information protection performance than that in the first embodiment may be achieved.

Subsequently, a third embodiment for reducing processing loads by narrowing down the targets to be monitored to files for which information leakage is likely to occur due to careless mistake will be described with reference to FIGS. 16 to 19.

In the third embodiment, the system 200 in FIG. 3 is implemented as a stand-alone system. That is, the management server 117 in FIG. 2 is not used in the third embodiment. Further, each of the client PCs 112 to 114 in FIG. 2 includes the system 200 in FIG. 3.

In the following, for convenience of description, a description will be made mainly of the operation of the system 200 in the client PC 112. However, the client PCs 113 and 114 also perform processes similar to those in the client PC 112.

In either of the first embodiment and the second embodiment, it is possible to suppress information leakage due to careless mistake. In the first embodiment and the second embodiment, however, the processing load on the management server 117 and the processing load on the client PCs 112 to 114 are relatively high. The following reasons (33-1) to (33-7) are considered:

(33-1) In either of the first embodiment and the second embodiment, the process in FIG. 5 is performed each time a file is locally generated.

(33-2) In either of the first embodiment and the second embodiment, the process in FIG. 10 is performed each time an electronic mail with a file attached is received.

(33-3) In either of the first embodiment and the second embodiment, the process in FIG. 11 is performed each time an attached file is locally saved.

(33-4) In either of the first embodiment and the second embodiment, the process in FIG. 12 is performed each time a file is locally copied, moved, or renamed in a certain host.

(33-5) In the second embodiment, in addition, the process in FIG. 12 is performed each time a file is copied or moved to a local storage device from a shared folder.

(33-6) In the second embodiment, in addition, the process in FIG. 12 is performed each time a file in a shared folder is renamed in the shared folder.

(33-7) In the second embodiment, in addition, the process in FIG. 12 is performed each time a file is copied or moved between two shared folders.

However, for example, a file locally generated in the client PC 112 may be merely locally referred to in the client PC 112 by the user of the client PC 112. That is, all the generated files may not necessarily be attached to electronic mails to be sent from the client PC 112 or may not necessarily be copied to shared folders.

Further, the user of the client PC 112 may merely read an attached file in a received electronic mail. That is, all the electronic mails with files attached may not necessarily be forwarded. In addition, an attached file in an electronic mail may not necessarily be attached to another electronic mail and sent to someone after the file is edited (or directly attached to another electronic without being edited).

Further, a file copied or moved from a shared folder to the client PC 112 may not necessarily be copied or moved to another shared folder later, or may not necessarily be attached to an electronic mail and sent to someone.

In the first embodiment and the second embodiment, therefore, while suppression of information leakage due to carelessness is ensured, the processes in FIGS. 5, 10, 11, and 12 are also performed for a file that is not sent outside from the client PC 112. Therefore, the above processes place a large load on the client PC 112 and the management server 117.

Of course, it is not determined in advance whether or not there is a possibility of each individual file being sent outside from the client PC 112. In the first embodiment and the second embodiment, therefore, the processes in FIGS. 5, 10, 11, and 12 are performed in the way described above in order to ensure suppression of information leakage due to carelessness. That is, in the first embodiment and the second embodiment, all the locally generated files are targets to be monitored, and all the files to be locally saved via electronic mail or shared folders are targets to be monitored.

On the other hand, for some reason, it may be desirable that the processing load on the client PCs 112 to 114 and the management server 117 be reduced. In the third embodiment, therefore, files to be monitored are narrowed down to reduce processing loads.

Specifically, in the third embodiment, the targets to be monitored are narrowed down to only files for which information leakage is predicted to be likely to occur due to careless mistake. In other words, in the third embodiment, files with a high risk of information leakage are monitored while files with a low risk of information leakage are not monitored.

In general, it is expected that users are familiar with the content of files created by them. Therefore, it is expected that users generally know who is a non-third party and who is a third party for files created by them. Thus, the risk of such users allowing leakage of their created files to third parties to occur due to their carelessness is relatively low.

On the other hand, users are not necessarily familiar with the content of files created by other users, and may not be aware of how sensitive the information included in the files is. When users are not familiar with the content of files, they may not accurately recognize who is a non-third party and who is a third party. As a consequence, such users may allow leakage of information to occur due to their carelessness.

That is, for a certain user, a file for which information leakage is predicted to be likely to occur due to careless mistake is a file other than a file created by the user. In the third embodiment, accordingly, files to be monitored are narrowed down to files for which information leakage is predicted to be likely to occur due to careless mistake.

As described above, the system 200 according to the third embodiment is a stand-alone system, and is implemented in, for example, a single computer 300. Therefore, a file for which information leakage is predicted to be likely to occur due to careless mistake is a file that has been generated outside the computer 300 in which the system 200 is implemented and that has been provided to the computer 300 via the network 311. In the following, for convenience of description, such an externally originating file that has been externally provided is referred to as a "foreign file".

Incidentally, it is to be understood, from the definition of the foreign file, that information indicating the origin of a foreign file is not information (for example, IP address) identifying the computer 300 in which the system 200 is implemented. It is also to be understood that information indicating the origin of a foreign file is not information (for example, electronic mail address or account name) identifying the user of the computer 300.

Specifically, information indicating the origin of a foreign file has different types depending on the origin of the foreign file. The information indicating the origin is also used as information indicating a non-third parry (that is, the non-third party identification information 232 in FIG. 2).

Next, a specific example of information used as the file identification information 231 and the non-third party identification information 232 in FIG. 3 according to the third embodiment will be described with reference to FIG. 16. In the third embodiment, a foreign file management table 404 illustrated in FIG. 16 is a table used in place of the management DB 400 according to the first and second embodiments.

Each entry in the foreign file management table 404 associates a file with a non-third party. Specifically, each entry in the foreign file management table 404 includes three fields, that is, "file", "attribute type", and "attribute value".

The "file" field indicates the fully-qualified path name of a file. In the third embodiment, since the system 200 in FIG. 3 is a stand-alone system, each file included in a single host in which the system 200 is implemented (for example, the client PC 112) may be uniquely identified by the fully-qualified path name of the file. That is, the fully-qualified path name in the "file" field is a specific example of the file identification information 231 in FIG. 3.

The "attribute type" field indicates the type of the value in the "attribute value" field. The "attribute value" field indicates a non-third party. That is, the value in the "attribute value" field is a specific example of the non-third party identification information 232 in FIG. 3.

As described above, in the third embodiment, there are various types of information indicating the origin depending on the origin. In the third embodiment, there are also various types of information indicating the non-third party other than the origin. Thus, the "attribute type" field indicates which type of information is registered in the "attribute value" field in the foreign file management table 404 as the non-third party identification information 232.

As specific examples, FIG. 16 illustrates, by way of example, six entries in the foreign file management table 404.

A first entry indicates that a non-third party of a file identified by a fully-qualified path name "C:\path_A1\Z1.txt" is identified by an electronic mail address "b@foo.com".

That is, the file indicated by the first entry is exchanged via electronic mail between the user identified by the above electronic mail address and the user of the host that stores the foreign file management table 404. Thus, the "attribute type" field of the first entry stores a value representing "electronic mail".

A second entry indicates that a non-third party of a file identified by a fully-qualified path name "C:\path_A2\Z2.txt" is identified by a fully-qualified path name in the UNC format "\\srv\shared_X\". That is, according to the second entry, all the users who may access the shared folder identified by the fully-qualified path name "\\srv\shared_X\" are non-third parties of the file identified by the fully-qualified path name "C:\path_A2\Z2.txt".

Further, the file indicated by the second entry is exchanged via the shared folder between a user who may access the shared folder and the user of the host that stores the foreign file management table 404. The exchange of the file via the shared folder is specifically implemented by the copying, moving, or renaming operation of the file between the shared folder and the local storage device of the host that stores the foreign file management table 404. Thus, the "attribute type" field of the second entry stores a value representing "copy/move/rename".

A third entry indicates that a non-third party of the file identified by the fully-qualified path name "C:\path_A3\Z3.txt" is identified by the identification information "123-456-7890". In the example in FIG. 16, it is assumed that the identification information "123-456-7890" is information identifying a recording medium such as a USB memory.

Some recording media are assigned identification information uniquely identifying the recording media, and store the assigned identification information. The identification information may be read via, for example, a system tool or the like provided by the OS.

For example, identification information concerning a certain type of USB memory is a combination of a vendor ID, a product ID, and a serial number. The identification information may be read as a "Plug and Play (PnP) device ID" via a system tool.

In the third entry, as described above, a non-third party is indicated by identification information concerning a recording medium. In other words, according to the third entry, all the users who are expected to obtain the recording medium with authorization are non-third parties.

The file of the third entry is exchanged between non-third parties via the recording medium. The exchange of the file via the recording medium is specifically implemented by the copying, moving, or renaming operation of the file between the recording medium and a local storage device of the host that stores the foreign file management table 404. Thus, the "attribute type" field of the third entry also stores the value representing "copy/move/rename".

A fourth entry indicates that a non-third party of a file identified by a fully-qualified path name "C:\path_A4\Z4.txt" is identified by a Fully Qualified Domain Name (FQDN) "ftp.abcd.org". In the example in FIG. 16, it is assumed that the host identified by the FQDN "ftp.abcd.org" is specifically the FTP server 123 in FIG. 2.

In the fourth entry, therefore, a non-third party is indicated by the FQDN identifying the FTP server 123. In other words, according to the fourth entry, all the users who may access the FTP server 123 (that is, at least users who are authorized to download a file from the FTP server 123) are non-third parties.

The file indicated by the fourth entry is exchanged via the FTP server 123 between a user who may access the FTP server 123 and the user of the host (for example, the client PC 112) that stores the foreign file management table 404. Thus, the "attribute type" field of the fourth entry stores a value representing "FTP".

A fifth entry indicates that a non-third party of the file identified by the fully-qualified path name "C:\path_A5\Z5.txt" is identified by the FQDN "www.efgh.com". In the example in FIG. 16, it is assumed that the host identified by the FQDN "www.efgh.com" is specifically the HTTP server 122 in FIG. 2.

In the fifth entry, therefore, a non-third party is indicated by the FQDN identifying the HTTP server 122. In other words, all the users who may access the HTTP server 122 (that is, at least users who are authorized to download a file from the HTTP server 122) are non-third parties.

The file indicated by the fifth entry is exchanged via the HTTP server 122 between a user who may access the HTTP server 122 and the user of the host (for example, the client PC 112) that stores the foreign file management table 404. Thus, the "attribute type" field of the fifth entry stores a value representing "HTTP".

A sixth entry indicates that a non-third party of a file identified by a fully-qualified path name "C:\path_A1\Z1.txt" is identified by a fully-qualified path name in the UNC format "\\srv\shared_Y\". As in the second entry, also in the sixth entry, the "attribute value" field indicates the fully-qualified path name of the shared folder. Thus, the "attribute type" field has the value representing "copy/move/rename".

Here, the fully-qualified path names in the "file" fields of the sixth and first entries are the same. Thus, not only the user having the electronic mail address "b@foo.com" but also all the users who may access the shared folder indicated by the fully-qualified path name "\\srv\shared_Y\" are non-third parties regarding the file indicated by the fully-qualified path name "C:\path_A1\Z1.txt".

Therefore, when a plurality of non-third parties regarding a certain file are identified by different attribute values, the foreign file management table 404 includes a plurality of entries having equal values in the "file" fields.

In the fourth and fifth entries, FQDNs are used as the non-third party identification information 232. However, it is to be understood that IP addresses may be used instead of FQDNs. Alternatively, when access privilege settings differ depending on the folder in the FTP server 123, information obtained by concatenating a path in the FTP server 123 with an FQDN, such as "ftp.abcd.org/aa/bb/", may be used. The same applies to the HTTP server 122.

Subsequently, processes performed in the third embodiment will be described with reference to FIGS. 17 to 19. While, for convenience of description, a description will be given in the context of the operation of the system 200 in FIG. 3 that is implemented in the client PC 112 in FIG. 2, the client PCs 113 and 114 also perform similar operations.

Figure 17:
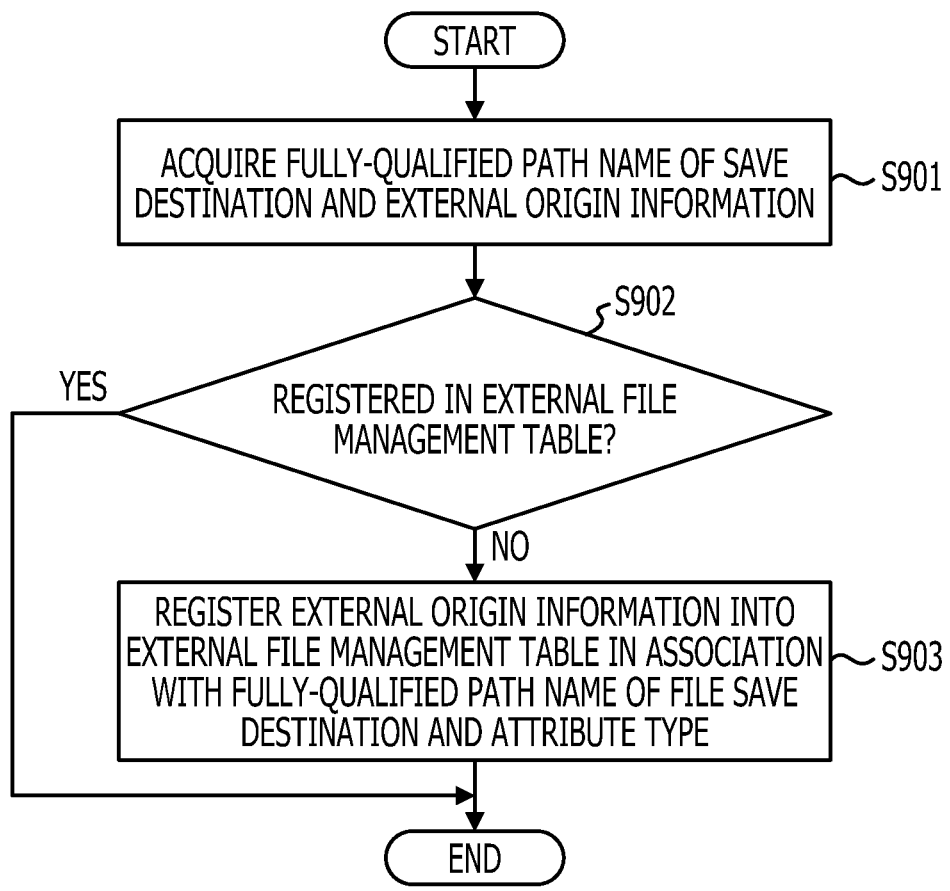
FIG. 17 is a flowchart of a foreign file registration process.

FIG. 17 is a flowchart of a foreign file registration process. The process in FIG. 17 is a specific example of the processing of S101 in FIG. 1.

The process in FIG. 17 is specifically executed when a foreign file is saved in the client PC 112. For example, the process in FIG. 17 is executed in one of the following cases (34-1) to (34-5):

(34-1) An attached file in an electronic mail is saved in the client PC 112.

(34-2) A file is written to the client PC 112 from a shared folder on the file server 115 or the like through the copying, moving, or renaming operation.

(34-3) The recording medium 310 is set in the drive device 308 of the computer 300 serving as the client PC 112, and a file is written to the storage device 307 from the recording medium 310 through the copying, moving, or renaming operation.

(34-4) A file is downloaded from the HTTP server 122 to the client PC 112.

(34-5) A file is downloaded from the FTP server 123 to the client PC 112.

More specifically, in the case (34-1), similarly to the detection unit 213 that detects the attached file saving operation as a trigger to start the process in FIG. 11 according to the first embodiment, the origin recognition unit 211 detects a trigger to start the process in FIG. 17. For example, upon detecting an attached file saving operation including a series of operations such as the operations (18-1) to (18-4) described with reference to FIG. 11, the origin recognition unit 211 starts the process in FIG. 17.

In some cases, a plurality of attached files may be simultaneously specified as targets to be saved by the user. That is, in the operation (18-2), 1<L may hold true. In this case, the process in FIG. 17 is performed for each of the attached files to be saved.

In addition, in the case (34-2), similarly to the detection performed by the detection unit 213 which has been described with reference to the assumption (32-3) regarding the management DB 400g in FIG. 15, the origin recognition unit 211 detects a trigger to start the process in FIG. 17. That is, upon detecting the writing of a file from a shared folder to the client PC 112 (that is, the writing of a file through the copying, moving, or renaming operation), the origin recognition unit 211 starts the process in FIG. 17.

In some cases, a user may perform an operation for simultaneously writing a plurality of files from a shared folder to the client PC 112. In such cases, the process in FIG. 17 is performed for each of the files to be written.

In addition, in the case (34-3), the origin recognition unit 211 detects the writing of a file from the recording medium 310 to the storage device 307 of the client PC 112. That is, the origin recognition unit 211 detects the writing of a file from the recording medium 310 to the storage device 307 by using a method such as hooking a call to a command for copying, moving, or renaming or a call to an API function. Upon detecting the writing of a file from the recording medium 310, the origin recognition unit 211 starts the process in FIG. 17.

In some cases, a user may perform an operation for simultaneously writing a plurality of files from the recording medium 310 to the client PC 112. In such cases, the process in FIG. 17 is performed for each of the files to be written.

In addition, in the case (34-4), the origin recognition unit 211 detects a download of a file from the HTTP server 122 to the client PC 112. Upon detecting a download of a file, the origin recognition unit 211 starts the process in FIG. 17.

For example, the origin recognition unit 211 may monitor the operation of a process according to an HTTP client software (such as a web browser) operating on the client PC 112, and may detect a download of a file via HTTP from the HTTP server 122. In some cases, a user may perform an operation for simultaneously downloading a plurality of files. In such cases, the process in FIG. 17 is performed for each of the files to be downloaded.

In addition, in the case (34-5), the origin recognition unit 211 detects a download of a file from the FTP server 123 to the client PC 112. Upon detecting a download of a file, the origin recognition unit 211 starts the process in FIG. 17.

For example, the origin recognition unit 211 may monitor the operation of a process according to an FTP client software operating on the client PC 112, and may detect a download of a file via FTP from the FTP server 123. In some cases, a user may perform an operation for simultaneously downloading a plurality of files. In such cases, the process in FIG. 17 is performed for each of the files to be downloaded.

When the process in FIG. 17 is started in the above manner, in S901, the origin recognition unit 211 acquires the following pieces of information (35-1) and (35-2):

(35-1) The fully-qualified path name of the save destination of a file in the local storage device 307 of the client PC 112.

(35-2) External origin information indicating the origin of a foreign file.

For example, in the case (34-1), the origin recognition unit 211 may detect a trigger to start the process in FIG. 17 by hooking the attached file saving operation performed on the mail user agent.

Then, the origin recognition unit 211 may acquire the fully-qualified path name (35-1) from the content of the input operation performed by the user on the mail user agent. Further, the origin recognition unit 211 acquires the sender's electronic mail address as the external origin information (35-2) from the "From" header field of an electronic mail having attached thereto a file to be saved. The origin recognition unit 211 further recognizes that the attribute type is "electronic mail".

As given in the operations (23-1) to (23-7) by way of example, the writing of a file through the copying, moving, or renaming operation is specifically performed via a command provided by the OS, a GUI provided by the OS or a process according to application software.

In the case (34-2), therefore, the origin recognition unit 211 may detect an operation for copying, moving, or renaming a file by, for example, hooking a call to a command or a call to an API function. Further, the origin recognition unit 211 acquires the fully-qualified path name (35-1) in the client PC 112 from an argument of a command for copying, moving, or renaming or from an argument of the API function, and the fully-qualified path name of the shared folder serving as the external origin information (35-2). The origin recognition unit 211 further recognizes that the attribute type is "copy/move/rename".

Similarly, in the case (34-3), the origin recognition unit 211 may detect an operation for copying, moving, or renaming a file by, for example, hooking a call to a command or a call to an API function. Further, the origin recognition unit 211 acquires the fully-qualified path name (35-1) in the client PC 112 from an argument of a command for copying, moving, or renaming or from an argument of the API function.

Further, the origin recognition unit 211 recognizes from an argument of the above command or API function that a file is written from the recording medium 310 to the client PC 112. Therefore, the origin recognition unit 211 reads the identification number (for example, the PnP device ID) of the recording medium 310 serving as the external origin information (35-2) by using the system tool or the like provided by the OS. Further, the origin recognition unit 211 recognizes that the attribute type is "copy/move/rename".

In the case (34-4), the origin recognition unit 211 may acquire the content of the instruction given by the user to a process according to the HTTP client software by, for example, monitoring the operation of the process according to the HTTP client software. That is, the origin recognition unit 211 may acquire the fully-qualified path name of the download destination of the file, which is specified in the instruction given by the user to the process according to the HTTP client software, as the fully-qualified path name (35-1). The origin recognition unit 211 may monitor the operation of the process according to the HTTP client software by, specifically, hooking a call to an API function from the process according to the HTTP client software.

Further, the origin recognition unit 211 may extract, from the Uniform Resource Identifier (URI) of a file that the user has instructed the process according to the HTTP client software to download, the FQDN of the HTTP server 122 that stores the file. The extracted FQDN is used as the external origin information (35-2). Further, the origin recognition unit 211 recognizes that the attribute type is "HTTP".

Further, in the case (34-5), the origin recognition unit 211 may acquire the content of the instruction given by the user to a process according to the FTP client software by, for example, monitoring the operation of the process according to the FTP client software. That is, the origin recognition unit 211 may acquire, as the fully-qualified path name (35-1), the fully-qualified path name of the download destination of the file that the user has instructed the process according to the FTP client software to download. The origin recognition unit 211 may specifically monitor the operation of the process according to the FTP client software by hooking a call to the API function from the process according to the FTP client software.

Further, the origin recognition unit 211 may extract, from the URI of a file that the user has instructed the process according to the FTP client software to download, the FQDN of the FTP server 123 that stores the file. The extracted FQDN is used as the external origin information (35-2). Further, the origin recognition unit 211 recognizes that the attribute type is "FTP".

Accordingly, in any of the cases (34-1) to (34-5), in S901, the origin recognition unit 211 acquires the fully-qualified path name (35-1) and the external origin information (35-2). As described above, furthermore, the origin recognition unit 211 also recognizes the attribute type. Then, the origin recognition unit 211 notifies the registration unit 212 of the acquired fully-qualified path name (35-1), the acquired external origin information (35-2), and the recognized attribute type.

Then, in S902, the registration unit 212 determines whether or not the information acquired by the origin recognition unit 211 in S901 has already been registered in the foreign file management table 404. That is, the registration unit 212 searches the foreign file management table 404 for an entry in which the value of the "file" field is the fully-qualified path name (35-1) and in which the value of the "attribute value" field is the external origin information (35-2).

When an entry is found as a result of search, the information acquired in S901 has already been registered in the foreign file management table 404. Therefore, the process in FIG. 17 ends.

Conversely, when no entries are found as a result of search, the information acquired in S901 has not yet been registered in the foreign file management table 404. Therefore, the process proceeds to S903.

In S903, the registration unit 212 registers the external origin information into the foreign file management table 404 in association with the fully-qualified path name in the file save destination and the attribute type. That is, the registration unit 212 adds a new entry to the foreign file management table 404. The registration unit 212 sets the fully-qualified path name (35-1) in the "file" field of the new entry, the value of the attribute type notified from the origin recognition unit 211 in the "attribute type" field of the new entry, and the external origin information (35-2) in the "attribute value" field of the new entry. Then, the process in FIG. 17 ends.

Subsequently, an output confirmation process performed when a file is to be output to a remote machine will be described with reference to FIG. 18. The process in FIG. 18 corresponds to a specific example of the process in S103 to S111 in FIG. 1.

Here, similarly to the above description, a description will be given of a case where the system 200 in FIG. 3 is implemented in the client PC 112 in FIG. 2, by way of example. A file is specifically to be output to a remote machine in, for example, any of the following cases (36-1) to (36-5). Thus, the process in FIG. 18 is started in any of the cases (36-1) to (36-5):

(36-1) One or more files locally saved in the client PC 112 are attached to an electronic mail and the electronic mail is to be sent from the client PC 112.

(36-2) One or more files locally saved in the client PC 112 are to be written to a shared folder on the file server 115 or the like through the copying, moving, or renaming operation.

(36-3) One or more files locally saved in the client PC 112 are to be written to the recording medium 310 through the copying, moving, or renaming operation.

(36-4) One or more files locally saved in the client PC 112 are to be uploaded to the HTTP server 122.

(36-5) One or more files locally saved in the client PC 112 are to be uploaded to the FTP server 123.

Figure 18:
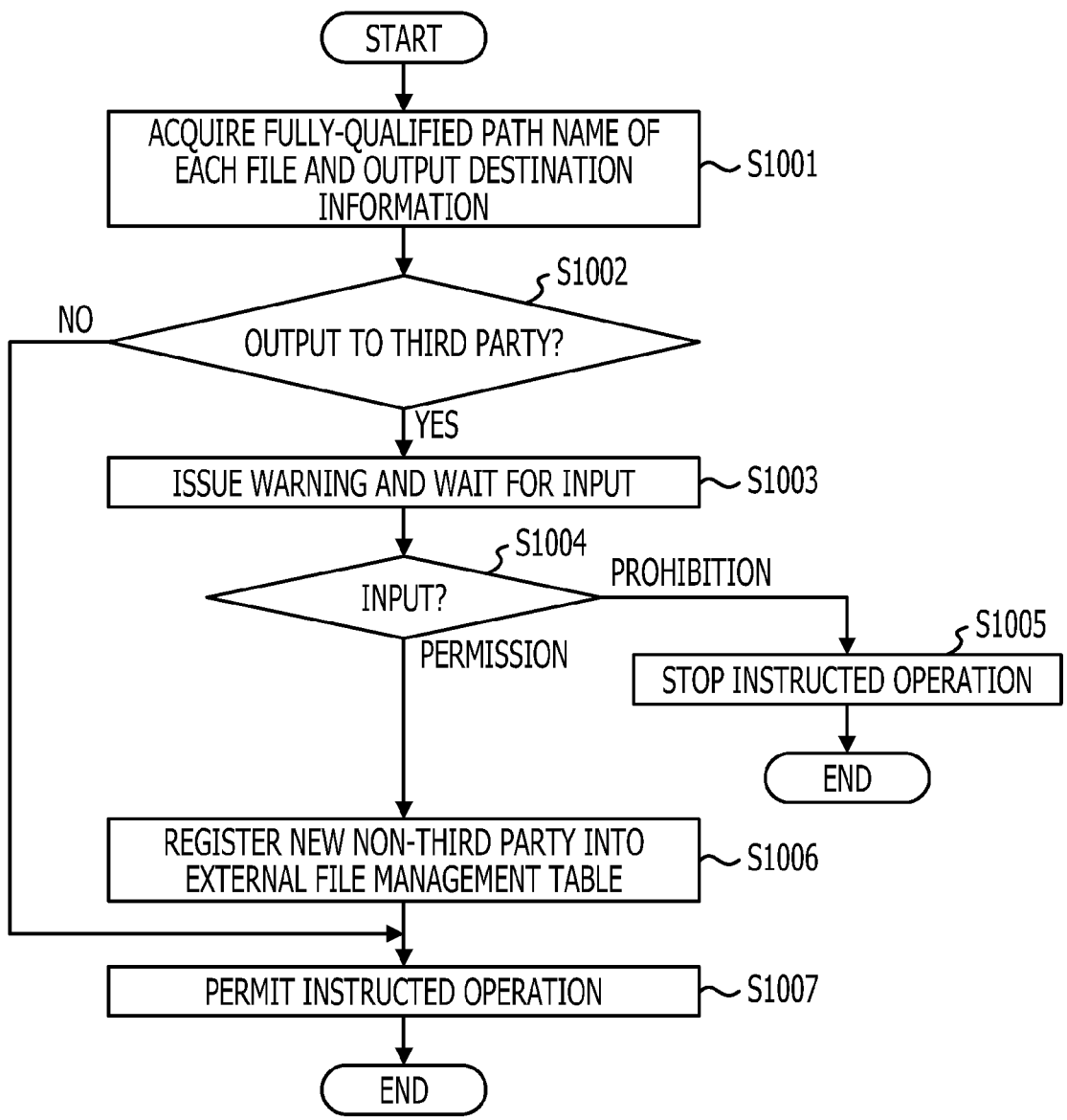
FIG. 18 is a flowchart of an output confirmation process performed when a file is to be output to a remote machine.

For example, in the case (36-1), the process in FIG. 18 is started in a manner similar to the case where the process in FIG. 9 is started. Specifically, when a user of the client PC 112 performs an input operation for sending an electronic mail, such as clicking the "send" button on the mail user agent, the detection unit 213 in the system 200 on the client PC 112 detects the input operation.

Upon detecting an input operation for sending an electronic mail, the detection unit 213 notifies the determination unit 214 of information indicating the content of the detected input operation. Then, the determination unit 214 determines whether or not an electronic mail to be sent has a file attached. When one or more files are attached, the determination unit 214 starts the process in FIG. 18.

In the case (36-2), the process in FIG. 18 is started in a manner similar to when the process in FIG. 14 is started. That is, when the user performs on the client PC 112 an input operation for writing a file to a shared folder, the detection unit 213 detects the input operation.

The cases (28-1) to (28-3) where, by way of example, the process in FIG. 14 is started are examples regarding the client PC 113. However, it is to be understood that the detection unit 213 of the client PC 112 may also detect an input operation similar to those in the cases (28-1) to (28-3) performed in the client PC 112.

Upon detecting an input operation for writing a file to a shared folder, the detection unit 213 notifies the determination unit 214 of information indicating the content of the detected input operation. Then, the determination unit 214 starts the process in FIG. 18.

In addition, also in the case (36-3), the detection unit 213 may detect an input operation for writing a file to the recording medium 310 using a method similar to that in the case (36-2). That is, the detection unit 213 detects an input operation for writing a file to the recording medium 310 from the storage device 307 of the client PC 112 using a method such as hooking a call to a command for copying, moving, or renaming or a call to an API function.

Upon detecting an input operation for writing a file to the recording medium 310, the detection unit 213 notifies the determination unit 214 of information indicating the content of the detected input operation. Then, the determination unit 214 starts the process in FIG. 18.

In addition, in the case (36-4), the detection unit 213 may detect an input operation for uploading a file to the HTTP server 122 by monitoring the operation of a process according to the HTTP client software operating on the client PC 112.

For example, in order to upload a file, the user may perform a series of input operations such as clicking an "upload" button, specifying the location of the file via a dialog, and clicking an "OK" button. The detection unit 213 may monitor the operation of the process according to the HTTP client software to detect that the above series of input operations has been performed. For example, the detection unit 213 may detect the above input operations by hooking a call to an API function for generating an HTTP request in which a POST method or a PUT method is specified.

Upon detecting an input operation for uploading a file to the HTTP server 122, the detection unit 213 notifies the determination unit 214 of information indicating the content of the detected input operation. Then, the determination unit 214 starts the process in FIG. 18.

In addition, in the case (36-5), the detection unit 213 may also detect an input operation for uploading a file to the FTP server 123 by monitoring the operation of a process according to the FTP client software operating on the client PC 112.

For example, in order to upload a file, the user may input a command. Alternatively, the user may perform a series of input operations such as selecting the icon of the file via a GUI and clicking the "upload" button. The detection unit 213 may monitor the operation of the process according to the FTP client software to detect that an input operation for uploading a file has been performed.

For example, the detection unit 213 may detect the above input operations by monitoring a key input from a command line. Alternatively, the detection unit 213 may detect the above input operations by hooking a call to an API function for generating an FTP request.

Upon detecting an input operation for uploading a file to the FTP server 123, the detection unit 213 notifies the determination unit 214 of information indicating the content of the detected input operation. Then, the determination unit 214 starts the process in FIG. 18.

Accordingly, in any of the cases (36-1) to (36-5), the detection unit 213 detects an input operation of a user who wishes to output a file to a remote machine, and the determination unit 214 starts the process in FIG. 18.

Then, in S1001, the determination unit 214 acquires the fully-qualified path name of each file to be subjected to an operation and output destination information indicating an external output destination of the file. As described above, the determination unit 214 receives from the detection unit 213 information indicating the content of the input operation detected by the detection unit 213. Thus, the determination unit 214 may acquire the fully-qualified path name and the output destination information from the information received from the detection unit 213.

Specifically, in the case (36-1), the fully-qualified path name of each attached file in an electronic mail, which resides on the client PC 112, is acquired. Further, all the electronic mail addresses specified in the "To" header field, the "CC" header field, and the "BCC" header field of the electronic mail are acquired as output destination information.

In the case (36-2), the fully-qualified path name of each file to be written to a shared folder, which resides on the client PC 112, is acquired. Further, the fully-qualified path name of the shared folder is acquired as output destination information.

Further, in the case (36-3), the fully-qualified path name of each file to be written to the recording medium 310, which resides on the client PC 112, is acquired. In addition, identification information (such as the PnP device ID) concerning the recording medium 310 is acquired as output destination information.

Further, in the case (36-4), the fully-qualified path name of each file to be uploaded to the HTTP server 122, which resides on the client PC 112, is acquired. In addition, the FQDN or IP address of the HTTP server 122 is acquired as output destination information.

Further, in the case (36-5), the fully-qualified path name of each file to be uploaded to the FTP server 123, which resides on the client PC 112, is acquired. In addition, the FQDN or IP address of the FTP server 123 is acquired as output destination information.

Accordingly, in S1001, the determination unit 214 acquires the fully-qualified path name of each of one or more files to be subjected to an operation and one or more pieces of output destination information.

Then, in S1002, the determination unit 214 determines whether or not a foreign file is to be output to a third party through an operation instructed by the user. The processing of S1002 is a specific example of the processing of S107 in FIG. 1.

Specifically, the determination unit 214 determines whether or not each fully-qualified path name acquired in S1001 is stored in the "file" field of any entry in the foreign file management table 404. For example, when N (1≤N) fully-qualified path names have been acquired in S1001, the determination unit 214 performs the following process on each fully-qualified path name j, where 1≤j≤N.

When the acquired j-th fully-qualified path name is not stored in any of the entries in the foreign file management table 404, the file identified by the j-th fully-qualified path name is not a foreign file. Therefore, the output of the file identified by the j-th fully-qualified path name to a remote machine is not to be subjected to warning.

Conversely, when one or more entries in which the j-th fully-qualified path name is stored in the "file" field are found, the file identified by the j-th fully-qualified path name is a foreign file. Thus, the determination unit 214 further determines whether or not each piece of output destination information obtained in S1001 is stored in the "attribute value" field of any of the found one or more entries.

When there is a piece of output destination information that is not stored in the "attribute value" field of any of the found one or more entries, the determination unit 214 determines that "the piece of output destination information indicates a third party". In this case, the determination unit 214 further determines that "at least one foreign file is to be output to a third party through an operation instructed by the user".

Conversely, when each piece of output destination information is stored in the "attribute value" field of some of the found one or more entries, the determination unit 214 determines that "the foreign file identified by the j-th fully-qualified path name is to be output only to a non-third party but is not to be output to a third party".

The determination unit 214 performs determination for each of the acquired N fully-qualified path names in a manner described above, thereby determining "whether or not there is a foreign file to be output to a third party".

When a foreign file to be output to a third party is found, the process proceeds to S1003. In this case, for each foreign file determined "to be output to a third party", the determination unit 214 notifies the warning unit 221 of a pair of the fully-qualified path name of the foreign file and the output destination information that is determined to be a third party concerning the foreign file.

Conversely, when there is found no foreign files to be output to a third party, the determination unit 214 notifies the permission unit 223 that there is no information leakage to third parties. Then, the process proceeds to S1007.

For example, it is assumed that an electronic mail with two files attached is to be sent and that one electronic mail address is specified in each of the "To" header field, the "CC" header field, and the "BCC" header field of the electronic mail. In this case, in S1001, two fully-qualified path names and three electronic mail addresses are acquired.

For example, it is assumed that the fully-qualified path name of a first attached file out of the two attached files has not yet been registered in the foreign file management table 404 and the fully-qualified path name of a second attached file out of the two attached files has been registered in the foreign file management table 404. In this case, the determination unit 214 determines, for each of the three electronic mail addresses acquired as output destination information, whether the electronic mail address indicates a third party or a non-third party regarding the second attached file which is a foreign file. That is, when an entry that associates the fully-qualified path name of the second attached file with the electronic mail address is included in the foreign file management table 404, the electronic mail address indicates a non-third party; when such an entry is not included, the electronic mail address indicates a third party.

When all the three electronic mail addresses have been registered in the foreign file management table 404 as non-third parties of the second attached file, the process proceeds to S1007. However, when at least one of the three electronic mail addresses has not been registered as a non-third party, the process proceeds to S1003.

The above example is an example of sending an electronic mail in the case (36-1). However, it is to be understood that, also in the cases (36-2) to (36-5), the determination unit 214 may perform the determination of S1002 by searching the foreign file management table 404 using the fully-qualified path name and the output destination information acquired in S1001.

In S1003, the warning unit 221 issues a warning in accordance with the information notified by the determination unit 214.

For example, in an example of sending an electronic mail in the case (36-1), the warning unit 221 may issue a warning similar to that in S311 in FIG. 9.

Further, in the case (36-2), the warning unit 221 may display, for example, a dialog including a warning message, the "Yes" button, and the "No" button. Examples of the warning message may include "A file is to be written to a shared folder, but this shared folder has not been registered as a non-third party. There is a risk of information leakage to third parties through the writing of the file. Do you give a permission to write the file?"

In addition, the warning unit 221 may acquire a list of account names of users who may access a shared folder from the property of the shared folder. Further, the warning unit 221 may display the acquired list together with the warning message.

Also in the cases (36-3) to (36-5), the warning unit 221 may change the text of the warning message as appropriate and display a dialog similar to that in the case (36-2).

It is to be understood that, in any of the cases (36-1) to (36-5), the warning unit 221 may display, for the purpose of the reference of the user, the fully-qualified path name of each file determined by the determination unit 214 to be a "foreign file and to be output to a third party", in accordance with the information notified by the determination unit 214. The warning unit 221 may also issue an audio warning.

In any case, in S1003, the warning unit 221 issues a warning. Then, the warning unit 221 instructs the input accepting unit 222 to accept an input from the input device 240 in response to the warning. Then, in S1003, the input accepting unit 222 waits for an input (for example, a click of the "Yes" button or the "No" button) to be received from the input device 240.

When the input accepting unit 222 accepts an input from the input device 240 in response to the warning, the process proceeds to S1004. Then, in S1004, the input accepting unit 222 determines whether the accepted input is a permission input or a prohibition input.

When the input accepting unit 222 accepts a prohibition input, the input accepting unit 222 sends a notification to the prohibition unit 224. Then, the process proceeds to S1005.

Conversely, when the input accepting unit 222 accepts a permission input, the input accepting unit 222 notifies the permission unit 223 and the registration unit 212 that there is no information leakage to third parties. Then, the process proceeds to S1006.

In S1005, the prohibition unit 224 stops the operation instructed by the user. The prohibition unit 224 may prohibit the operation instructed by the user and stop the operation by canceling the input operation from the user detected by the detection unit 213.

For example, in the case (36-1), the prohibition unit 224 may cancel an input given from the user via the mail user agent to prohibit an electronic mail from being sent.

Alternatively, in the case (36-2), the prohibition unit 224 may cancel an input for writing a file to a shared folder, which has been given from the user via a process according to the OS or application software, to prohibit the file from being written to the shared folder. Also in the case (36-3), the prohibition unit 224 may cancel an input for writing a file to the recording medium 310, which has been given from the user via a process according to the OS or application software, to prohibit the file from being written to the recording medium 310.

In addition, in the case (36-4), the prohibition unit 224 may cancel an input given from the user via a process according to the HTTP client software to prohibit a file from being uploaded to the HTTP server 122. Further, in the case (36-5), the prohibition unit 224 may cancel an input given from the user via a process according to the FTP client software to prohibit a file from being uploaded to the FTP server 123.

When the prohibition unit 224 stops the operation instructed by the user in S1005 in the manner described above, the process in FIG. 18 also ends.

Further, in S1006, the registration unit 212 acquires from the determination unit 214 information indicating a target for which a warning is to be issued. Then, the registration unit 212 registers a new non-third party into the foreign file management table 404 in accordance with the information received from the determination unit 214.

Specifically, the information received by the registration unit 212 includes one or a plurality of pairs of the fully-qualified path name of a foreign file that is permitted to be output to a remote machine and output destination information indicating a third party that has not yet been registered as a non-third party. Thus, the registration unit 212 adds a new entry corresponding to each pair to the foreign file management table 404.

The registration unit 212 sets a value, as appropriate, in the "attribute type" field of the added entry. For example, the registration unit 212 may query the detection unit 213 about the type of the input operation detected by the detection unit 213.

For example, when the detection unit 213 has detected the input operation in the case (36-1), the registration unit 212 sets the attribute type "electronic mail". Further, when the detection unit 213 has detected the input operation in the case (36-2) or (36-3), the registration unit 212 sets the attribute type "copy/move/rename". In addition, when the detection unit 213 has detected the input operation in the case (36-4), the registration unit 212 sets the attribute type "HTTP". When the detection unit 213 has detected the input operation in the case (36-5), the registration unit 212 sets the attribute type "FTP".

When a new non-third party is registered in the foreign file management table 404 in S1006 in the above manner, the process proceeds to S1007.

In S1007, the permission unit 223 gives a permission to execute the operation instructed by the user. Then, the process in FIG. 18 ends.

As a result of the processing of S1007, the operation instructed by the user is executed via a process according to the OS or application software. Consequently, a file is output to a remote machine. For example, an electronic mail with an attached file is sent, a file is written to a shared folder, a file is written to the recording medium 310, a file is uploaded to the HTTP server 122, or a file is uploaded to the FTP server 123.

However, according to the process in FIG. 18, a file is output to a remote machine only when the file is not a foreign file, when one or a plurality of output destinations have all been registered as non-third parties, or when a previous third party output destination has been newly specified as a non-third party. According to the process in FIG. 18, therefore, a situation where "a user unintentionally provides access to a foreign file to a third party due to carelessness" may be avoided.

For efficient use of the storage device 307 of the client PC 112, an unnecessary entry in the foreign file management table 404 may be deleted. Specifically, the process in FIG. 19 may be performed.

Figure 19:
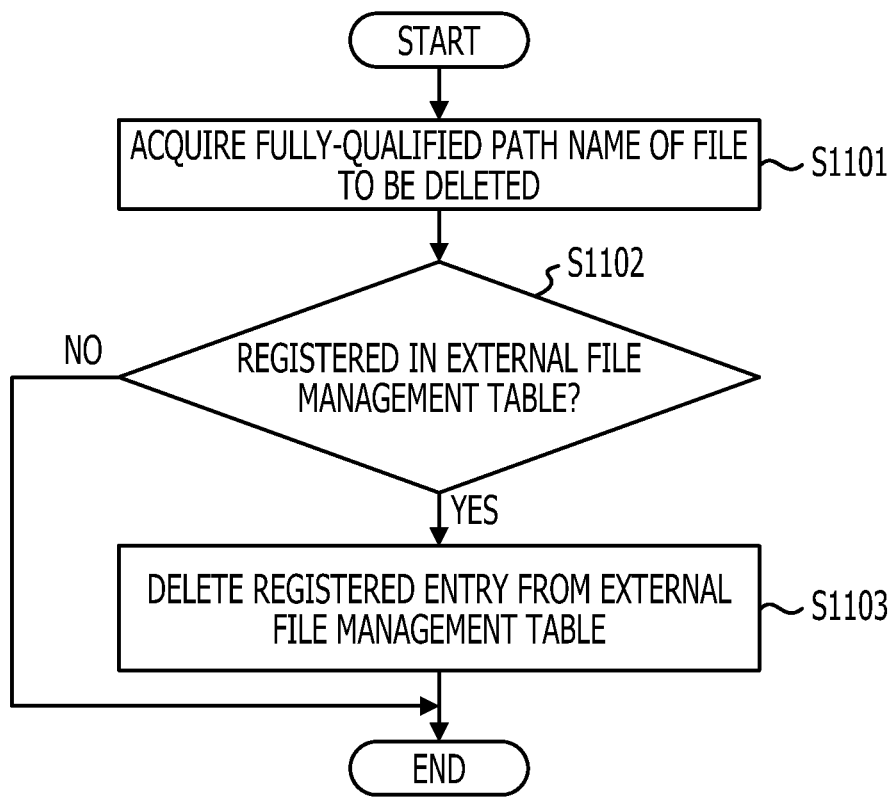
FIG. 19 is a flowchart of a foreign file information update process performed when a file is deleted.

FIG. 19 is a flowchart of a foreign file information update process performed when a file is deleted. The process in FIG. 19 is performed when a file locally saved in the client PC 112 is to be deleted.

An OS provides a command such as a "del" command, a menu for emptying the "trash box", or the like to delete a file. Thus, upon detecting a call to the above command or menu provided to delete a file, the detection unit 213 notifies the registration unit 212 of the content of the detected call. Then, the registration unit 212 starts the process in FIG. 19. The detection unit 213 may detect a call to the above command or menu using, for example, a hook.

In S1101, the registration unit 212 acquires the fully-qualified path name of a file to be deleted. The registration unit 212 may acquire the fully-qualified path name of a file to be deleted from the content notified by the detection unit 213.

The detection unit 213 may recognize the fully-qualified path name of a file to be deleted, based on, for example, an argument of the command and the fully-qualified path name of the current folder. Further, a file in the "trash box" is associated with information indicating the fully-qualified path name of a folder in which the file is originally placed. Thus, the detection unit 213 may recognize via, for example, the OS the fully-qualified path name of the location of the file to be deleted before the file is moved to the "trash box".

Then, in S1102, the registration unit 212 determines whether or not the fully-qualified path name notified by the detection unit 213 has been registered in the foreign file management table 404. That is, the registration unit 212 searches the foreign file management table 404 for an entry in which the notified fully-qualified path name is stored in the "file" field.

When no entries are found as a result of search, the file to be deleted is not a foreign file, and information regarding the file to be deleted is not originally included in the foreign file management table 404. Thus, the process in FIG. 19 ends.

Conversely, when an entry is found as a result of search, the file to be deleted is a foreign file. Thus, the process proceeds to S1103. As a result of search, a plurality of entries may be found as in a case where, for example, the file identified by the fully-qualified path name "C:\path_A1\Z1.txt" is deleted in the example in FIG. 16.

In S1103, the registration unit 212 deletes all the entries registered in the foreign file management table 404 regarding the file to be deleted (i.e., all the entries found in the search in S1102) from the foreign file management table 404. Then, the process in FIG. 19 ends.

In the third embodiment, although not illustrated in the drawings, when a file is locally copied, moved, or renamed in the client PC 112, a process similar to the process in FIG. 12 according to the first embodiment is performed.

Specifically, the operations (23-1) to (23-7) described with reference to FIG. 12 are detected by the detection unit 213. Further, the detection unit 213 acquires the fully-qualified path name of the original file to be copied, moved, or renamed, and a new fully-qualified path name of the file (i.e., the fully-qualified path name in the copy destination, the fully-qualified path name in the move destination, or the fully-qualified path name of a renamed file). Then, the detection unit 213 notifies the registration unit 212 of the acquired information.

Then, the registration unit 212 searches the foreign file management table 404 using the fully-qualified path name of the original file as a search key. When no entries are found as a result of search, the registration unit 212 does not update the foreign file management table 404. Conversely, when one or more entries are found as a result of search, the registration unit 212 performs the following process on each found entry.

When the detected operation is a copying operation, the registration unit 212 adds a new entry in which the acquired new fully-qualified path name is set in the "file" field and in which the same values as those in the entry found in the above search are set in the "attribute type" and "attribute value" fields. When the detected operation is a moving operation or a renaming operation, the registration unit 212 changes the value of the "file" field of the entry found in the above search to the acquired new fully-qualified path name.

The registration unit 212 updates the foreign file management table 404 in the manner described above. Thus, advantages similar to those in the process in FIG. 12 according to the first embodiment may be obtained. That is, even when a file is copied, moved, or renamed, the system 200 may keep track of the file and may manage the continuity of the file.

The embodiments discussed herein are not limited to the foregoing embodiments. While several modifications also have been described, a variety of modifications may also be made to the foregoing embodiments in terms of, for example, the following points. The foregoing embodiments and the following modifications may be used in combination, as desired, unless a conflict occurs.

A first modification relates to the order in which processes are executed. The operations in each of the flowcharts described above may be reordered, as desired, unless a conflict occurs. In addition, a plurality of operations that may be reordered may be executed in parallel. For example, operations may be reordered in the following manner.

For example, in FIG. 5, S201 and S202 may be reordered. S203 and S204 may also be reordered. In addition, in FIG. 9, S302 may be executed prior to S301, or may be executed subsequent to S304.

Moreover, in FIG. 10, the registration in S407 to S408 and the registration in S409 to S410 may be reordered. Further, in FIG. 12, S604 may be executed prior to S602. In FIG. 14, S801 and S802 may be reordered.

A second modification relates to the format and value of data. FIGS. 6 to 8 and 15 to 16 illustrate specific examples of various tables. Depending on the embodiment, the tables may have configurations different from those in the examples described above. For example, in FIGS. 6 to 8 and 15, the number of columns differs between when location information is represented by a combination of a host name and a fully-qualified path name in a host and when location information is represented by a fully-qualified path name in the UNC format including a host name. Such a difference in the number of columns is also merely for convenience of illustration. In addition, various pieces of data may not necessarily be managed using a table format.

For example, in FIG. 6, the member table 401b includes three entries, and the three entries have the same file ID. Thus, the member table 401 may be replaced with a table in which a list of non-third party members is associated with a file ID.

Alternatively, an associative array having a file ID as a key and a list of non-third party members as data may be used instead of the member table 401. Alternatively, in place of the management DB 400 of the table format, a DB having any other format, such as an Extensible Markup Language (XML) DB, may also be used.

The values illustrated in FIGS. 6 to 8 and 15 to 16 by way of example are merely for the purpose of illustration. For example, the format of the file ID may differ depending on the embodiment. Further, the format of the message ID also differs depending on the mail user agent or the like. The path notation also differs depending on the OS.

A third modification relates to the use of the account name. Specifically, the first embodiment may be modified such that account names are not used.

For example, in some cases such as when no shared folders are used in the LAN 110 or when every user in the LAN 110 has equivalent privileges for any kind of information, no consideration may be given of information leakage via shared folders. Therefore, account names may not necessarily be used. Specifically, for example, the first embodiment may be modified in the following manner.

In S201 in FIG. 5, the origin recognition unit 211 reads, instead of the account name, a sending electronic mail address from information set in a mail user agent installed on a machine in which the file has been generated. Then, in S204, instead of the account name, the sending electronic mail address is registered in the member table 401.

Further, in S301 in FIG. 9, the acquisition of the account name is omitted. Then, in S303, the determination of whether or not a pair of a file ID and an account name has been registered in the member table 401 is omitted.

Further, in S401 in FIG. 10, the acquisition of the account name is omitted. In addition, S407 and S408 are also omitted.

A fourth modification relates to the determination of which electronic mail address is to be automatically registered as a non-third party when sending or receiving an electronic mail.

In order to increase user convenience while reducing the number of times a warning is generated, it is advantageous to automatically register as a non-third party an electronic mail address indicating a user who is apparently considered to be a non-third party. However, even when the automatic registration of a non-third party is omitted, the generation of a warning merely involves a user performing a slightly time-consuming operation while the risk of information leakage does not increase. This is in contrast to the risk of information leakage increasing once a third party is incorrectly registered as a non-third party.

Therefore, an electronic mail address satisfying a certain condition may be automatically registered as a non-third party or automatic registration of such an electronic mail address may be omitted.

For example, it is assumed that an electronic mail sent from the electronic mail address "c@bar.org" by the client PC 124 outside the LAN 110 is received at the client PC 112 within the LAN 110. It is also assumed that the electronic mail has a file attached. In this case, according to the process illustrated in FIG. 10, the sender's electronic mail address "c@bar.org" is not automatically registered as a non-third party.

In the above case, however, the sender of the electronic mail is apparently a non-third party regarding the attached file. Thus, in S404, which is executed when an electronic mail from outside the LAN 110 managed by the management server 117 is received, the registration unit 212 may also perform the following process.

That is, the registration unit 212 reads the sender's electronic mail address from the received electronic mail. Then, the registration unit 212 adds, for each attached file, an entry that associates the file ID issued in S404 with the read sender's electronic mail address to the member table 401. As a consequence, for example, in the above case, the sender's electronic mail address "c@bar.org" is automatically registered as a non-third party.

Meanwhile, as described above, in the "To" and "CC" header fields of an electronic mail sent from the electronic mail address "c@bar.org", one or more electronic mail addresses of an external domain of the LAN 110 may be specified. Recipients in external domains indicated by the one or more electronic mail addresses of the external domain may be regarded as being permitted by the sender to access the attached file, and may actually access the attached file. Thus, such recipients may be regarded as non-third parties. However, according to the processes illustrated in FIGS. 9 to 11, when the sender's electronic mail address is an external domain address such as "c@bar.org", electronic mail addresses in external domains included in the "To" and "CC" header fields are not automatically registered as non-third parties.

Therefore, in order to automatically register as non-third parties electronic mail addresses in external domains included in the "To" and "CC" header fields, the processing of S404 in FIG. 10 may further be modified as follows. According to the following modification, the occurrence of a warning in the future may further be suppressed.

That is, the registration unit 212 further reads all the electronic mail addresses included in the "To" and "CC" header fields of a received electronic mail. As a consequence, one or a plurality of electronic mail addresses are obtained. Then, the registration unit 212 adds, for each combination of an attached file and an electronic mail, an entry that associates the file ID issued in S404 with the read electronic mail address to the member table 401.

Further, conversely to the modification of S404 described above, a modification may also be made in such a manner that automatic registration as a non-third party is omitted. That is, in the process in FIG. 9, the electronic mail address in the "BCC" header field is also handled as a "destination electronic mail address". However, the electronic mail address in the "BCC" header field may not necessarily be handled as a "destination electronic mail address".

That is, according to the process in FIG. 9, when the "BCC" header field includes an electronic mail address that has not been registered as a non-third party, in S311, a warning is issued. When a permission input is given from the user in response to the warning, in S314, the electronic mail address is automatically registered as a non-third party. However, even when a permission input is given, the electronic mail address specified in the "BCC" header field may be excluded from the target to be automatically registered as a non-third party.

This is because in a certain specific situation, the electronic mail address hidden with the use of the "BCC" header field may be made apparent due to the electronic mail address being automatically registered. Thus, in order to respect the purpose of the "BCC" header field that the electronic mail address is hidden from other recipients, the electronic mail address specified in the "BCC" header field may be excluded from the target to be automatically registered in S314.

For example, as described above, it is assumed that the electronic mail addresses used for the client PCs 112 to 114 are "a@foo.com", "b@foo.com", and "d@foo.com", respectively. It is also assumed that the values of the "From", "To", and "BCC" header fields of a certain electronic mail with a file attached are "a@foo.com", "b@foo.com", and "d@foo.com", respectively.

In this case, the user of the client PC 113 is not able to recognize that the same electronic mail has also been sent to the user of the client PC 114 even when the user refers to the header of the received electronic mail. However, according to the process in FIG. 9, in the following situation, the user of the client PC 113 may figure that "the electronic mail address "d@foo.com" may have been specified in the "BCC" header field of the received electronic mail".

For example, it is assumed that the user of the client PC 113 is to forward a received electronic mail to the electronic mail address "d@foo.com" (i.e., to the user of the client PC 114). Thus, the process in FIG. 9 is executed in the client PC 113. According to the process in FIG. 9, however, no warnings are issued. This is because the electronic mail address "d@foo.com" has already been registered as a non-third party through the process in FIG. 9 previously executed in the client PC 112 in response to the client PC 112 sending an electronic mail.

The user of the client PC 113 may understand that the electronic mail address of the transfer destination, or "d@foo.com", is a non-third party electronic mail address because no warnings have been issued. On the basis of this understanding, the user of the client PC 113 may figure that "the electronic mail address "d@foo.com" may have been specified in the "BCC" header field of the received electronic mail". That is, the electronic mail address hidden with the use of the "BCC" header field may be made apparent.

In order to respect the purpose of the "BCC" header field, therefore, the electronic mail address specified in the "BCC" header field may be excluded from the target to be automatically registered in S314 in FIG. 9.

In the above example, a warning is issued when the user of the client PC 113 is to forward an electronic mail to the electronic mail address "d@foo.com". Thus, the user of the client PC 113 is not able to figure that the electronic mail address "d@foo.com" is specified in the "BCC" header field of the electronic mail received at the client PC 113. Accordingly, the foregoing embodiments may be modified in a manner more suitable for the purpose of the "BCC" header field that is intended to hide an electronic mail address.

A fifth modification relates to an opportunity that various kinds of data are deleted in the first embodiment or the second embodiment. The process in FIG. 13 is executed when a locally saved file is to be deleted, and consequently, an entry is deleted from the management DB 400. However, an entry may be deleted from the management DB 400 using as a trigger the deletion of a file from a shared folder or the deletion of an electronic mail.

For example, in the second embodiment, when a file is to be deleted from a shared folder by calling a command or menu for deleting a file, the detection unit 213 may detect a call to such a command or menu.

In this case, the detection unit 213 acquires as location information concerning a file to be deleted, the fully-qualified path name in the UNC format of a shared folder instead of the host name (25-1) and the fully-qualified path name (25-2) in a host. Further, the detection unit 213 searches the file location table 402 using the acquired fully-qualified path name of the shared folder as a search key to acquire the file ID of a file to be deleted.

Then, the detection unit 213 notifies the registration unit 212 of the fully-qualified path name of the shared folder and the file ID. Thus, the registration unit 212 deletes the entry regarding the file to be deleted from the file location table 402. Subsequently, processing similar to the processing of S703 to S705 in FIG. 13 is performed.

Further, when an electronic mail locally saved in a mailbox is to be deleted on a mail user agent, the detection unit 213 may perform a process similar to the process in FIG. 13. In this case, the configuration of the electronic mail management table 403 is also modified, and the processes in FIGS. 9 and 10 are also modified. Specifically, the following modifications are made.

First, a "counter" field is added to each entry in the electronic mail management table 403. For example, the value of the "counter" field of an entry including the message ID "M000015" indicates the number of client machines in the LAN 110, in which an electronic mail having the message ID "M000015" is saved.

Thus, in S310 in FIG. 9, the value "1" is set in the "counter" field of each entry to be newly added to the electronic mail management table 403.

Similarly, in S404 in FIG. 10, the value "1" is set in the "counter" field of each entry to be newly added to the electronic mail management table 403. Further, in S403, the value of the "counter" field is incremented by 1 in all the entries in the electronic mail management table 403 which include the same message ID as the message ID acquired in S401.

When an input for deleting a locally saved electronic mail is given from the user on a mail user agent, the detection unit 213 may detect the input. Then, the registration unit 212 may start a process similar to the process in FIG. 13 using the detection performed by the detection unit 213 as a trigger.

Specifically, the detection unit 213 reads from the "Message-ID" header field the message ID of an electronic mail to be deleted. When an electronic mail to be deleted has one or more files attached, the detection unit 213 reads the file name of each attached file from the "Content-Disposition" header field. Then, the detection unit 213 notifies the registration unit 212 of the read information.

Thus, the registration unit 212 searches the electronic mail management table 403 using the notified message ID as a search key. As a result of search, one or more entries are found. Then, the registration unit 212 decrements the value of the "counter" field of each found entry by 1.

As a result of decrement, when the value of the "counter" field of each entry found as a result of search becomes 0, the registration unit 212 further performs the following operations (37-1) to (37-3):

(37-1) The registration unit 212 reads the file ID of an attached file from each entry for which the value of the "counter" field is updated to 0 by the above decrement.

(37-2) The registration unit 212 deletes from the electronic mail management table 403 each entry for which the value of the "counter" field is updated to 0 by the above decrement.

(37-3) The registration unit 212 searches, for each file ID read in the operation (37-1), the file location table 402 using the file ID as a search key in a manner similar to that in S703 in FIG. 13. When no entries are found in the file location table 402 as a result of search, similarly to that in S704 in FIG. 13, the registration unit 212 deletes the entries from the member table 401.

In the manner described above, after the value of the "counter" field is decremented and after the operations (37-1) to (37-3) are performed depending on the situation, the electronic mail is deleted in accordance with an instruction given from the user.

The fifth modification described above allows an unnecessary entry to be deleted from the management DB 400 to more efficiently use a storage area.

A sixth modification relates to output of a file to a remote machine in the third embodiment. While the cases (36-1) to (36-5) are given as examples of the case where a file is output from the client PC 112 to a remote machine in connection with FIG. 18, other cases where a foreign file is output to a remote machine may also be given, for example, as the following (38-1) to (38-9).

(38-1) An electronic mail with an attached file, which has been received at the client PC 112, is forwarded.

(38-2) An attached file in an electronic mail received at the client PC 112 is directly saved in a shared folder on the file server 115.

(38-3) An attached file in an electronic mail received at the client PC 112 is directly saved in the recording medium 310.

(38-4) A file in a shared folder is attached to an electronic mail and the electronic mail is sent from the client PC 112.

(38-5) A file in the recording medium 310 is attached to an electronic mail and the electronic mail is sent from the client PC 112.

(38-6) A file in a shared folder is uploaded to the HTTP server 122.

(38-7) A file in the recording medium 310 is uploaded to the HTTP server 122.

(38-8) A file in a shared folder is uploaded to the FTP server 123.

(38-9) A file in the recording medium 310 is uploaded to the FTP server 123.

In the cases (38-1) to (38-9) described above, when an operation instructed by the user is directly executed, there is a risk of providing access to a foreign file to a third party due to carelessness of the user. According to the process in FIG. 18, however, no warnings are issued in the above cases (38-1) to (38-9). The reasons are as follows.

In the third embodiment, the system 200 is a stand-alone system. Thus, a fully-qualified path name in a host is used as the file identification information 231. In the above cases (38-1) to (38-9), however, a foreign file to be output to a remote machine is not associated with the fully-qualified path name thereof in the client PC 112 as the file identification information 231. According to the process in FIG. 18, therefore, no warnings are issued in the above cases (38-1) to (38-9).

Therefore, the third embodiment may be modified as follows: The detection unit 213 may further detect an input operation by a user who is to output a foreign file directly to a remote machine without locally saving the foreign file temporarily, as in the cases (38-1) to (38-9). A specific example for detection will become apparent from the foregoing description of the first to third embodiments. For example, the detection unit 213 may detect an input operation in the cases (38-1) to (38-9) using a hook.

Upon detecting an input operation for outputting a foreign file directly to a remote machine, the detection unit 213 notifies the determination unit 214 of the content of the detected input operation. Here, when a foreign file is to be output directly to a remote machine, an event for which a warning is to be issued has apparently occurred without even searching the foreign file management table 404 by the determination unit 214.

Therefore, upon receiving a notification from the detection unit 213 notifying that an input corresponding to any of the cases (38-1) to (38-9) has been detected, the determination unit 214 outputs the content of the notification to the warning unit 221. Thus, the warning unit 221 issues a warning. For example, the warning unit 221 may display a dialog including a warning message such as "A foreign file is to be output directly to a third party, and there is a risk of information leakage. Do you want to continue this operation?"

Further, the warning unit 221 instructs the input accepting unit 222 to accept an input in response to the warning from the input device 240. Thus, as in S1003 in FIG. 18, the input accepting unit 222 waits for an input to be received from the input device 240.

When the input accepting unit 222 accepts a prohibition input in response to the warning, the input accepting unit 222 sends a notification to the prohibition unit 224. Thus, the prohibition unit 224 stops the operation instructed by the user.

Conversely, when the input accepting unit 222 accepts a permission input in response to the warning, the input accepting unit 222 notifies the permission unit 223 that there is no information leakage to third parties. Thus, as in S1007 in FIG. 18, the permission unit 223 permits execution of the operation instructed by the user.

According to the sixth modification described above, even when a foreign file is to be output directly to a remote machine, a warning is issued to suppress information leakage to any third party due to carelessness.

A seventh modification relates to whether the system 200 in FIG. 3 is a client-server system or a stand-alone system.

The first and second embodiments are examples of a client-server system, and the management server 117 in FIG. 2 is used as a server. Further, the third embodiment is an example of a stand-alone system, and the management server 117 is not used.

However, in a modification of the third embodiment, the system 200 may be implemented as a client-server system. That is, the management server 117 may hold three foreign file management tables 404 corresponding to the client PCs 112 to 114.

Further, the management server 117 may provide a DB interface to the registration unit 212 and the determination unit 214 of each of the client PCs 112 to 114. Alternatively, the third embodiment may be modified such that the registration unit 212 and the determination unit 214 are included in the management server 117.

Alternatively, in other words from a different perspective, the first embodiment or the second embodiment may be modified such that, as in the third embodiment, a file for which a warning is to be issued is limited to a foreign file.

Furthermore, when the system 200 is implemented as a client-server system, some information in the management DB 400 may be backed up in the client PCs 112 to 114. For example, a file regarding an entry locally saved in the client PC 112 among entries in the management DB 400 may be backed up in the client PC 112.

In this case, the determination unit 214 of the client PC 112 refers to a local backup copy in the client PC 112. Further, the registration unit 212 of the client PC 112 updates both the management DB 400 in the management server 117 and the backup copy of the management DB 400 in the client PC 112.

Alternatively, each entry in the file location table 402 other than entries indicating locations on a shared folder may be stored in a client machine indicated by the host name of the location information. That is, the file location table 402 may be distributed to the client PCs 112 to 114 and the management server 117.

Meanwhile, an overview of various embodiments in terms of the common and different features between a client-server system and a stand-alone system will be discussed hereinafter.

In the following overview, similarly to the description with reference to FIG. 3, a process for providing access to a file from one or more third parties that are not non-third parties registered in the storage device 230 regarding the file is referred to as a "specific process". Further, an input for instructing execution of a specific process is referred to as a "specific input". That is, a permission input is an input for permitting the file to be accessed from the above one or more third parties, and a prohibition input is an input for prohibiting the above access.

While the client PCs 112 to 114 may have similar configurations, for convenience of description, the client PC 112 will be described. The client PC 112 operates as a client machine when the system 200 is a client-server system, and operates as the overall system 200 when the system 200 is a stand-alone system. In either case, the client PC 112 executes the following protection process.

That is, the client PC 112 registers the origin of a file as a non-third party regarding the file into the storage device 230. When both a specific input and a permission input are given, the client PC 112 registers each of the above one or more third parties as a non-third party regarding the file into the storage device 230, and further permits the specific process to be executed.

When both a specific input and a prohibition input are given, the client PC 112 prohibits the specific process from being executed. More specifically, when a specific input is given, the client PC 112 may issue a warning, and may accept a permission input or prohibition input as an input from the user in response to the warning. When a prohibition input is given in response to the warning, the client PC 112 may prohibit the specific process from being executed.

Here, a specific example of the specific process is, for example, a process for sending an electronic mail in which the above one or more third parties are specified as destinations and to which the above file is attached. This process is, more specifically, a process for newly creating an electronic mail and sending the electronic mail, or a process for forwarding a received electronic mail.

Another specific example of the specific process is, for example, a process for saving the above file in a folder (such as a shared folder on the file server 115) that the above one or more third parties are granted access privileges.

Still another specific example of the specific process is, for example, a process for, when the origin of the above file is a first other computer, transferring the above file to a second other computer different from the first other computer. For example, the first other computer may be the HTTP server 122 or the FTP server 123, and the second other computer may be another HTTP server (not illustrated) or another FTP server (not illustrated).

The non-third party identification information 232 is, in other words, permission target information indicating a target permitted to access the file. Thus, the protection process performed by the client PC 112 may be regarded as, in other words, a process including the following processes (39-1) and (39-2):

(39-1) A process of, when transfer destination information indicating a transfer destination of a file stored in a storage device is not included in the permission target information, prompting a user to input whether or not to permit the execution of transfer prior to the transfer of the file.

(39-2) A process of, when an input indicating permission is performed using the input device 305 of the client PC 112, adding the transfer destination information to the permission target information and transferring the file.

For example, a first controller that executes the process (39-1) may be implemented by the detection unit 213, the determination unit 214, and the warning unit 221. Further, a second controller that executes the process (39-2) may be implemented by the input accepting unit 222, the permission unit 223, and the registration unit 212.

As may be understood from the specific examples of the "specific process" described above, the "transferring of the file" described in the processes (39-1) and (39-2) may be specifically transferring performed through, for example, any of the processes (40-1) to (40-3).

(40-1) Sending an electronic mail with an attached file.

(40-2) Transferring a file to another computer (for example, the file server 115) having a shared folder, which is performed when a file is to be written to the shared folder.

(40-3) Uploading a file to another computer (for example, the HTTP server 122 or the FTP server 123).

In addition, in the protection process, the client PC 112 may specifically recognize an origin to be registered as a non-third party in the following way.

For example, the client PC 112 detects an operation of newly creating the above file and saving the file, and may recognize as an origin the user who performs the creation operation. Alternatively, when the file is an attached file in an electronic mail received at the client PC 112, the client PC 112 may recognize as an origin the sender of the received electronic mail.

In addition, when the above file is a file copied from a shared folder, the client PC 112 may recognize an origin by detecting an operation of copying the above file from the shared folder and saving the copied file in the client PC 112. That is, the client PC 112 may recognize the shared folder as the origin of the file, or may recognize as the origin each user who is granted access privileges to the shared folder.

The above file may also be a file downloaded from another computer (for example, the HTTP server 122 or the FTP server 123). In this case, the client PC 112 may detect an operation of downloading the above file and saving the downloaded file in the client PC 112. Then, the client PC 112 may recognize the other computer as an origin.

In addition, the above file may also be a file read from the recording medium 310 to which unique identification information is assigned in advance. In this case, the client PC 112 may detect an operation of reading the above file from the recording medium 310 (such as an copying, moving, or renaming operation), and may recognize the recording medium 310 as an origin.

As a result of the recognition of the origin as described above by way of example, the non-third party identification information 232 indicating an origin is registered in the storage device 230. In other words, some information is added to the "permission target information" described in the processes (39-1) and (39-2) as a result of the recognition of an origin. Specifically, for example, the following processes (41-1) to (41-5) may be performed.

(41-1) When a new file is created, information (for example, an account name) identifying a user who performs an operation of creating a new file and saving the file in a storage device is added to permission target information concerning the new file.

(41-2) When an electronic mail with an attached file is received, information (i.e., electronic mail address) identifying the sender of the electronic mail is added to permission target information concerning the attached file.

(41-3) In some cases, a shared file stored in a shared folder (for example, a shared folder on the file server 115) may be copied or moved to a storage device (for example, the storage device 307 of the client PC 112). In these cases, the information identifying the shared folder (for example, a path name in the UNC format) may be added to permission target information concerning the shared file copied or moved to the storage device. Alternatively, information (for example, an account name) identifying each of one or more users who are granted access privileges to the shared folder may be added to permission target information concerning the shared file copied or moved to the storage device.

(41-4) In some cases, a remote file on another computer (for example, the HTTP server 122 or the FTP server 123) may be downloaded and saved in a storage device (for example, the storage device 307 of the client PC 112). In these cases, information (for example, an FQDN or IP address) identifying the other computer on a network is added to permission target information concerning the downloaded remote file.

(41-5) In some cases, an existing file stored in a recording medium assigned unique identification information (for example, a PnP device ID) may be read from the recording medium, and may be saved in a storage device (for example, the storage device 307 of the client PC 112). In these cases, the unique identification information is added to permission target information concerning the existing file saved in the storage device.

As may also be understood from the foregoing description, a non-third party may be identified by various kinds of information. For example, a non-third party may be identified by either of or both the electronic mail address and the account name of a user serving as a non-third party. Alternatively, a non-third party may be identified by computer identification information (such as a host name, a MAC address, an IP address, or an FQDN) for identifying, in an intranet or on the Internet, a computer serving as a non-third party. Alternatively, a non-third party may be identified by recording medium identification information (such as a PnP device ID) assigned to the recording medium 310 serving as a non-third party and stored in the recording medium 310.

That is, transfer destination information to be added to permission target information in the process (39-2) may also be represented using, as described above, information identifying a non-third party. Further, the permission target information is stored in the management server 117 in a client-server system or in the client PC 112 or the like in a stand-alone system.

In addition, the above file, which is managed in association with a non-third party, is specifically a file that the client PC 112 saves locally (that is, in the storage device 307 of the client PC 112). Further, the specific input, the permission input, and the prohibition input are specifically inputs given to the client PC 112 from the input device 240 (that is, the input device 305) connected to the client PC 112.

The foregoing overview is the same regardless of whether the client PC 112 operates as a client machine in a client-server system or operates as a stand-alone system. The different features between the above two cases are, for example, as follows.

In a case where the client PC 112 operates as a client machine in a client-server system, the client PC 112 itself may generate the file identification information 231. Alternatively, the client PC 112 may request the management server 117 to generate the file identification information 231, and may acquire the file identification information 231 from the management server 117.

In contrast, in a case where the client PC 112 operates as a stand-alone system, the client PC 112 may generate the file identification information 231 by itself, or may acquire the fully-qualified path name of the file in the client PC 112 as the file identification information 231.

In a case where the client PC 112 operates as a client machine in a client-server system, furthermore, the storage device 230 in FIG. 3 is the storage device 307 of the management server 117 that is specifically a computer different from the client PC 112. In this case, the client PC 112 determines whether or not the input given from the input device 240 is a specific input, by sending a query to the management server 117. Sending a query to the management server 117 is specifically a process for referring to the management DB 400 or the foreign file management table 404 on the management server 117 via the DB interface of the management server 117.

In a case where the client PC 112 operates as a stand-alone system, in contrast, the client PC 112 uses the storage device 307, which is locally provided in the client PC 112, as the storage device 230 in FIG. 3. For example, the foreign file management table 404 is stored in the storage device 307 of the client PC 112.

Also in a case where the system 200 is a client-server system, the registration management unit 210 in FIG. 3 may be implemented in a different manner in accordance with the embodiment. For example, when the system 200 is a client-server system including the client PC 112 and the management server 117, the client PC 112 includes the execution control unit 220 and the input device 240, and the management server 117 includes the storage device 230. However, the registration management unit 210 is distributed to the client PC 112 and the management server 117, as desired, in accordance with the embodiment.

For example, in an embodiment, all the components of the registration management unit 210 may be included in the client PC 112, and the management server 117 may merely provide a DB interface for the registration unit 212 and the determination unit 214. In another embodiment, however, the origin recognition unit 211 and the detection unit 213 may be included in the client PC 112, and the registration unit 212 and the determination unit 214 may be included in the management server 117. In the latter case, the management server 117 may operate as the registration unit 212 and the determination unit 214 by specifically executing the following protection process in accordance with a program.

The management server 117 registers the origin of a file that the client PC 112 locally saves into the storage device 230 as a non-third party regarding the file. The management server 117 may be notified of the origin by, for example, the origin recognition unit 211 of the client PC 112.

Further, the management server 117 receives from the client PC 112 a first notification for notifying the management server 117 of the content of the input given to the client PC 112. Then, the management server 117 (specifically, the determination unit 214 implemented on the management server 117) determines whether or not the specific input has been given to the client PC 112 in accordance with the received first notification. The management server 117 refers to the storage device 230 to perform the determination.

When the management server 117 determines that "the specific input has been given to the client PC 112", the management server 117 notifies the client PC 112 that the specific input has been given to the client PC 112. This notification may be specifically sent to the warning unit 221 of the client PC 112 in form of, for example, a warning list.

Then, the management server 117 (specifically, the registration unit 212 implemented on the management server 117) receives from the client PC 112 a second notification indicating whether or not a permission input has been given to the client PC 112.

When the management server 117 determines that "the specific input has been given to the client PC 112" and the second notification indicates that "a permission input has been given to the client PC 112", the management server 117 performs the following operation: The management server 117 (specifically, the registration unit 212 implemented on the management server 117) registers each of one or more third parties that are permitted to access the file by the permission input into the storage device 230 as a non-third party regarding the file.

Any of the various embodiments described above may also achieve the following advantages.

That is, since the preliminary settings of various policies such as an electronic mail policy and a shared folder policy are not made individually, the burden placed on a user, an administrator, or the like is small. In addition, since the execution of the specific process is not prohibited as a whole, operation efficiency is not considerably reduced or users do not significantly feel inconvenienced. Moreover, automatic registration of a non-third party may suppress excessive generation of warnings and may reduce labor and time for a user to give an input in response to a warning.

Accordingly, a user only suffers a small amount of detriment. Nevertheless, according to the various embodiments described above, information leakage due to carelessness of a user may be suppressed. This is because a user may be given an opportunity to intentionally consider "whether or not to give a permission input" before a file becomes actually accessible from a third party.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a first computer to execute a procedure, the procedure comprising:
receiving a first input from a user, the first input instructing execution of providing access to a file and/or transferring the file;
determining whether the first input indicates whether the file is to be accessed by and/or transferred to only one or more registered non-third parties;
when it is determined that the first input indicates that the file is to be accessed by and/or transferred to only one or more registered non-third parties, providing access to and/or transferring the file to the one or more registered non-third parties; and
when it is determined that the first input indicates that the file is to be accessed by and/or transferred to one or more third parties that have not been registered as non-third parties,
warning the user that the first input from the user involves a risk of information leakage to the one or more third parties that have not been registered as non-third parties;
prompting the user to input a second input that indicates whether to permit the access and/or transfer;
when the second input is a permission input, permitting access by and/or transferring the file to the one or more third parties that have not been registered as non-third parties; and
when the second input is a prohibition input, denying access by and/or transferring the file to the one or more third parties that have not been registered as non-third parties.

2. The non-transitory computer-readable recording medium according to claim 1, wherein
the first input includes an e-mail address,
the file is attached to an e-mail having the e-mail address as a destination address, and
the file is transferred by transmitting the e-mail.

3. The non-transitory computer-readable recording medium according to claim 1, wherein
the file is transferred to a second computer including a shared folder so as to write the file to the shared folder,
one or more users are permitted to access the shared folder, and the first input includes information identifying the one or more users respectively.

4. The non-transitory computer-readable recording medium according to claim 1, wherein the first input includes information identifying, on a network, a second computer to which the file is transferred.

5. The non-transitory computer-readable recording medium according to claim 1, the procedure further comprising:
   detecting an operation of storing a newly generated file in the storage device; and
   adding, to permission target information concerning the newly generated file, information identifying a user who has conducted the operation.

6. The non-transitory computer-readable recording medium according to claim 1, the procedure further comprising:
   detecting reception of an e-mail with an attached file; and
   adding, to permission target information concerning the attached file, information identifying a sender of the e-mail.

7. The non-transitory computer-readable recording medium according to claim 1, the procedure further comprising:
   detecting an operation of copying or moving a shared file stored in a shared folder to the storage device; and
   adding, to permission target information concerning the file copied or moved, information identifying the shared folder or information respectively identifying one or more users permitted to access the shared folder.

8. The non-transitory computer-readable recording medium according to claim 1, the procedure further comprising:
   detecting an operation of downloading a remote file on a second computer to store the downloaded file in the storage device; and
   adding, to permission target information concerning the downloaded file, information identifying the second computer on a network.

9. The non-transitory computer-readable recording medium according to claim 1, the procedure further comprising:
   detecting an operation of reading a file, from a recording medium having a unique identifier, to store the read file in the storage device; and
   adding the unique identifier to permission target information concerning the stored file.

10. The non-transitory computer-readable recording medium according to claim 1, wherein
    the first input includes information represented by either of or both an e-mail address and an account name of a user who becomes to be able to access the file by the transfer, a computer identifier identifying, on a intranet or the Internet, a computer to which the file is transferred, or a medium identifier identifying a recording medium to which the file is transferred and which stores the medium identifier.

11. The non-transitory computer-readable recording medium according to claim 1, the procedure further comprising:
    generating or acquiring a file identifier identifying the file, wherein
    the permission target information is associated with the generated or acquired file identifier of the file.

12. The non-transitory computer-readable recording medium according to claim 1, wherein the permission target information concerning the file is locally stored in the first computer.

13. The non-transitory computer-readable recording medium according to claim 1, wherein
    the permission target information concerning the file is stored in a second computer,
    the determining is executed in cooperation with the second computer, and
    the adding is executed in cooperation with the second computer.

14. A non-transitory computer-readable recording medium storing a program that causes a first computer to execute a procedure, the procedure comprising:
    receiving destination information from a second computer, the destination information indicating whether a file is to be accessed by and/or transferred to only one or more registered non-third parties, the file being stored in a storage device included in the second computer;
    when it is determined that the file is to be accessed by and/or transferred to only one or more registered non-third parties, providing access to and/or transferring the file to the one or more registered non-third parties; and
    when it is determined that the destination information indicates that the file is to be accessed by and/or transferred to one or more third parties that have not been registered as non-third parties,
      warning a user that the received destination information involves a risk of information leakage to the one or more third parties that have not been registered as non-third parties;
      prompting the user to input and input that indicates whether to permit the access and/or transfer;
      when the input is a permission input, permitting access by and/or transferring the file to the one or more third parties that have not been registered as non-third parties; and
      when the input is a prohibition input, denying access by and/or transferring the file to the one or more third parties that have not been registered as non-third parties.

15. An information processing apparatus connected to an input device and a storage device, the information processing apparatus comprising:
    a computer processor configured to:
      receive a first input from a user, the first input instructing execution of providing access to a file and/or transferring the file;
      determine whether the first input indicates whether the file is to be accessed by and/or transferred to only one or more registered non-third parties;
      when it is determined that the first input indicates that the file is to be accessed by and/or transferred to only one or more registered non-third parties, provide access to and/or transferring the file to the one or more registered non-third parties; and
      when it is determined that the first input indicates that the file is to be accessed by and/or transferred to one or more third parties that have not been registered as non-third parties,
        warn the user that the first input from the user involves a risk of information leakage to the one or more third parties that have not been registered as non-third parties;
        prompt the user to input a second input that indicates whether to permit the access and/or transfer;

when the second input is a permission input, permit access by and/or transferring the file to the one or more third parties that have not been registered as non-third parties; and when the second input is a prohibition input, deny access by and/or transferring the file to the one or more third parties that have not been registered as non-third parties.

16. A method executed by a computer, the method comprising:

receiving a first input from a user, the first input instructing execution of providing access to a file and/or transferring the file;

determining, by the computer, whether the first input indicates whether the file is to be accessed by and/or transferred to only one or more registered non-third parties;

when it is determined that the first input indicates that the file is to be accessed by and/or transferred to only one or more registered non-third parties, providing, by the computer, access to and/or transferring the file to the one or more registered non-third parties; and when it is determined that the first input indicates that the file is to be accessed by and/or transferred to one or more third parties that have not been registered as non-third parties, warning the user that the first input from the user involves a risk of information leakage to the one or more third parties that have not been registered as non-third parties;

prompting the user to input a second input that indicates whether to permit the access and/or transfer;

when the second input is a permission input, permitting access by and/or transferring the file to the one or more third parties that have not been registered as non-third parties; and when the second input is a prohibition input, denying access by and/or transferring the file to the one or more third parties that have not been registered as non-third parties.

\* \* \* \* \*